(12) United States Patent
Veillette et al.

(10) Patent No.: US 8,138,934 B2
(45) Date of Patent: Mar. 20, 2012

(54) SYSTEM AND METHOD FOR FALSE ALERT FILTERING OF EVENT MESSAGES WITHIN A NETWORK

(75) Inventors: Michel Veillette, Waterloo (CA); Kevin House, Toronto (CA)

(73) Assignee: Trilliant Networks, Inc., Redwood City, CA (US)

( * ) Notice: Subject to any disclaimer, the term of this patent is extended or adjusted under 35 U.S.C. 154(b) by 421 days.

(21) Appl. No.: 12/275,245

(22) Filed: Nov. 21, 2008

(65) Prior Publication Data

US 2009/0135018 A1 May 28, 2009

Related U.S. Application Data

(60) Provisional application No. 60/989,957, filed on Nov. 25, 2007, provisional application No. 60/989,967, filed on Nov. 25, 2007, provisional application No. 60/989,958, filed on Nov. 25, 2007, provisional application No. 60/989,964, filed on Nov. 25, 2007, provisional application No. 60/989,950, filed on Nov. 25, 2007, provisional application No. 60/989,953, filed on Nov. 25, 2007, provisional application No. 60/989,956, filed on Nov. 25, 2007, provisional application No. 60/989,975, filed on Nov. 25, 2007, provisional application No. 60/989,959, filed on Nov. 25, 2007, provisional application No. 60/989,961, filed on Nov. 25, 2007, provisional application No. 60/989,962, filed on Nov. 25, 2007, provisional application No. 60/989,951, filed on Nov. 25, 2007, provisional application No. 60/989,955, filed on Nov. 25, 2007, provisional application No. 60/989,952, filed on Nov. 25, 2007, provisional application No. 60/989,954, filed on Nov. 25, 2007, provisional application No. 60/992,312, filed on Dec. 4, 2007, provisional application No. 60/992,313, filed on Dec. 4, 2007, provisional application No. 60/992,315, filed on Dec. 4, 2007, provisional application No. 61/025,279, filed on Jan. 31, 2008, provisional application No. 61/025,270, filed on Jan. 31, 2008, provisional application No. 61/025,276, filed on Jan. 31, 2008, provisional application No. 61/025,288, filed on Jan. 31, 2008, provisional application No. 61/025,282, filed on Jan. 31, 2008, provisional application No. 61/025,271, filed on Jan. 31, 2008, provisional application No. 61/025,287, filed on Jan. 31, 2008, provisional application No. 61/025,278, filed on Jan. 31, 2008, provisional application No. 61/025,273, filed on Jan. 31, 2008, provisional application No. 61/025,277, filed on Jan. 31, 2008, provisional application No. 61/094,116, filed on Sep. 4, 2008.

(51) Int. Cl.
*G08B 21/00* (2006.01)
(52) U.S. Cl. .................................. 340/635; 340/870.01
(58) Field of Classification Search .................. 340/635, 340/870.01
See application file for complete search history.

(56) References Cited

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |
| 4,749,992 A | 6/1988 | Fitzemeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |

| Patent No. | Date | Inventor | Class |
|---|---|---|---|
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,465,398 A | 11/1995 | Flammer | 455/69 |
| 5,467,345 A | 11/1995 | Cutler, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,553,094 A | 9/1996 | Johnson et al. | 375/130 |
| 5,570,084 A | 10/1996 | Retter et al. | 370/338 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,696,501 A | 12/1997 | Ouellette et al. | 340/870.02 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,767,790 A | 6/1998 | Jovellana | 340/870.02 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A * | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colton et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 * | 12/2003 | Burns et al. | 702/62 |
| 6,681,110 B1 | 1/2004 | Crookham et al. | 455/420 |
| 6,684,245 B1 | 1/2004 | Shuey et al. | 709/223 |
| 6,691,173 B2 | 2/2004 | Morris et al. | 709/249 |
| 6,697,331 B1 | 2/2004 | Riihinen et al. | 370/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,775,258 B1 | 8/2004 | van Valkenburg et al. | 370/338 |
| 6,778,099 B1 | 8/2004 | Meyer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |

| | | | | | | | |
|---|---|---|---|---|---|---|---|
| 6,904,025 B1 | 6/2005 | Madour et al. | 370/328 | 7,468,661 B2 | 12/2008 | Petite et al. | 340/540 |
| 6,904,385 B1 | 6/2005 | Budike, Jr. | 702/182 | 7,487,282 B2 | 2/2009 | Leach | 710/305 |
| 6,909,705 B1 | 6/2005 | Lee et al. | 370/338 | 7,495,578 B2 | 2/2009 | Borleske | 340/870.02 |
| 6,914,533 B2 | 7/2005 | Petite | 340/628 | 7,498,873 B2 | 3/2009 | Opshaug et al. | 329/315 |
| 6,914,893 B2 | 7/2005 | Petite | 370/338 | 7,505,453 B2 | 3/2009 | Carpenter et al. | 370/352 |
| 6,946,972 B2 | 9/2005 | Mueller et al. | 340/870.02 | 7,522,540 B1 | 4/2009 | Maufer | 370/254 |
| 6,954,814 B1 | 10/2005 | Leach | 710/305 | 7,522,639 B1 | 4/2009 | Katz | 370/503 |
| 6,963,285 B2 | 11/2005 | Fischer et al. | 340/635 | 7,539,151 B2 | 5/2009 | Demirhan et al. | 370/254 |
| 6,967,452 B2 | 11/2005 | Aiso et al. | 318/466 | 7,545,285 B2 | 6/2009 | Shuey et al. | 340/870.02 |
| 6,970,434 B1 | 11/2005 | Mahany et al. | 370/256 | 7,548,826 B2 * | 6/2009 | Witter et al. | 702/115 |
| 6,970,771 B1 | 11/2005 | Preiss et al. | 700/286 | 7,562,024 B2 * | 7/2009 | Brooks et al. | 705/1.1 |
| 6,975,613 B1 | 12/2005 | Johansson | 370/338 | 7,586,420 B2 * | 9/2009 | Fischer et al. | 340/635 |
| 6,980,973 B1 | 12/2005 | Karpenko | 705/412 | 7,609,673 B2 | 10/2009 | Bergenlid et al. | 370/329 |
| 6,982,651 B2 | 1/2006 | Fischer | 340/870.02 | 7,613,147 B2 | 11/2009 | Bergenlid et al. | 370/329 |
| 6,985,087 B2 | 1/2006 | Soliman | 340/870.02 | 7,623,043 B2 | 11/2009 | Mizra et al. | 340/870.02 |
| 6,995,666 B1 | 2/2006 | Luttrell | 340/539.1 | 7,650,425 B2 | 1/2010 | Davis et al. | 709/238 |
| 6,999,441 B2 | 2/2006 | Flammer, III et al. | 370/337 | 7,676,231 B2 | 3/2010 | Demirhan et al. | 455/452.1 |
| 7,009,379 B2 | 3/2006 | Ramirez | 324/142 | 7,680,041 B2 | 3/2010 | Johansen | 370/230 |
| 7,009,493 B2 | 3/2006 | Howard et al. | 340/7.1 | 2001/0005368 A1 | 6/2001 | Rune | 370/390 |
| 7,016,336 B2 | 3/2006 | Sorensen | 370/338 | 2001/0038342 A1 | 11/2001 | Foote | 340/870.02 |
| 7,020,701 B1 | 3/2006 | Gelvin et al. | 709/224 | 2001/0046879 A1 | 11/2001 | Schramm et al. | 455/525 |
| 7,042,368 B2 | 5/2006 | Patterson et al. | 340/870.29 | 2002/0012358 A1 | 1/2002 | Sato | 370/466 |
| 7,046,682 B2 | 5/2006 | Carpenter et al. | 370/401 | 2002/0013679 A1 | 1/2002 | Petite | 702/188 |
| 7,053,767 B2 | 5/2006 | Petite et al. | 340/531 | 2002/0031101 A1 | 3/2002 | Petite et al. | 370/310 |
| 7,054,271 B2 | 5/2006 | Brownrigg et al. | 370/238 | 2002/0066095 A1 | 5/2002 | Yu | 717/173 |
| 7,062,361 B1 | 6/2006 | Lane | 700/295 | 2002/0110118 A1 * | 8/2002 | Foley | 370/352 |
| 7,064,679 B2 | 6/2006 | Ehrke et al. | 340/870.02 | 2002/0120569 A1 | 8/2002 | Day | 705/40 |
| 7,072,945 B1 | 7/2006 | Nieminen et al. | 709/217 | 2002/0186619 A1 | 12/2002 | Reeves et al. | 368/47 |
| 7,079,810 B2 | 7/2006 | Petite et al. | 455/41.2 | 2003/0001640 A1 | 1/2003 | Lao et al. | 327/165 |
| 7,089,089 B2 | 8/2006 | Cumming et al. | 700/295 | 2003/0001754 A1 | 1/2003 | Johnson et al. | 340/870.02 |
| 7,102,533 B2 | 9/2006 | Kim | 340/870.02 | 2003/0037268 A1 | 2/2003 | Kistler | 713/310 |
| 7,103,511 B2 | 9/2006 | Petite | 702/188 | 2003/0122686 A1 | 7/2003 | Ehrke et al. | 340/870.02 |
| 7,106,044 B1 | 9/2006 | Lee, Jr. et al. | 324/110 | 2003/0123481 A1 | 7/2003 | Neale et al. | 370/466 |
| 7,119,713 B2 | 10/2006 | Shuey et al. | 340/870.02 | 2003/0156715 A1 | 8/2003 | Reeds, III et al. | 380/37 |
| 7,126,494 B2 | 10/2006 | Ardalan et al. | 340/870.02 | 2003/0229900 A1 | 12/2003 | Reisman | 725/87 |
| 7,135,850 B2 | 11/2006 | Ramirez | 324/142 | 2004/0031030 A1 | 2/2004 | Kidder et al. | 717/172 |
| 7,135,956 B2 | 11/2006 | Bartone et al. | 340/3.9 | 2004/0034773 A1 | 2/2004 | Balabine et al. | 713/168 |
| 7,137,550 B1 | 11/2006 | Petite | 235/379 | 2004/0056775 A1 | 3/2004 | Crookham et al. | 340/825 |
| 7,143,204 B1 | 11/2006 | Kao et al. | 710/18 | 2004/0066310 A1 | 4/2004 | Ehrke et al. | 340/870.02 |
| 7,145,474 B2 | 12/2006 | Shuey et al. | 340/870.03 | 2004/0077341 A1 | 4/2004 | Chandranmenon et al. | 455/418 |
| 7,170,425 B2 | 1/2007 | Christopher et al. | 340/870.02 | 2004/0113810 A1 | 6/2004 | Mason, Jr. et al. | 340/870.02 |
| 7,185,131 B2 | 2/2007 | Leach | 710/305 | 2004/0117788 A1 | 6/2004 | Karaoguz et al. | 717/177 |
| 7,188,003 B2 | 3/2007 | Ransom et al. | 700/286 | 2004/0125776 A1 | 7/2004 | Haugli et al. | 370/338 |
| 7,200,633 B2 | 4/2007 | Sekiguchi et al. | 709/203 | 2004/0138787 A1 | 7/2004 | Ransom et al. | 700/295 |
| 7,209,840 B2 | 4/2007 | Petite et al. | 702/62 | 2004/0140908 A1 | 7/2004 | Gladwin et al. | 340/870.02 |
| 7,215,926 B2 | 5/2007 | Corbett et al. | 455/41.2 | 2004/0157613 A1 | 8/2004 | Steer et al. | 455/446 |
| 7,222,111 B1 | 5/2007 | Budike, Jr. | 705/412 | 2004/0183687 A1 | 9/2004 | Petite et al. | 340/601 |
| 7,230,544 B2 | 6/2007 | Van Heteren | 340/870.03 | 2004/0210544 A1 | 10/2004 | Shuey et al. | 705/412 |
| 7,231,482 B2 | 6/2007 | Leach | 710/305 | 2005/0027859 A1 | 2/2005 | Alvisi et al. | 709/224 |
| 7,248,181 B2 | 7/2007 | Patterson et al. | 340/870.03 | 2005/0030968 A1 | 2/2005 | Rich et al. | 370/449 |
| 7,248,861 B2 | 7/2007 | Lazaridis et al. | 455/414.1 | 2005/0055432 A1 | 3/2005 | Rodgers | 709/223 |
| 7,250,874 B2 | 7/2007 | Mueller et al. | 340/870.06 | 2005/0058144 A1 | 3/2005 | Ayyagari et al. | 370/401 |
| 7,251,570 B2 | 7/2007 | Hancock et al. | 702/57 | 2005/0065742 A1 | 3/2005 | Rodgers | 702/62 |
| 7,263,073 B2 | 8/2007 | Petite et al. | 370/278 | 2005/0136972 A1 | 6/2005 | Smith et al. | 455/554.1 |
| 7,271,735 B2 | 9/2007 | Rogai | 340/870.02 | 2005/0172024 A1 | 8/2005 | Cheifot et al. | 709/225 |
| 7,274,305 B1 | 9/2007 | Luttrell | 340/870.02 | 2005/0201397 A1 | 9/2005 | Petite | 370/401 |
| 7,274,975 B2 | 9/2007 | Miller | 700/295 | 2005/0243867 A1 | 11/2005 | Petite | 370/474 |
| 7,277,027 B2 | 10/2007 | Ehrke et al. | 340/870.12 | 2005/0251403 A1 | 11/2005 | Shuey | 705/1 |
| 7,277,967 B2 | 10/2007 | Kao et al. | 710/18 | 2005/0257215 A1 | 11/2005 | Denby et al. | 717/172 |
| 7,289,887 B2 | 10/2007 | Rodgers | 700/295 | 2005/0286440 A1 | 12/2005 | Strutt et al. | 370/253 |
| 7,295,128 B2 | 11/2007 | Petite | 340/628 | 2006/0028355 A1 | 2/2006 | Patterson et al. | 340/870.02 |
| 7,301,476 B2 | 11/2007 | Shuey et al. | 340/870.03 | 2006/0056363 A1 | 3/2006 | Ratiu et al. | 370/338 |
| 7,304,587 B2 | 12/2007 | Boaz | 340/870.02 | 2006/0056368 A1 | 3/2006 | Ratiu et al. | 370/338 |
| 7,308,370 B2 | 12/2007 | Mason, Jr. et al. | 702/65 | 2006/0077906 A1 | 4/2006 | Maegawa et al. | 370/254 |
| 7,312,721 B2 | 12/2007 | Mason, Jr. et al. | 340/870.02 | 2006/0098576 A1 | 5/2006 | Brownrigg et al. | 370/238 |
| 7,315,257 B2 | 1/2008 | Patterson et al. | 340/870.02 | 2006/0098604 A1 | 5/2006 | Flammer, III et al. | 370/337 |
| 7,317,404 B2 | 1/2008 | Cumeralto et al. | 340/870.02 | 2006/0111111 A1 | 5/2006 | Ovadia | 455/439 |
| 7,321,316 B2 | 1/2008 | Hancock et al. | 340/870.02 | 2006/0158347 A1 | 7/2006 | Roche et al. | 340/870.02 |
| 7,327,998 B2 | 2/2008 | Kumar et al. | 455/405 | 2006/0167784 A1 | 7/2006 | Hoffberg | 705/37 |
| 7,346,463 B2 | 3/2008 | Petite et al. | 702/62 | 2006/0184288 A1 | 8/2006 | Rodgers | 700/295 |
| 7,348,769 B2 | 3/2008 | Ramirez | 324/158.1 | 2006/0215583 A1 | 9/2006 | Castagnoli | 370/254 |
| 7,349,766 B2 | 3/2008 | Rodgers | 700/295 | 2006/0215673 A1 | 9/2006 | Olvera-Hernandez | 370/406 |
| 7,362,709 B1 | 4/2008 | Hui et al. | 370/237 | 2006/0217936 A1 * | 9/2006 | Mason et al. | 702/188 |
| 7,366,113 B1 | 4/2008 | Chandra et al. | 370/255 | 2006/0271244 A1 | 11/2006 | Cumming et al. | 700/291 |
| 7,379,981 B2 | 5/2008 | Elliott et al. | 709/220 | 2006/0271678 A1 | 11/2006 | Jessup et al. | 709/224 |
| 7,397,907 B2 | 7/2008 | Petite | 379/155 | 2007/0001868 A1 | 1/2007 | Boaz | 340/870.02 |
| 7,406,298 B2 | 7/2008 | Luglio et al. | 455/90.3 | 2007/0013547 A1 | 1/2007 | Boaz | 340/870.02 |
| 7,427,927 B2 | 9/2008 | Borleske et al. | 340/870.02 | 2007/0019598 A1 | 1/2007 | Prehofer | 370/338 |
| 7,451,019 B2 | 11/2008 | Rodgers | 700/295 | 2007/0057767 A1 | 3/2007 | Sun et al. | 340/7.35 |

| | | | |
|---|---|---|---|
| 2007/0060147 A1 | 3/2007 | Shin et al. | 455/445 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0103324 A1 | 5/2007 | Kosuge et al. | 340/618 |
| 2007/0109121 A1 | 5/2007 | Cohen | 340/539.26 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068994 A1 | 3/2008 | Garrison et al. | 370/230 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0310311 A1 | 12/2008 | Flammer et al. | 370/238 |
| 2008/0310377 A1 | 12/2008 | Flammer et al. | 370/338 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo, III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | van Greunen et al. | 370/350 |
| 2010/0060259 A1 | 3/2010 | Vaswani et al. | 324/86 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |

FOREIGN PATENT DOCUMENTS

| | | |
|---|---|---|
| EP | 0 578 041 B1 | 11/1999 |
| EP | 0 663 746 B1 | 1/2003 |
| EP | 0 812 502 B1 | 8/2004 |
| EP | 0 740 873 B1 | 12/2005 |
| JP | 10-070774 | 3/1998 |
| JP | 10-135965 | 5/1998 |
| WO | WO 95/12942 | 5/1995 |
| WO | WO 96/10307 | 4/1996 |
| WO | WO 96/10307 A1 | 4/1996 |
| WO | WO 00/54237 | 9/2000 |
| WO | WO 2001/26334 A2 | 4/2001 |
| WO | WO 01/55865 A1 | 8/2001 |
| WO | WO 2008/027457 | 3/2008 |
| WO | WO 2008/033287 A2 | 3/2008 |
| WO | WO 2008/033514 A2 | 3/2008 |
| WO | WO 2008/092268 A1 | 8/2008 |

OTHER PUBLICATIONS

"Amron Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.

"AMRON Meter Management System" [online], [retrieved on May 12, 2005], 41 pp., Retrieved from the Internet: http://www.amronm5.com/products/.

International Search Report and Written Opinion for Application No. PCT/US08/12161, dated Mar. 2, 2009, 13 pp.

International Search Report and Written Opinion for Application No. PCT/US08/13017, dated Mar. 18, 2009, 11 pp.

International Search Report and Written Opinion for Application No. PCT/US08/13032, dated May 12, 2009, 14 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.
Reexamination Application No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking* (*MobiCom '98*), Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.
Katz, Randy H. and Brewer, Eric A., "The Case for Wireless Overlay Networks," *Electrical Engineering and Computer Science Department, University of California*, Berkeley, 12 pp., 1996.
Johnson, David B., "Routing in Ad Hoc Networks of Mobile Hosts," *IEEE*, pp. 158-163, 1995.
International Search Report and Written Opinion for Application No. PCT/US08/13027, dated Feb. 9, 2009, 6 pp.
International Search Report and Written Opinion for Application No. PCT/US08/13023, dated Jan. 12, 2009, 10 pp.
International Search Report and Written Opinion for Application No. PCT/US08/13019, dated Jan. 12, 2009, 13 pp.
International Search Report and Written Opinion for Application No. PCT/US08/13025, dated Jan. 13, 2009, 7 pp.
International Search Report and Written Opinion for Application No. PCT/US08/13018, dated Jan. 30, 2009, 9 pp.
International Search Report and Written Opinion for Application No. PCT/US08/13020, dated Jan. 9, 2009, 8 pp.
International Search Report and Written Opinion for Application No. PCT/US08/13028, dated Jan. 15, 2009, 9 pp.
International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
International Search Report and Written Opinion for Application No. PCT/US09/05008, dated Oct. 22, 2009, 8 pp.
Nachum Shacham, Edwin B. Brownrigg, & Clifford A. Lynch, *A Packet Radio Network For Library Automation*, 1987 IEEE Military Communications Conference, vol. 2 at 21.3.1, (Oct. 1987). (TN-IP 0004176-82).
Nachum Shacham & Janet D. Tornow, Future Directions in Packet Radio Technology, Proc. of the IEEE Infocom 1985 at 93 (Mar. 1985). (TN-IP 0005080-86), 17 pp.
John Jubin & Janet D. Tornow, The DARPA Packet Radio Network Protocols, Proc. of the IEEE, vol. 75, No. 1 at 21 (Jan. 87). (TN-IP 0004930-41).
John Jubin, Current Packet Radio Network Protocols, Proc. of the IEEE Infocom1985 at 86 (Mar. 1985), (TN-IP 0004921-29), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.
David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.
Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.
Robert E. Kahn, et al., Advances in Packet Radio Technology, Proc. of the IEEE, vol. 66,No. 11, pp. 1468-1496 (Nov. 1978), (TN-IP 0004942-71).

Clifford A. Lynch & Edwin B. Brownrigg, Packet Radio Networks, Bergamon Press, 259-74 (1987), (TN-IP 0004018-175).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), (TN-IP 0004988-93), 6 pp.
Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.
William S. Hortos, Application of Neural Networks to the Dynamic Spatial Distribution of Nodes within an Urban Wireless Network, SPIE, vol. 2492, p. 58-70, 1995.
Nachum Shacham and Richard G. Ogier, Network Control and Data Transport for C3I Applications, IEEE 1987, p. 30.5.1-6.
John E. Rustad, Reidar Skaug, and Andreas Aasen, New Radio Networks for Tactical Communication, IEEE Jornal on Selected Areas in Communications, vol. 8, No. 5, p. 713-27, Jun. 1990.
Barry M. Leiner, Donald L. Nielson, and Fouad A. Tobagi, Issues in Packet Radio Network Design, Proceedings of the IEEE, vol. 75, No. 1, p. 6-20, Jan. 1987.
Janet Tornow, Functional Summary of the DARPA SURAP1 Network, DARPA, Sep. 1986, 17 pp.
John F. Shoch and Lawrence Stewart, Interconnecting Local Networks via the Packet Radio Network, Sixth Data Communications Symposium, Nov. 1979, pp. 153-158.
J.R. Cleveland, Performance and Design Considerations for Mobile Mesh Networks, IEEE MILCOM 96, vol. 1, p. 245-49.
Cmdr. R. E. Bruninga, USN, A Worldwide Packet Radio Network, Signal, vol. 42, No. 10, p. 221-230, Jun. 1988.
Nachum Shacham and Janet Tornow, Packet Radio Networking, Telecommunications, vol. 20, No. 9, p. 42-48, 64, 82, Sep. 1986.
Spencer T. Carlisle, Edison's NetComm Project, IEEE 1989, Paper No. 89CH2709-4-B5, p. B5-1-B5-4.
Brian H. Davies and T.R. Davies, The Application of Packet Switching Techniques to Combat Net Radio, Proceedings of the IEEE, vol. 75, No. 1, p. 43-55, Jan. 1987.
Fouad A. Tobagi, Richard Binder, and Barry Leiner, Packet Radio and Satellite Networks, IEEE Communications Magazine, vol. 22, No. 11, p. 24-40, Nov. 1984.
M. Scott Corson, Joseph Macker, and Stephen G. Batsell, Architectural Considerations for Mobile Mesh Networking, IEEE MILCOM 96, vol. 1, p. 225-9.
K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.
J. Jonquin Garcia-Luna-Aceves, A Fail-Safe Routing Algorithm for Multihop Packet-Radio Networks, IEEE Infocom '86, p. 434-43, Apr. 8-10, 1986.
Johanes P. Tamtomo, A Prototype of TCP/IP-Based Internet-PRNET for Land Information Networks and Services, Department of Surveying Engineering, University of New Brunswick, Jan. 25, 1993, 118 pp.
A. Alwan, et al., Adaptive Mobile Multimedia Networks, IEEE Personal Communications, p. 34-51, Apr. 1996.
Michael Ball, et al., *Reliability of Packet Switching Broadcast Radio Networks*, IEEE Transactions on Circuits and Systems, vol. Cas-23, No. 12, p. 806-13 ,Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts*, Proceedings of the 16th ICDCS, p. 319-326, 1996.

Daniel Cohen, Jonathan B. Postel, and Raphael Rom, *Addressing and Routing in a Local Wireless Network*, IEEE INFOCOM 1992, p. 5A.3.1-7.

Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.

Jonathan J. Hahn and David M. Stolle, *Packet Radio Network Routing Algorithms: A Survey*, IEEE Communications Magazine, vol. 22, No. 11, p. 41-7, Nov. 1984.

David A. Hall, *Tactical Internet System Architecture for the Task Force XXI*, IEEE 1996, p. 219-30.

Robert Hinden and Alan Sheltzer, *The DARPA Internet Gateway*, DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.

David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.

David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.

Mark G. Lewis and J.J. Garcia-Luna-Aceves, *Packet-Switching Applique for Tactical VHF Radios*, 1987 IEEE Milcom Communciations Conference, Oct. 19-22, 1987, Washington, D.C., p. 21.2.1-7.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Charles E. Perkins and Pravin Bhagwat, *A Mobile Networking System Based on Internet Protocol*, IEEE Personal Communications, First Quarter 1994, IEEE 1994, p. 32-41.

Richard Schulman, Richard Snyder, and Larry J. Williams, *SINCGARS Internet Controller—Heart of the Digitized Battlefield*, Proceedings of the 1996 Tactical Communications Conference, Apr. 30-May 2, 1996, Fort Wayne, Indiana, p. 417-21.

Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/89, p. 367-382.

Jens Zander and Robert Forchheimer, *The Softnet Project: A Retrospect*, IEEE EUROCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-8.

Hydro One Networks, Inc., Request for Proposal for Smart Metering Services, 16 pp., Mar. 4, 2005.

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.

Lee, David J. Y., "Ricocheting Bluetooth," 2nd International Conference on Microwave and Millimeter Wave Technology Proceedings, ICMMT 2000, pp. 432-435, 2000.

Lilja, Tore, "Mobile Energy Supervision," Twenty-second International Telecommunications Energy Conference, 2000 INTELEC, pp. 707-712, 2000.

Parkka, Juha, et al., "A Wireless Wellness Monitor for Personal Weight Management," Proceedings of the 2000 IEEE EMBS International Conference on Information Technology Applications in Biomedicine, pp. 83-88, 2000.

Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.

Privat, G., "A System-Architecture Viewpoint on Smart Networked Devices," Microelectronic Engineering, vol. 54, Nos. 1-2, pp. 193-197, Dec. 2000.

Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.

Kapoor, R., et al., "Multimedia Support Over Bluetooth Piconets," First Workshop on Wireless Mobile Internet, pp. 50-55, Jul. 2001.

Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.

Lim, A., "Distributed Services for Information Dissemination in Self-Organizing Sensor Networks," Journal of the Franklin Institute, vol. 338, No. 6, pp. 707-727, Sep. 2001.

Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.

Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.

Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.

* cited by examiner

*Primary Examiner* — Eric M Blount

(74) *Attorney, Agent, or Firm* — Dawn-Marie Bey; King & Spalding LLP

(57) ABSTRACT

When a metering coupled to a network loses its primary power source and has a secondary power source, such as a super-capacitor, it recognizes and reports a power outage. In this case, the head end server may verify the power outage report by querying through the downstream nodes coupled to the network about the power outage. When a node loses its primary power source and has no secondary power source, it will fail to make a regularly scheduled report at the appropriate time. Consequently, the head end server verify the power outage by polling downstream nodes coupled to the HAN about the power outage to deduce whether a power outage.

30 Claims, 24 Drawing Sheets

SYSTEM AND METHOD FOR FALSE ALERT FILTERING OF EVENT MESSAGES WITHIN A NETWORK

CROSS-REFERENCE TO CO-PENDING APPLICATIONS

This application claims the benefit of priority to the following United States provisional patent applications which are incorporated herein by reference in their entirety:

Ser. No. 60/989,957 entitled "Point-to-Point Communication within a Mesh Network", filed Nov. 25, 2007;

Ser. No. 60/989,967 entitled "Efficient And Compact Transport Layer And Model For An Advanced Metering Infrastructure (AMI) Network," filed Nov. 25, 2007;

Ser. No. 60/989,958 entitled "Creating And Managing A Mesh Network Including Network Association," filed Nov. 25, 2007;

Ser. No. 60/989,964 entitled "Route Optimization Within A Mesh Network," filed Nov. 25, 2007;

Ser. No. 60/989,950 entitled "Application Layer Device Agnostic Collector Utilizing ANSI C12.22," filed Nov. 25, 2007;

Ser. No. 60/989,953 entitled "System And Method For Real Time Event Report Generation Between Nodes And Head End Server In A Meter Reading Network Including From Smart And Dumb Meters," filed Nov. 25, 2007;

Ser. No. 60/989,956 entitled "System And Method For False Alert Filtering Of Event Messages Within A Network," filed Nov. 25, 2007;

Ser. No. 60/989,975 entitled "System and Method for Network (Mesh) Layer And Application Layer Architecture And Processes," filed Nov. 25, 2007;

Ser. No. 60/989,959 entitled "Tree Routing Within a Mesh Network," filed Nov. 25, 2007;

Ser. No. 60/989,961 entitled "Source Routing Within a Mesh Network," filed Nov. 25, 2007;

Ser. No. 60/989,962 entitled "Creating and Managing a Mesh Network," filed Nov. 25, 2007;

Ser. No. 60/989,951 entitled "Network Node And Collector Architecture For Communicating Data And Method Of Communications," filed Nov. 25, 2007;

Ser. No. 60/989,955 entitled "System And Method For Recovering From Head End Data Loss And Data Collector Failure In An Automated Meter Reading Infrastructure," filed Nov. 25, 2007;

Ser. No. 60/989,952 entitled "System And Method For Assigning Checkpoints To A Plurality Of Network Nodes In Communication With A Device Agnostic Data Collector," filed Nov. 25, 2007;

Ser. No. 60/989,954 entitled "System And Method For Synchronizing Data In An Automated Meter Reading Infrastructure," filed Nov. 25, 2007;

Ser. No. 60/992,312 entitled "Mesh Network Broadcast," filed Dec. 4, 2007;

Ser. No. 60/992,313 entitled "Multi Tree Mesh Networks", filed Dec. 4, 2007;

Ser. No. 60/992,315 entitled "Mesh Routing Within a Mesh Network," filed Dec. 4, 2007;

Ser. No. 61/025,279 entitled "Point-to-Point Communication within a Mesh Network", filed Jan. 31, 2008;

Ser. No. 61/025,270 entitled "Application Layer Device Agnostic Collector Utilizing Standardized Utility Metering Protocol Such As ANSI C12.22," filed Jan. 31, 2008;

Ser. No. 61/025,276 entitled "System And Method For Real-Time Event Report Generation Between Nodes And Head End Server In A Meter Reading Network Including Form Smart And Dumb Meters," filed Jan. 31, 2008;

Ser. No. 61/025,288 entitled "System And Method For False Alert Filtering Of Event Messages Within A Network," filed Jan. 31, 2008;

Ser. No. 61/025,282 entitled "Method And System for Creating And Managing Association And Balancing Of A Mesh Device In A Mesh Network," filed Jan. 31, 2008;

Ser. No. 61/025,271 entitled "Method And System for Creating And Managing Association And Balancing Of A Mesh Device In A Mesh Network," filed Jan. 31, 2008;

Ser. No. 61/025,287 entitled "System And Method For Operating Mesh Devices In Multi-Tree Overlapping Mesh Networks", filed Jan. 31, 2008;

Ser. No. 61/025,278 entitled "System And Method For Recovering From Head End Data Loss And Data Collector Failure In An Automated Meter Reading Infrastructure," filed Jan. 31, 2008;

Ser. No. 61/025,273 entitled "System And Method For Assigning Checkpoints to A Plurality Of Network Nodes In Communication With A Device-Agnostic Data Collector," filed Jan. 31, 2008;

Ser. No. 61/025,277 entitled "System And Method For Synchronizing Data In An Automated Meter Reading Infrastructure," filed Jan. 31, 2008; and Ser. No. 61/094,116 entitled "Message Formats and Processes for Communication Across a Mesh Network," filed Sep. 4, 2008.

This application hereby references and incorporates by reference each of the following United States patent applications filed contemporaneously herewith:

Ser. No. 12/275,236 entitled "Point-to-Point Communication within a Mesh Network", filed Nov. 21, 2008;

Ser. No. 12/275,305 entitled "Efficient And Compact Transport Layer And Model For An Advanced Metering Infrastructure (AMI) Network, filed Nov. 21, 2008;

Ser. No. 12/275,238 entitled "Communication and Message Route Optimization and Messaging in a Mesh Network," filed Nov. 21, 2008;

Ser. No. 12/275,242 entitled "Collector Device and System Utilizing Standardized Utility Metering Protocol," filed Nov. 21, 2008; and Ser. No. 12/275,252 entitled "Method and System for Creating and Managing Association and Balancing of a Mesh Device in a Mesh Network," filed Nov. 21, 2008; and Ser. No. 12/275,257 entitled "System And Method For Operating Mesh Devices In Multi-Tree Overlapping Mesh Networks", filed Nov. 21, 2008.

TECHNICAL FIELD

The following relates generally to reporting of events within an advanced metering infrastructure and more particularly to verifying the reporting of a power outage event within an advanced metering infrastructure.

BACKGROUND OF THE INVENTION

In conventional AMI systems, the system head end server deduces that a power outage has occurred at one or more nodes when it does not receive reports from the nodes during a scheduled time window for an expected communication. Nodes do not monitor their power supply sources nor do they actively report power outages. Therefore, a need exists for an advanced metering infrastructure (AMI), the system measures, collects, and analyzes usage of utilities such as electricity, gas, and water, through the use of advanced metering devices, two-way communication networks, and data management systems.

SUMMARY OF THE INVENTION

When a node coupled to a network loses its primary power source and has a secondary power source, such as a supercapacitor, the node recognizes and reports a power outage. In this case, the head end server may verify the power outage report by querying through the downstream nodes coupled to the network about the power outage. When a node loses its primary power source and has no secondary power source, it will fail to make a regularly scheduled report at the appropriate time. Consequently, the head end server verifies the power outage by polling downstream nodes coupled to the HAN about the power outage to deduce whether a power outage has occurred. Alternatively, the polling of devices in the HAN could be initiated by a meter as soon as the meter perceives an outage, even before the meter alerts the head-end, as a cross-check on itself regarding the perceived outage.

In one aspect, there is provided a method of confirming a power outage report comprising: receiving the power outage report from a first node coupled to a first network; querying one or more other nodes coupled to the first network about a power outage; receiving one or more responses from the one or more other nodes coupled to the first network; and determining whether the power outage report is false based on the one or more responses from the one or more other nodes in the first network.

In another aspect, there is provided a system for confirming a power outage report comprising: a first node coupled to a first network, wherein the first node comprises a meter, a register, and a communications module, and further wherein the first node transmits the power outage report through the first network to a microportal; one or more other nodes coupled to the first network; the microportal for relaying the power outage report through a second network to a collector; the collector for relaying the power outage report through a third network to a head end server; and the head end server for receiving the power outage report and querying the one or more other nodes about a power outage.

In another aspect, there is provided a method of verifying a power outage comprising: failing to receive a report from a first node coupled to a first network at a prescheduled reporting time window; polling one or more other nodes coupled to the first network about a power outage; and determining whether the power outage exists based on responses from the one or more other nodes.

In another aspect, there is provided a system for verifying a power outage report comprising: a first node coupled to a first network, wherein the first node comprises a meter, a register, and a communications module, and further wherein the first node fails to transmit a report at a prescheduled reporting time window to a head end server; the head end server for polling one or more other nodes coupled to the first network about a power outage and determining whether the power outage exists based on responses from the one or more other nodes.

In another aspect, there is provided a method of recovering untransmitted information stored at a node reporting a power outage, comprising: receiving a power outage report from the node; transmitting a request to download all untransmitted information from the node; and receiving the untransmitted information from the node.

In another aspect, there is provided a system of recovering untransmitted information stored at a node reporting a power outage, comprising: the node receiving for transmitting a power outage report; a head end server for: receiving the power outage report; transmitting a request to download all untransmitted information from the node; and receiving the untransmitted information from the node.

In another aspect, there is provided a computer program product stored in a computer readable media for execution in a processor and memory coupled to the processor for performing a method of confirming a power outage report comprising: receiving the power outage report from a first node coupled to a first network; querying one or more other nodes coupled to the first network about a power outage; and receiving one or more responses from the one or more other nodes coupled to the first network; and determining whether the power outage report is false based on the one or more responses from the one or more other nodes in the first network.

In another aspect, there is provided a computer program product stored in a computer readable media for execution in a processor and memory coupled to the processor for performing a method of verifying a power outage comprising: failing to receive a report from a first node coupled to a first network at a prescheduled reporting time window; polling one or more other nodes coupled to the first network about a power outage; and determining whether the power outage exists based on responses from the one or more other nodes.

In another aspect, there is provided a computer program product stored in a computer readable media for execution in a processor and memory coupled to the processor for performing a method of recovering untransmitted information stored at a node reporting a power outage, comprising: receiving a power outage report from the node; transmitting a request to download all untransmitted information from the node; and receiving the untransmitted information from the node.

This Summary introduces concepts in a simplified form that are described more fully below in the Detailed Description. This Summary is not intended to identify key or essential features of the claimed subject matter, nor is it intended to be used to limit the scope of the claimed subject matter.

BRIEF DESCRIPTION OF THE DRAWINGS

Examples of a false alert filtering system and method are illustrated in the figures. However, the examples and figures are illustrative rather than limiting. The false alert filtering system and method are limited only by the claims.

DETAILED DESCRIPTION OF THE INVENTION

Described in detail below is a system, device, method and computer program product to filter power outage reports generated at a node of a Home Area Network (HAN) or other network to determine if the power outage is real or not. Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Section headers and/or sub-headers are provided merely to guide the reader and are not intended to limit the scope of the invention in any way. Aspects, features, and elements of the invention and of embodiments of the invention are described throughout the written description and the drawings and claims.

Exemplary Network Topology

In accordance with at least one non-limiting embodiment, an advanced metering infrastructure (AMI) network may span large geographical areas. In order to provide communications between nodes at a utility user's site and the head end server of the utility which processes usage data, the AMI may advantageously include, but is not limited to, the following elements: a head end server 160, also referred to as a system head end server, server, head end, or back end; a wide area network 110; a mesh gate 140, also referred to as a NAN-WAN gate or an access point; a neighborhood area network or NAN 120; and a microportal 150 which may more generically be referred to as a micro access portal for a residential premise or a home area network (HAN). A microportal device that is supported by the ZigBee Alliance is referred to as an energy service portal (ESP), however the ESP utilizes a different protocol. An AMI network may include one or more of any of these network elements, some of which are optional.

Figure 1:
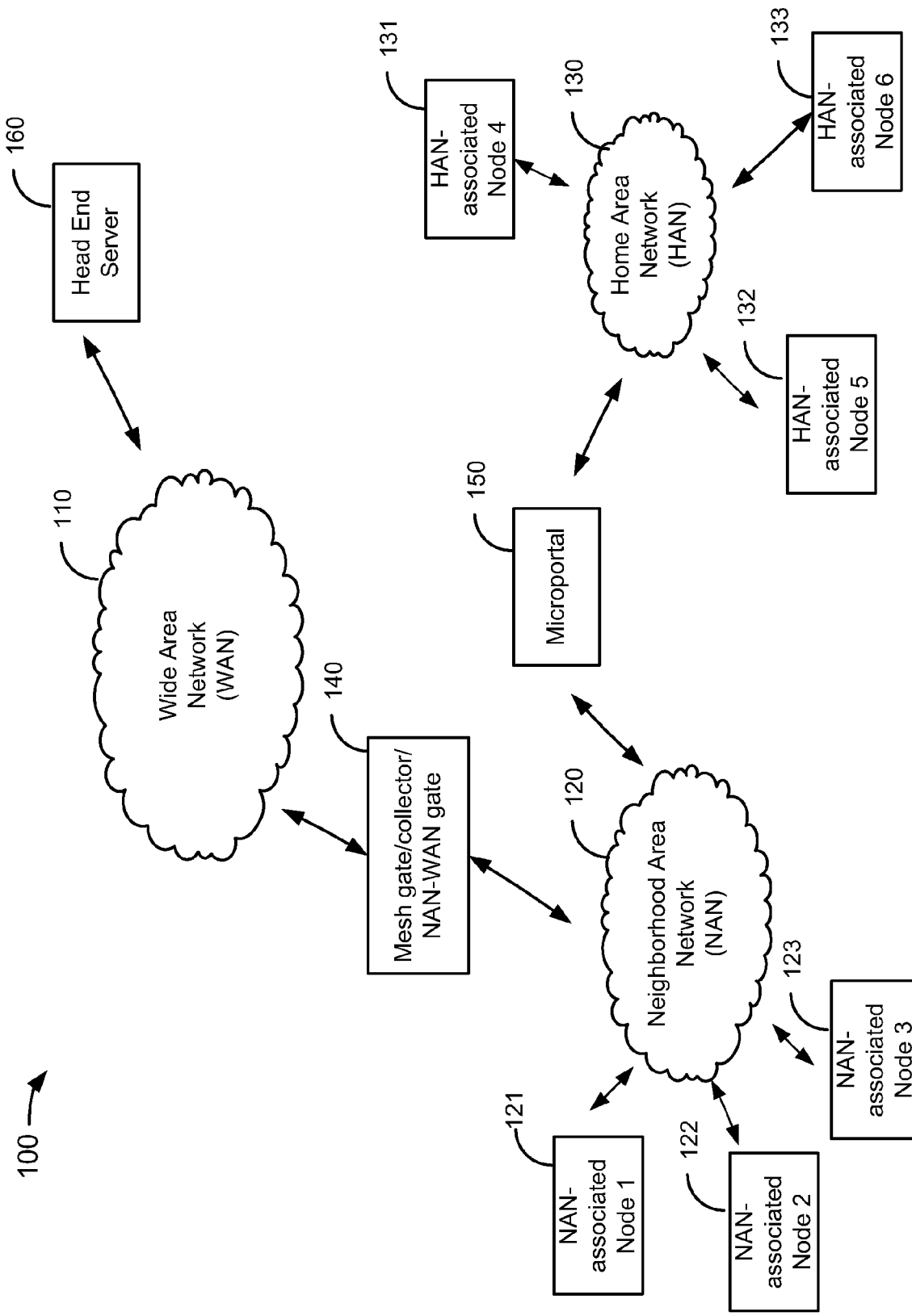
FIG. 1 is an illustration showing a non-limiting exemplary embodiment of a network topology that may be used in conjunction with aspects of the invention.

In the example of FIG. 1, one exemplary non-limiting embodiment of an AMI network topology 100 is shown. This example of an AMI network includes three networks (or sub-networks), a wide area network (WAN) 110, a neighborhood area network (NAN) 120 sometimes also referred to as a local area network (LAN), and a home area network (HAN) 130 sometimes also referred to as a premise area network (PAN). The WAN 110 typically uses TCP/IP communications protocol and provides a way for the head end server 160 to communicate with the mesh gate 140 or NAN-WAN gate. It may be appreciated that the head end server may be one or multiple computers and more usually multiple computers operating together to provide capacity and redundancy. The head end server hardware and connectivity may be any hardware and connectivity known in the art or convenient. The NAN 120 may advantageously and typically adhere to IEEE 802.15.4 protocol and provides a way for a mesh gate 140 to communicate with NAN-associated nodes 121, 122, 123 in its sub-network or microportals 150 that are serviced by the NAN 120; however, other different protocols may be utilized. The HAN 130 uses a communications protocol, such as for example a protocol established by the ZigBee Alliance and provides communications between a microportal 150 and HAN-associated nodes 131, 132, 133 that are serviced by the HAN 130. The ZigBee Alliance is an association of companies working to enable reliable, cost-effective, low-power, wirelessly networked, monitoring and control products based on an open global standard. The ZigBee Alliance focuses on defining the network, security, and application software layers, providing interoperability and conformance testing specifications, promoting the ZigBee brand globally to build market awareness, and managing the evolution of the technology. Further information about the ZigBee Alliance may be obtained at www.zigbee.org/en/about/. It will be apparent to a person of skill in the art that more nodes (or fewer nodes)

than those shown in FIG. 1 may be serviced by the NAN and the HAN. In fact, hundreds or thousands of nodes may communicate over a single NAN, and this will typically be the case for actual AMI infrastructures and systems.

Various communications protocols may be supported and used by the elements of the AMI network 100 to communicate over the WAN 110, the NAN 120, and the HAN 130. However, it will be appreciated that for purposes of convenience, specific examples of communications protocols and standards may be indicated, particularly for aspects of the invention relative to a device-agnostic-collector.

Figure 2A:
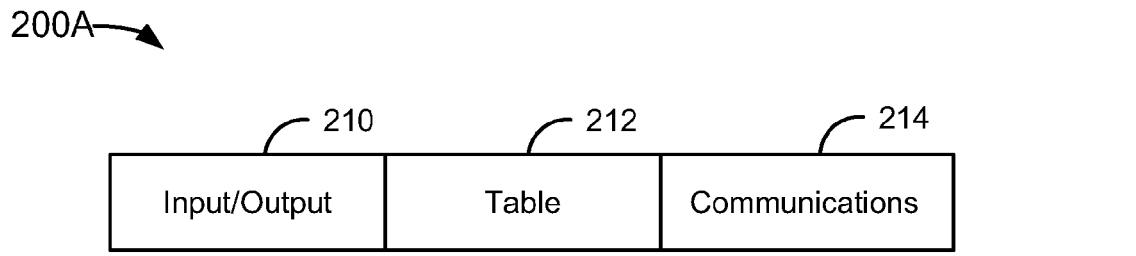
FIGS. 2A and 2B show two examples of block diagrams of an exemplary node, according to an aspect of the invention.

NAN-associated nodes serviced by a NAN 121, 122, 123 communicate with a mesh gate 140 or NAN-WAN gate through the NAN 120. Nodes may, for example, include a utility meter for a residential or commercial site or a utility-measuring device or a utility consumption device which includes, but is not limited to, thermostats and appliances within the residential or commercial site. FIG. 2 shows two examples of block diagrams of an exemplary node. FIG. 2A illustrates a functional block diagram 200A of an exemplary generic node, and FIG. 2B illustrates an electrical block diagram 200B of an exemplary node.

With reference to FIG. 2A, the block diagram 200A shows three functional blocks of an exemplary generic node 121, 122, 123, 131, 132, 133: an input/output device 210, a table 212, and a communications unit 214. For example, if the node 121, 122, 123, 131, 132, 133 has a utility consumption and/or monitoring device such as a thermostat, then the input/output device 210 might comprise a keyboard or keypad for operating or enabling different display screens, for selecting different items to display, for controlling the thermostat, and for otherwise providing an interaction. Other input/output devices such as voice command input and speakers or other human interface devices may alternatively or additionally be utilized. Table 212 would correspond to data structures compiled by the thermostat based upon temperature readings, and the communications unit 214 would be the means with which the node communicates with the collector (such as for example with a mesh gate) using ANSI C12 protocol or other protocols that may be implemented, such as a communications card.

Alternatively, if the node 121, 122, 123, 131, 132, 133 has a utility sensing device such as a utility meter, the input/output device 210 may comprise a sensor for detecting utility usage. Table 212 may comprise registers in which the sensor data is stored, and communications unit 214 may comprise a communications card by which the meter at the node communicates with a collector.

Figure 2B:
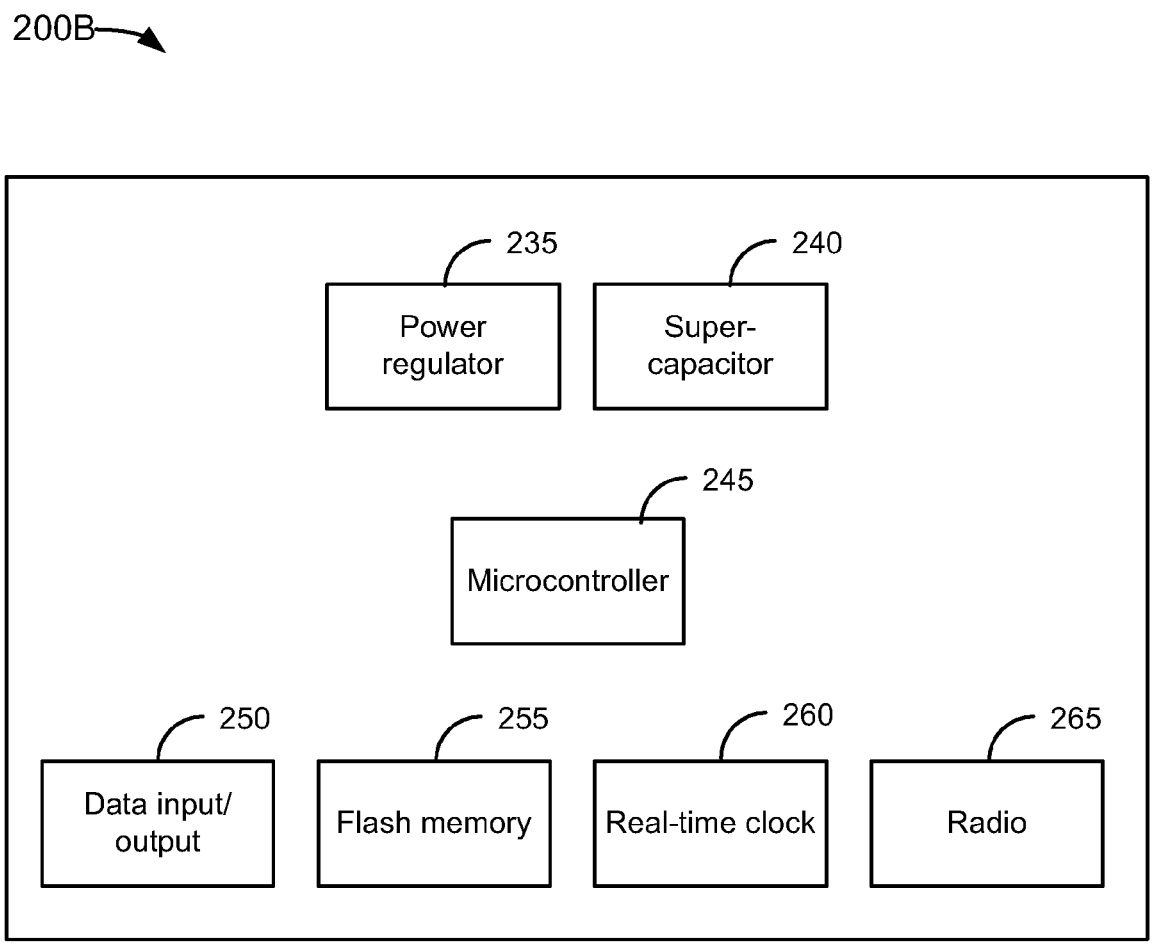

With reference to FIG. 2B, the electrical block diagram 200B is representative of an exemplary node 121, 122, 123, 131, 132, 133 which includes a power regulator 235, an energy storage device 240 such as a super-capacitor, a microcontroller 245, a data input/output device or module 250, a flash memory 255, a real-time clock 260, and a radio 265.

The power regulator 235 may regulate the primary power supply for the node as well as the energy provided by the energy storage device 240 which acts as a temporary back-up or secondary power supply should the main power supply experience an outage.

The energy storage device 240 is a secondary power supply that provides the node with least a few extra minutes of power so that it can transmit previously un-transmitted reports to the collector. In some embodiments, the node may not include an energy storage device 240.

The energy storage device 240 may be a battery, a capacitor, or a small, compact but high capacity super-capacitor. Battery power supplies may be used, but these are not advantageous as they have limited lifetimes and would require field servicing. Capacitors on the other hand may provide practically unlimited lifetime and provide a power source that is sufficient to maintain operation and transmit information to the collector when charged even if the normal power is interrupted. In one non-limiting embodiment of the invention, a super capacitor has a storage capacity of 50 farads with a starting output voltage of 2.7 volts and a physical package that is cylindrical with a diameter of 18 mm and a length of 40 mm. A super capacitor of this type is made by NESSCAP Co., Ltd. in Soowon, Korea and may be used.

The microcontroller 245 controls the functions of the node including, but not limited to, creating reports from data taken by the sensor, transmitting reports to the collector, and responding to queries by the head end server or the collector. The microcontroller 245 may be implemented as one unit or as a plurality of or several units, with each unit controlling one (or even more than one) of the functional aspects of the node when plural units are provided, the input/output device 210, the table 212, and the communications unit 214. Other non-limiting embodiments may distribute functional aspects of the node to a plurality of units, and the division of functions may be in any combination.

The data input/output device 250 in the electrical block diagram 200B of FIG. 2B has similar functionality as the input/output device 210 as described for the functional block diagram 200A of FIG. 2A.

The non-volatile flash memory 255 stores reports and other data which the node does not want to lose if both the main power supply and any secondary power supply should fail including when the capacitor or super-capacitor may not store sufficient energy to carry out intended operations.

If the one or more power supplies to the node should fail, the real-time clock 260 receiving power from an internal capacitor during this time acts as a counter to determine how much time elapsed between the time the power supplies to the node ceased providing power until the restoration of power. Consequently, upon restoration of power, the node can return to normal operations such as taking data at scheduled intervals and transmitting reports to the collector as scheduled. In one embodiment, the real-time clock may continue to count and provide information regarding elapsed time for between for up to 14 days when a 1 microfarad capacitor is employed.

Figure 3:
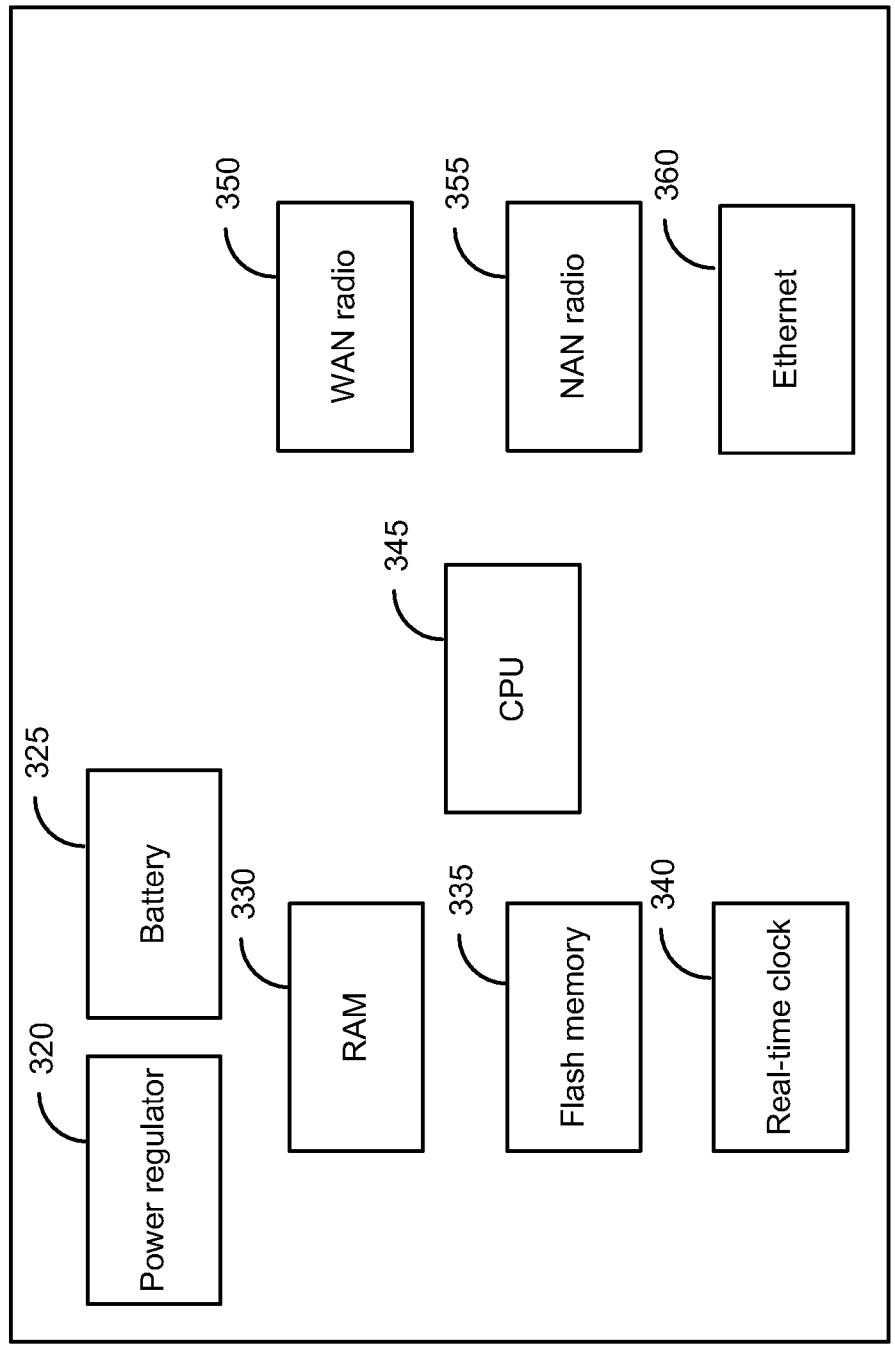
FIG. 3 shows an example of an electrical block diagram of an exemplary mesh gate or collector, according to an aspect of the invention.

The radio 265 provides a means by which the NAN-associated node 121, 122, 123 communicates with the collector 140 and other NAN-associated nodes 121, 122, 123 through the NAN using a communications protocol, such as the afore described IEEE 802.15.4 and ANSI C12 protocols or other regional, international, or ISO protocols. Alternatively, the radio 265 provides a means by which the HAN-associated node 131, 132, 133 communicates with the microportal 150 and other HAN-associated nodes 131, 132, 133 through the HAN using a communications protocol, such as the afore described ZigBee Alliance protocols or other regional, international, or ISO protocols. The radio 265 includes both a transmitter for transmitting data packets and a receiver for receiving data packets FIG. 3 is an illustration showing an example of an electrical block diagram 300 for an access point such as a NAN-WAN gate and also described as a mesh gate 140 in this and in related applications. The terms may be used interchangeably. The mesh gate or NAN-WAN gate may perform any one or more of many different functions including for example, but not limited to, one or any combination of: relaying information from a server (such as from a head end server) to the mesh network nodes, routing information, collecting information from the nodes and microportals within any sub-network that may be configured for transmission to a server (such as to the head end server), acting as a HAN coordinator, acting as a NAN-WAN gate, transmitting firmware upgrades, and/or multicasting messages. A mesh gate 140 may be referred to herein as a collector when focusing upon the mesh gate's collector function because among the mesh gate's many functions, it collects information from the NAN-associated nodes 121, 122, 123 and/or microportals 150 in its sub-network.

While a second access point's sub-network, such as a second mesh gate's sub-network, may overlap the geographical area of a first mesh gate's sub-network, each node and microportal is advantageously only associated with a single mesh gate at any given time, where association is a relationship that enables communication of information between two associated entities and may optionally comport with the ANSI protocols for association. In at least one non-limiting embodiment, this or these associations may change over time. Each mesh gate's network advantageously operates at a different radio frequency (RF) from other mesh gate's networks which may be either overlapping in extent or nearby. The NAN-associated nodes 121, 122, 123 communicate with the mesh gate 140 through the Neighborhood-Area Network (NAN) 120, and the head end server 160 communicates with the mesh gate 140 through the Wide-Area Network (WAN) 110.

Although the example AMI network 100 only shows one mesh gate 140, in an alternative, any number of mesh gates 140 may be deployed. The mesh gate 140 may provide a gateway between the NAN network 120 and the head end server 160.

The mesh gate 140 includes a central processing unit (CPU) 345 or other processor or processing logic and coupled memory, a WAN radio 350, a NAN radio 355, at least one and advantageously multiple communication connections such as Ethernet connections 360, Random Access Memory (RAM) 330, flash or other non-volatile memory 335, a real-time clock 340, an optional power regulator 320 where power regulation may be advantageous, and a battery 325 or other energy storage means. The mesh gate 140 communicates with the NAN-associated nodes 121, 122, 123 and microportal 150 through the NAN radio 355 using a communications protocol such as IEEE 802.15.4 and ANSI C12 communications protocol or other protocols as may be implemented.

The NAN radio 355 includes both a transmitter or other means for transmitting data packets and a receiver or other means for receiving data packets.

The WAN radio 350, which advantageously operates under TCP/IP protocol but which may use other standard or non-standard or proprietary protocol, is used to communicate with the head end server 160 through the WAN 110. The WAN radio 350 includes both a transmitter or other means for transmitting data packets and a receiver or other means for receiving data packets. The mesh gate's CPU or other processor or processing logic 345 runs applications, such as one or more application functions for making information queries of data from the nodes, storing the data received from the nodes in memory, processing data aggregated from various nodes, and sending commands and messages from the head end server to the nodes, among other functions. The CPU or other processor or processing logic 345 may communicate with other devices or systems, such as with computers and/or servers through the Ethernet or other connections 360.

The flash or other non-volatile memory 335 stores reports and/or other data which the mesh gate 140 does not want to lose if both the main power supply and any secondary power supply such as the battery 325 or other storage means should fail or become exhausted. The Random Access Memory (RAM) 330 may be a volatile memory storage used by and coupled with the CPU or other processor or processing logic 345 as is known in the art.

The power regulator 320 regulates the primary power supply for the mesh gate 140. If the one or more power supplies to the mesh gate should fail, the real-time clock 340 acts as a counter to determine how much time elapsed between the time the power supplies to the mesh gate ceased providing power until the restoration of power, thus allowing the mesh gate to return to normal operations upon restoration of power.

A mesh gate or collector 140 may be placed at many different locations including, but not limited to, on a street light, on a telephone pole, at a socket behind a utility meter, and/or at virtually any location at which it has access to electrical power. The collector 140 aggregates and stores information from the NAN-associated nodes 121, 122, 123 and microportal 150 for transmission to the head end server 160 and also provides communications between the NAN-associated nodes 121, 122, 123 and microportal 150 and the head end server 160. Essentially, the last several hundred meters of the AMI infrastructure farthest from the head end server 160 and closest to the utility's customers are advantageously served and controlled by a collector 140.

HAN-associated nodes 131, 132, 133, advantageously serviced by the HAN 130, communicate with a microportal 150 through the HAN 130. A microportal 150 is located between a HAN 130 and a NAN 120 but need not share a node with a meter. Microportals 150 typically communicate with the HAN-associated nodes 131, 132, 133 within the premises (residence or commercial premises) of one customer, and multiple microportals may be present within one collector's sub-network. The restriction to a single premise may be for reasons of security, regulatory requirements, or for other reasons. Signals received by a microportal 150 through the NAN 120 from the collector 140 are distributed to the appropriate HAN-associated node through the HAN 130, and signals received by a microportal 150 through the HAN 130 from the HAN-associated nodes 131, 132, 133 are distributed to the collector 140 through the NAN 120 for transmission to the head end server 160. For example, if a utility wants to send a text or other message to a home display of one of the utility's users, the head end server 160 sends the text or other message to the collector 140 on the appropriate sub-network to which the user's home display device is coupled. The collector 140 transmits the text message through the NAN 120 to the appropriate microportal 150 which communicates with the intended recipient of the message. The microportal 150 will know if one or more displays are present in the home and distribute the message to those displays. The locations of the displays in the user's home include, but are not limited to, a thermostat or an in-home display device. A thermostat may conveniently be utilized as at least one such thermostat may typically be present in every residence or premises.

Figure 4:
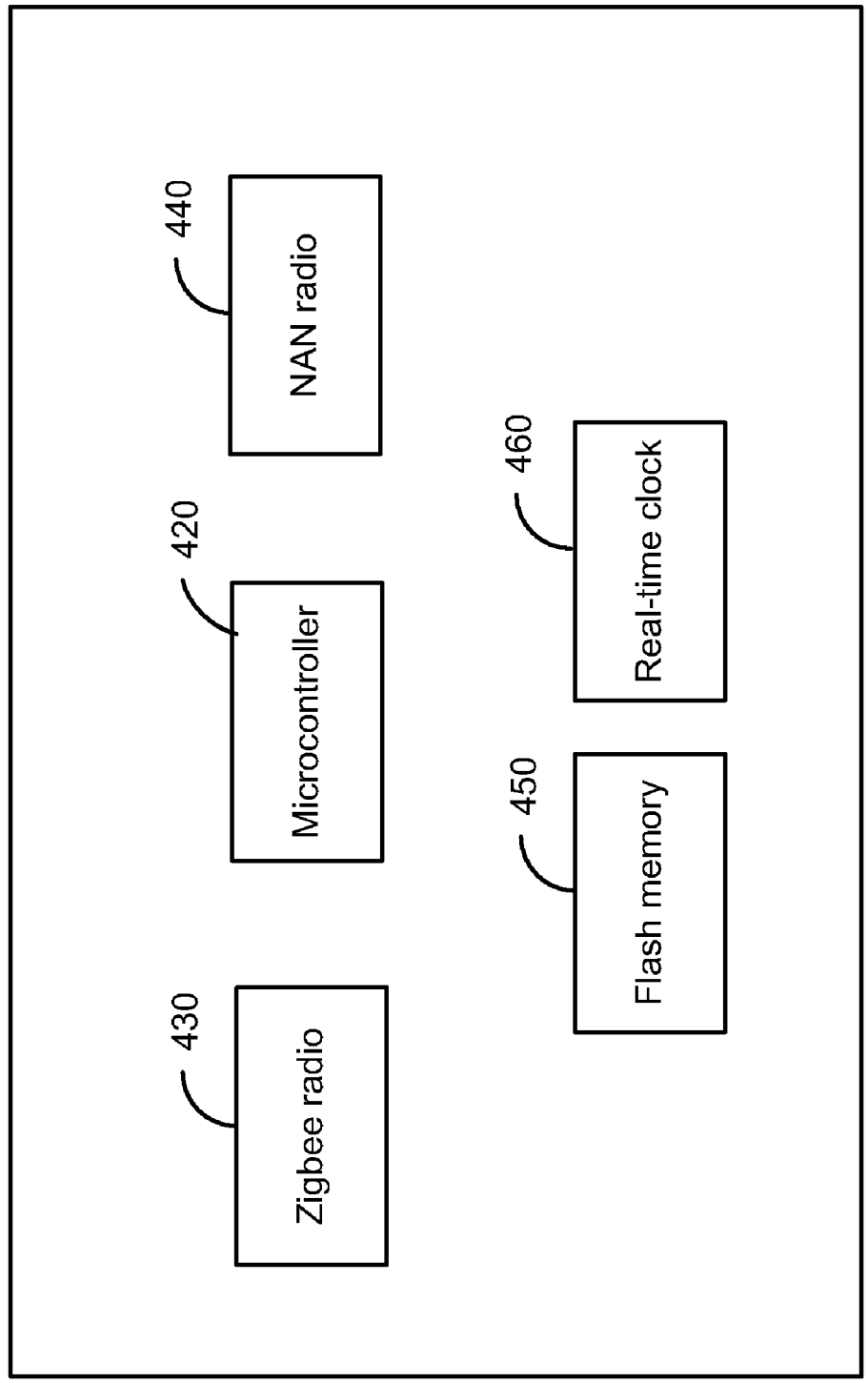
FIG. 4 shows an example of an electrical block diagram of an exemplary microportal, according to an aspect of the invention.

FIG. 4 shows an example of an electrical block diagram 400 of an exemplary microportal 150. A microportal is a control device that receives control commands from the head end server 160 and/or mesh gate 140 using a first protocol and translates the control commands and provides some contextual distribution to the HAN-associated notes 131, 132, 133 in a second protocol. The microportal 150 may include a microcontroller 420, a first radio such as a ZigBee radio 430, a second radio such as a non-Zigbee radio such as a mesh NAN radio (or a WAN radio or a PAN radio) 440, a flash memory or other non-volatile memory 450, and a real-time clock 460 or other device for counting or measuring an elapsed time. The microportal 150 communicates with the collector 140 through the second or NAN radio (or a WAN radio) 440 using IEEE 802.15.4 and ANSI C12 communications protocol or other standard communications protocols as may be known in the art. The NAN radio 440 includes both a transmitter for transmitting data packets and a receiver for receiving data packets. The first or ZigBee radio 430, which operates under the first communications standards, such as for example the ZigBee Alliance communication standards, is used to communicate with HAN-associated nodes 131, 132, 133 coupled to the HAN 130. The ZigBee radio 430 includes both a transmitter for transmitting data packets and a receiver for receiving data packets.

It may be appreciated that in one non-limiting embodiment the two radio configuration may include one Zigbee type radio operating at its radio frequency and according to its protocol, as well as a second non-Zigbee radio that operates over the selected HAN, NAN, or WAN frequency and protocol.

The microcontroller 420 runs or executes applications for the microportal 150 which may include, but are not limited to, transmitting messages from the HAN-associated nodes 131, 132, 133 on the HAN 130 to the collector 140, and transmitting messages from the collector 140 to HAN-associated nodes 131, 132, 133 on the HAN 130. The flash or other non-volatile memory 450 stores reports and other data which the microportal does not want to lose if its power supply should fail or become exhausted. If the power supply should fail, the real-time clock 460 acts as a counter to determine how much time elapsed between the time the power supply to the microportal 150 ceases providing energy or power until the restoration of energy or power. Thus, the microportal 150 returns to normal operations upon restoration of power.

In one embodiment, the microportal may share the same location and primary power source as a node coupled to the HAN 131, 132, 123, such as a meter or thermostat for the residential or commercial site. In this case, a single radio (or so called single-sided radio) of the node may be replaced by a dual-radio (also referred to as a two-sided radio) in order to convert the node to a microportal without having to write new firmware or implement new hardware. The functionality of the microportal at the node is or may be hidden from the hosting device and the hosting device need not have this knowledge. A normal single sided radio may be replaced by a portal radio (also referred to as a micro access portal). In one non-limiting embodiment, the two radios of the dual radio may be on the same side or on different sides of a common communication card or circuit PC board. In one non-limiting embodiment, a portal is a radio plus or in combination with a portal application processing logic, processor, or CPU. More generally, a portal, micro-portal, micro access portal and the like is a node on the mesh network.

Alternatively, the microportal may be a stand-alone device in a location separate from any other node. In this embodiment, the microportal would not reside topologically at any of the nodes coupled to the HAN 131, 132, 123. That is, the microportal 150 would have a different address from all other nodes serviced by the HAN. Thus, if any of the HAN-associated nodes coupled to the HAN 131, 132, 133 experiences a power outage, the other nodes may still communicate with the collector 140 and head end server 160 through the microportal 150.

Figure 5:
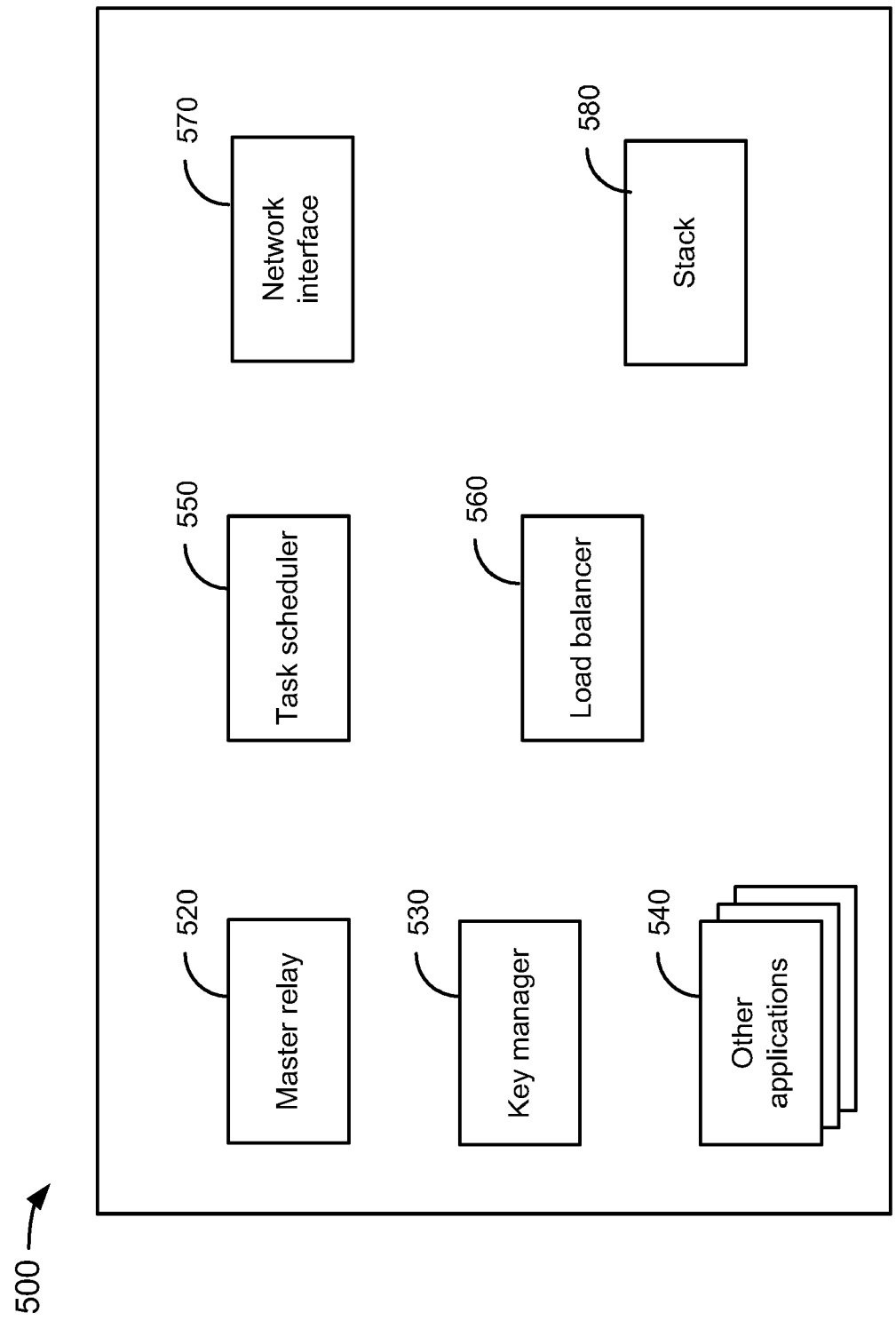
FIG. 5 shows an example of an electrical block diagram of a head end server, according to an aspect of the invention.

The head end server 160 of the system is responsible for processing usage data received from the NAN-associated and HAN-associated nodes 121, 122, 123, 131, 132, 133 through the collector 140. FIG. 5 shows an example of a functional block diagram 500 for a head end server 160. Although the example AMI network 100 only shows one head end server 160, in an alternative embodiment, any number of head end servers 160 may be deployed. For example, the head end servers 160 may be distributed by geographical location for shorter communication distances and latency times. Alternatively and in addition, each utility accessing the AMI network may have one or more head end servers 160.

The head end server 160 may be one or a plurality of computing device(s) configured to receive information, such as meter readings, from a plurality of networks 100 and NAN-associated and HAN-associated nodes 121, 122, 123, 131, 132, 133. Typically the head end server 160 may be one or multiple computers and more usually multiple computers operating together to provide capacity and redundancy. The head end server 160 may also be configured to transmit instructions to the networks 100, mesh gates 140, and nodes 121, 122, 123, 131, 132, 133. The head end server 160 includes application programs for a master relay 520, a key manager 530, a task scheduler 550, a load balancer 560, running a stack 580, and other applications 540 which perform typical server functions not required to enable the current invention. The head end server 160 also includes a network interface 570. In one non-limiting embodiment, the network interface 570 may be an Internet interface.

In one non-limiting embodiment, the processing logic such as a MCU or CPU receives calendar information or data from or through the WAN, HAN, or PAN side radio directly or indirectly from the head end server 160. This calendar information may for example include dynamic pricing information, demand usage information or data, or other information that may pertain to days of the week, hours of the day, and/or other information or data that may pertain to utility usage. For example, the information may specify electricity pricing on an hour by hour basis for the next 24 hour time period. This pricing may be programmed into a time of use calendar. The non-Zigbee side (e.g., WAN, NAN, PAN side) implements and understands calendar functionality. The Zigbee side does not provide such calendar functionality, and the Zigbee standard is set to a point that it does not have any practical ability to be modified to provide such functionality. Furthermore, the network may provide an ability to identify and use a multicast address on the mesh network, such as for example in a load control application, but Zigbee does not have or understand the notion of multi-cast address.

On the other hand, the Zigbee radio is adapted to communicate with the Zigbee radio in the Zigbee devices. The Zigbee side may send messages to Zigbee devices based on the information from the WAN side. Although the Zigbee radio and the non-Zigbee network radio (e.g., WAN, HAN, PAN, or the like) are separate radios, they both interface to or through a common communications circuit or card so that they may share information. In one embodiment, the two radios on a single communications card or circuit share a same processing logic unit (such as a MCU or CPU) and in another non-limiting embodiment, they have separate processing logic units that communicate with each other through an interface.

The master relay 520 stores and keeps track of addresses of nodes registered with the head end server 160. The process for registration of a node according to ANSI C12.22 protocol is described below.

The key manager 530 stores and looks up or queries encryption keys used to provide secure communications across the components of the AMI. Different types of keys may provide different sets of access rights. For example, a node 121, 122, 123, 131, 132, 133 may encrypt a report which only the head end server 160 has the key to decrypt the report. The task scheduler 550 schedules the launch of applications or scripts at pre-defined times or after specific time intervals or according to other predetermined or dynamically determined events or conditions.

The load balancer 560 optimizes resource utilization at the head end server 160 and although optional is advantageously provided.

The head end server 160 may also execute many other applications 540 which are not listed here explicitly.

The head end server 160 also advantageously has multiple network interface connections 570, such as Internet Protocol (IP) based connections 570. These connections permit the head end server 160 to communicate with other servers and devices on the network, such as over an IP network. Examples of a network interface 570 include, but are not limited to, modems such as cable, ADSL, or optical, interfaces that communicate through wireless frequencies or infrared frequencies, and network interface cards. A non-limiting example of a network interface 570 includes a transmitter or means for transmitting read requests and write requests, a receiver or means for receiving tables, data structures, reports, and other information, cell phone, or WAN radio for communicating with one or more mesh gates 140.

The stack 580 is used to run applications by wrapping data packets in headers and trailers and later stripping the headers and trailers used by the layers of the stack 580. The headers and trailers adhere to the requirements of the various protocols used by the layers of the stack 580.

An AMI network should advantageously adhere to one or more standards applicable in the region in which it is operated. In at least one non-limiting embodiment, the AMI network in or with which aspects of the invention operate adheres to the ANSI C12 suite of standards. Other embodiments may be configured to adhere to other regional or international standards or ISO standards as may be adopted from time to time. In particular, ANSI C12.19 defines and standardizes the contents and formatting of tables of data, and ANSI C12.22 establishes the protocol standards which allow transport of table data over a reliable network communications system. The ANSI C12 protocol is implemented at the application layer and is supported by the transport layer, the mesh layer, and the data link and physical layers established under the IEEE 802.15.4 protocol. Specific reference is made to the 1997 version of ANSI C12.19 and the 1999 versions of ANSI C12.18 and ANSI C21, all in effect as of 2006. In addition, reference is made to the 2008 version of ANSI C12.11 and the 2003 and 2006 versions of IEEE 802.15.4. Each of these standards is hereby incorporated by reference. It may be appreciated by those workers having ordinary skill in the art in light of the description provided here that the invention and embodiments, aspect, and features of the invention are not limited to specific standards, though some embodiments may apply specifically to such standards, and that the invention and aspects thereof are compatible with existing standards as well as enhancements, revisions, and future modifications of such standards. One example of another standard that may be used is the IEC standard.

Exemplary Types of Node Devices and Meters

A utility meter collects data about utility usage or consumption at residential and commercial customer sites. Examples of utilities from which usage data may be collected include electricity, gas, water, and communications services. Usage and/or consumption may represent total usage during a period of time, temporal consumption such as instantaneous usage of one or more utilities, total consumption during a defined time period, peak usage, usage during peak or off-peak times, or any other usage or consumption information independent of whether it is of an instantaneous, real-time, cumulative, pattern, or other usage.

Figure 6A:
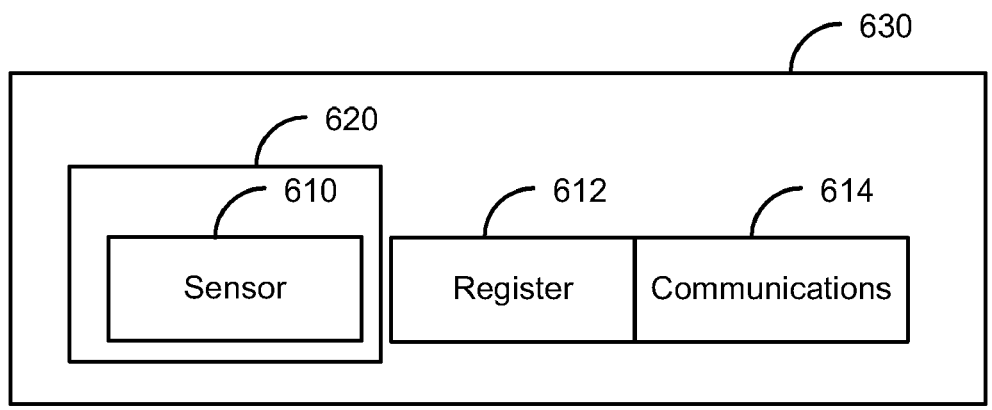
FIGS. 6A and 6B show two examples of block diagrams of exemplary nodes including a meter, according to an aspect of the invention.

In accordance with one non-limiting embodiment, meters are conveniently categorized as one of two basic categories of utility meters, dumb meters and smart meters. FIG. 6A shows a block diagram 600A of a node, also referred to as a node device, 121, 122, 123, 131, 132, 133 that includes a dumb meter 620. A dumb meter 620 has a sensor 610 or other instrumentation which counts or measures the usage of a utility such as electricity, gas, or water; a dumb meter 620 does not process any usage data, or at least does not process any usage data beyond that processing that might be characterized as a collection or capture processing. The data captured by a dumb meter sensor 610 may be stored and transmitted to a collector through the use of an external electronics circuit or radio, not considered part of the dumb meter, such as may be implemented as one or more printed circuit card or chips which may include a register 612 for storage and processing functions and a communications card or circuit 614 for communications functions. The register 612 processes measurements made by the sensor 610 and stores data structures in the form of lists or tables such as meter readings, profiles, and alarms data structure(s). The register 612 also creates ANSI C12.22 envelope (or other similar or equivalent proprietary, regional, international, or ISO standard or protocol envelope) around the data structures to create a report. The communications card or circuit 614 transmits the reports using the ANSI C12 protocols (or other protocol) to the collector for transmission to the head end server. The reports may be either pulled by the collector and/or head end server or pushed by the communications card or circuit 614. A dumb meter 620 in combination with the afore described circuits or printed circuit card containing such circuits which perform the register 612 and communications 614 functions is referred to herein as a node or node device 630 in the advanced metering infrastructure (AMI) network. Reports may be either pulled or pushed from a node with a dumb meter. Pulling is always supported on demand. Push may also be extended to the system, and may for example be supported as an extension to the C12 standard.

Figure 6B:
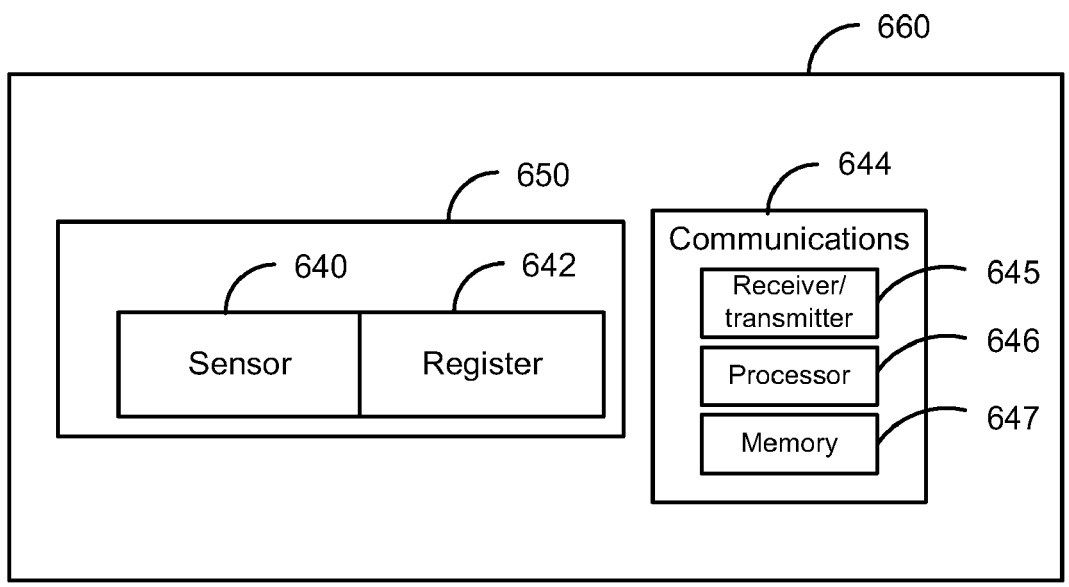

FIG. 6B shows a block diagram 600B of a node, also referred to as a node device, 121, 122, 123, 131, 132, 133 that includes a smart meter 650. Similar to the dumb meter sensor 610, a smart meter 650 also has a sensor 640 or other instrumentation which counts or measures the usage of a utility such as electricity, gas, or water. However, in addition, the smart meter 650 includes a register 642 for processing measurements made by the sensor 640 and storing data structures in the form of lists or tables such as meter readings, profiles, and alarms data structure(s). An external electronics circuit or radio 644, not considered part of the smart meter 650, such as may be implemented as one or more printed circuit card or chips may implement communications with a radio, or a receiver 645 or means for receiving data or reports and a transmitter 645 or a means for transmitting data or reports, processing with a processor 646 or means for accessing data structures on lists stored in the register 642, and memory 647 or means for storing data. In one non-limiting embodiment, a smart meter 650 in combination with a communications card or circuits 644 is referred to as a node or node device 660 in the advanced metering infrastructure (AMI) and affiliated system and method.

Moreover, in at least one non-limiting embodiment, a node 121, 122, 123, 131, 132, 133 in the AMI may comprise an electronics card (or equivalent circuits) in combination with a utility-consumption or utility-measuring device including, but not limited to, meters on larger appliances such as a dishwasher or washing machine, meters on any device that consumes energy, or other utilities such as light bulbs, gas stoves or ovens, and/or thermostats. These devices may be either dumb, in which case the electronics card provides both register and communications functions, or smart, in which case the electronics card provides only communications functions.

A communications card 644 may retrieve data from a smart meter 650, by advantageously connecting to the meter using the ANSI C12.18 point-to-point connection protocols or an equivalent adopted standard for the region, such as an ISO or other international standard connection protocol.

Figure 7:
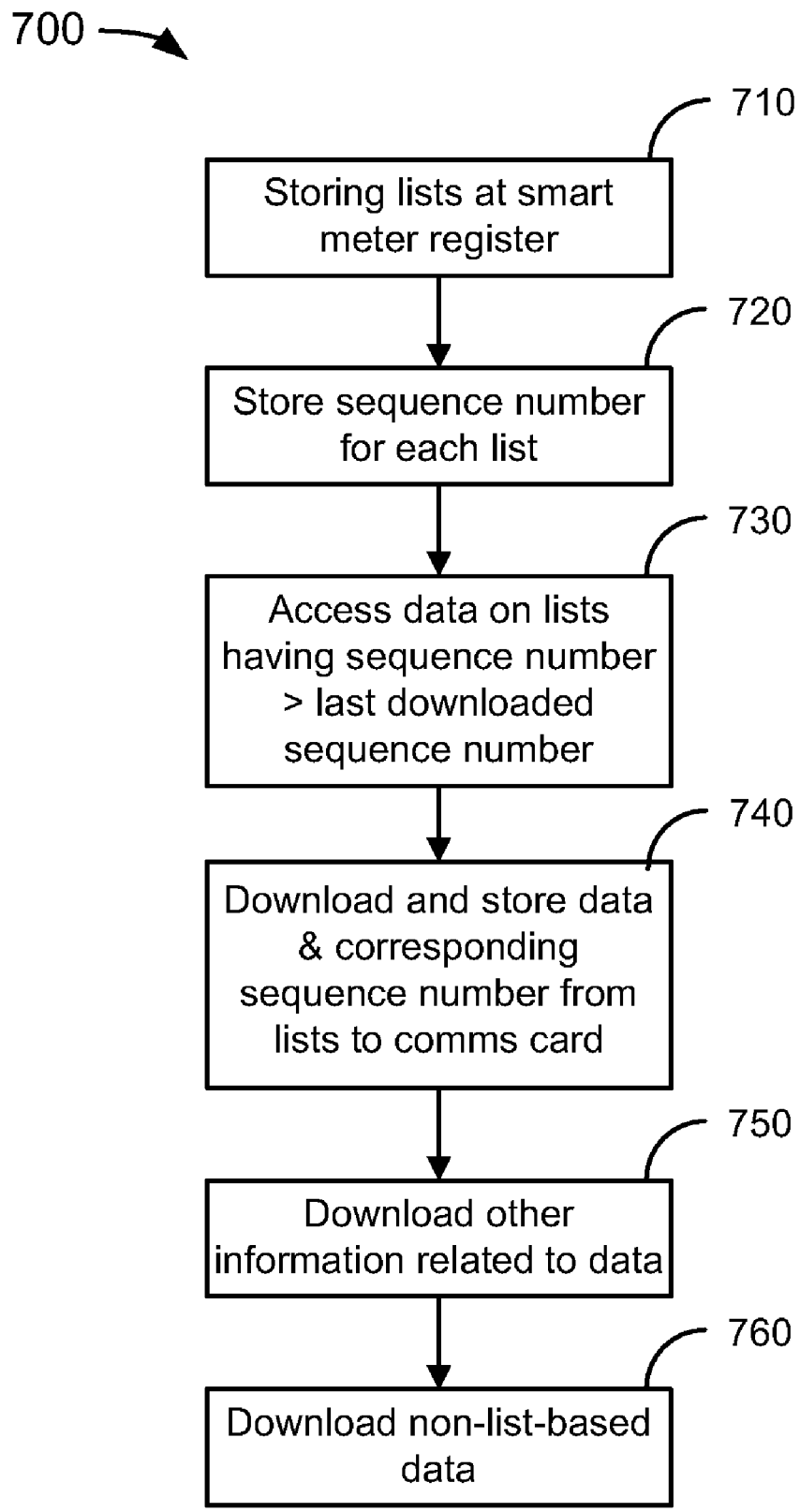
FIG. 7 is a flow chart illustrating an example of a method of downloading new data not previously downloaded from a smart meter register to a communications card at the node, according to an aspect of the invention.

FIG. 7 illustrates an example of a method 700 of downloading new data not previously downloaded from a smart meter register 642 to a communications card 644 at the node. In one exemplary but non-limiting embodiment, at block 710 a typical smart meter 650 stores in a register 642 four types of lists or tables: a history logger list or table, an event logger list or table, a profile list or table, and a self-read list or table. Other data structures may alternatively be used and some of these lists, tables, or other data structures may optionally but advantageously be used. The history logger list or table advantageously stores lists of events including, but not limited to, power quality such as low voltage, tampering, hardware diagnostics, and received load control commands. The event logger list or table advantageously stores events that may have an impact on the utility bill, such as power outages, and is specified by the ANSI C12 protocol. The profile list or table advantageously captures different measurements at specific intervals of time. The self-read list or table advantageously captures all the information needed to bill a customer, such as by way of example but not limitation, the number of kilowatt-hours used at a certain tiered price and maximum demand.

At block 720, for each list or table stored by the smart meter register 642, the register also advantageously stores a corresponding sequence number. The sequence number rules and syntax may be as identified or defined by the ANSI C12.19 protocols or other regional or international protocols. At the installation of a meter, the sequence number of each list is set to zero or some other predetermined or dynamically determined reference or starting number. A sequence number is incremented by one (or other predetermined or dynamically determined increment) when a new piece of data is appended to the list. The sequence numbers are advantageously never reset during the life of the smart meter so that each sequence number is unique to the life of the meter and not reused.

Each time the communications card (or equivalent circuits) 644 downloads data from the smart meter register 642 to memory 647 on the communications card 644, the sequence numbers corresponding to the last downloaded data entry of each list are also downloaded and stored in memory on the communications card. Thus, at block 730 the communications card 644 uses its processor 646 to access only the data entries on each list of the register 642 having a sequence number greater than the sequence number stored previously in the memory 647 on the communications card 644 for that list. For example, the processor 646 may read the sequence number entries for each list and compare them to the sequence number previously stored for that list, and when the processor arrives at a sequence number greater than the previously stored sequence number, the processor will access the corresponding data entries.

Then at block 740, the communications card 644 uses its receiver 645 and memory 647 to download and store new data and their corresponding sequence numbers, where the new data has not previously been downloaded from the smart meter register 642.

Besides storing the sequence numbers for each list stored by the smart meter register 642, the communications card 644 also needs to know the table (or other data structure) identification number which identifies the type of table and the frequency at which the smart meter captures the data for that particular table. The information is stored in the smart meter register 642. At block 750, the communications card 644 downloads this information.

At block 760, a smart meter may also store data structures that are not list-based or table-based, for example, such data structures may include or store statistics, Global Positioning System (GPS) location of the meter, configuration information, or combinations of any two or more of these or other information.

In one embodiment, after the communications card 644 downloads data from the smart meter register 642, a processor on the communications card 644 creates an ANSI C12.22 envelope (or other similar or equivalent proprietary, regional, international, or ISO standard or protocol envelope) around the data to create a report. Reports may include, but are not limited to, identification information, status of the node such as low battery, detection of tampering at the node, power failures, power quality, and leakage; configuration of the meter; data formatting information, utility meter readings, consumption statistics, and a profile of the interval period at which utility readings are stored. The node 660 may push the reports to the system head end server 160 for processing through a collector 140. Alternatively, the head end server 160 and/or the collector 140 may pull the reports from the node 660.

In one embodiment, after the communications card 644 downloads data from the smart meter register 642, the communications card 644 does not have the ability to create a report from the data. Thus, the collector and/or the head end server would pull the information from the communications card 644, rather than having the communications card push the data to the collector and/or the head end server. The process of pulling the data from the communications card 644 follows conventional ANSI C12 Protocol Specification for Electric Metering (PSEM).

Installation of Nodes

Figure 8:
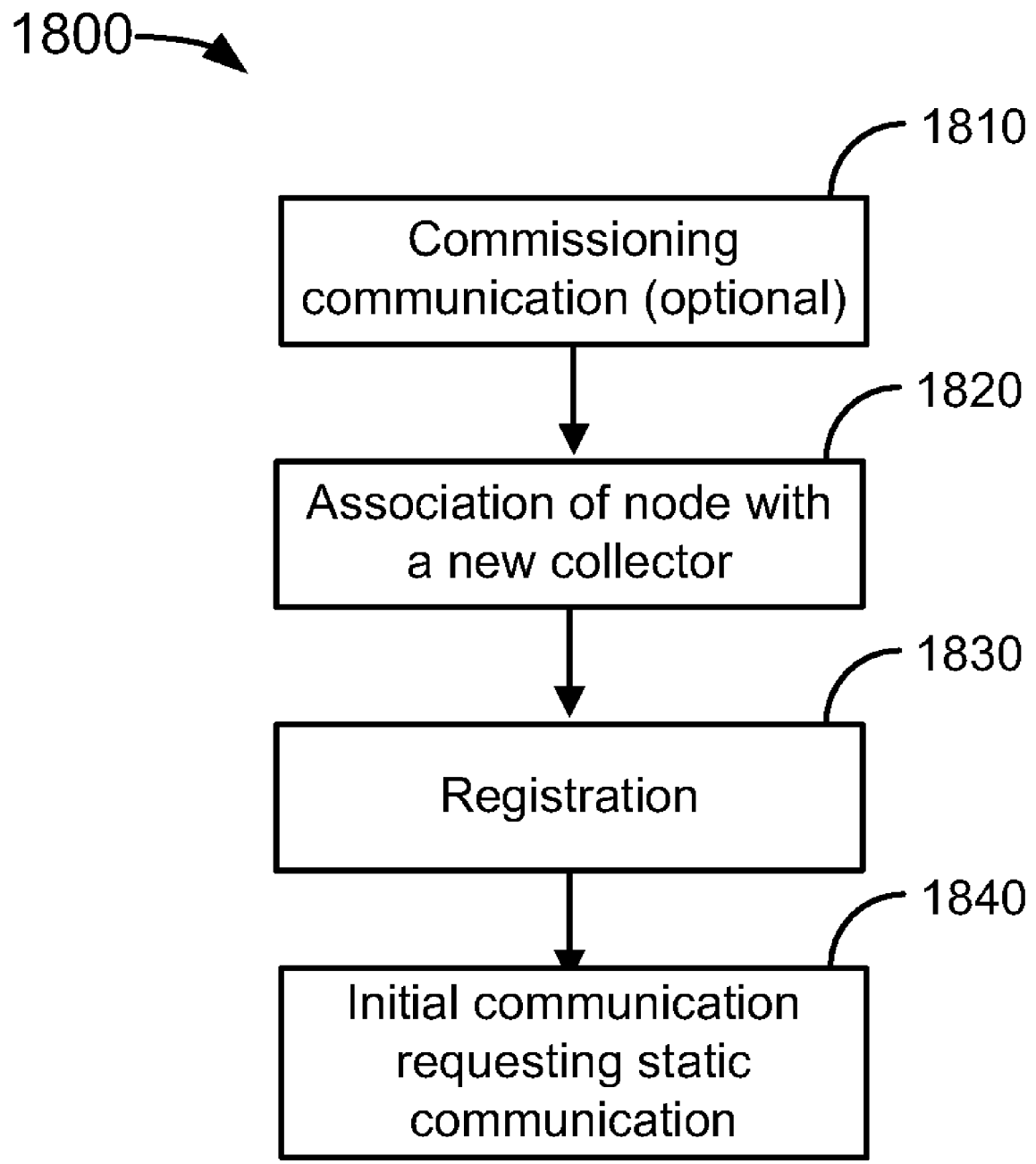
FIG. 8 is a flow chart illustrating an example of a method of installing a node, according to an aspect of the invention.

Prior to joining an AMI network and transmitting data, a node must undergo an installation procedure as specified by ANSI C12 protocols (or other protocol) and briefly described here. FIG. 8 illustrates an example procedure 800 for installing a new node.

In one non-limiting embodiment of an installation procedure, at block 810 the node is initially provided the option of engaging in a commissioning communication with the commissioning server at the system head end server 160. The content of the commissioning communication depends on the type of device at the node, for example, a meter or a thermostat, the data structures supported by the node, and the utility-owner of the node. Thus, a thermostat may dump or upload its control schedule to the head end server 160 during the commissioning communication.

The next step in the installation procedure is association of the node with a new collector at block 820. A mesh network is a wireless network configured to route data between nodes within a network. It allows for continuous connections and reconfigurations around broken or blocked paths by retransmitting messages from node to node until a destination is reached. Mesh networks differ from other networks in that the component parts can all connect to each other via multiple hops. Thus, mesh networks are self-healing: the network remains operational when a node or a connection fails. A mesh network may be used to implement any of the WAN 110, NAN 120, and HAN 130 networks within an AMI network 100. For convenience, a mesh network may be referred to here simply as either a network or sub-network. The association of the node with a new collector at block 820 is described in greater detail in FIG. 9 and the text associated with FIG. 9.

Following the association of the node with a new collector at block 820, the next step in the installation of a node is registration according to an applicable protocol specification, such as for example an ANSI C12.22 registration according to the ANSI C12.22 protocol specification. The node transmits registration information in a simple ANSI C12.22 registration message to the collector, and the collector transmits the information to the master relay which includes a routing table for tracking all of the C12.22 nodes registered to a C12.22 network service provider.

After the registration step, at block 830 of the example procedure 800 for installing a new node, the master relay notifies the head end server 160 that there is a new node 121, 122, 123, 131, 132, 133 on the network 100 and that the node has been registered according to the applicable protocol specification such as according to the ANSI C12.22 protocol specification.

Finally, at block 840 the installation procedure concludes with an initial communication from the server to the node, requesting static information. Static information encompasses information related to the node which does not change and thus does not need to be transmitted to the head end server during future data transmissions. Static information may include, but is not limited to, the type of measurements that the meter at the node will make, the frequency at which the meter will make the measurements, the identification number of the meter, and/or any information that may be located on the nameplate of the meter.

The installation procedure serves to inform the network of the presence of the node, and the data collection process may proceed upon successful completion of the installation process.

Figure 9:
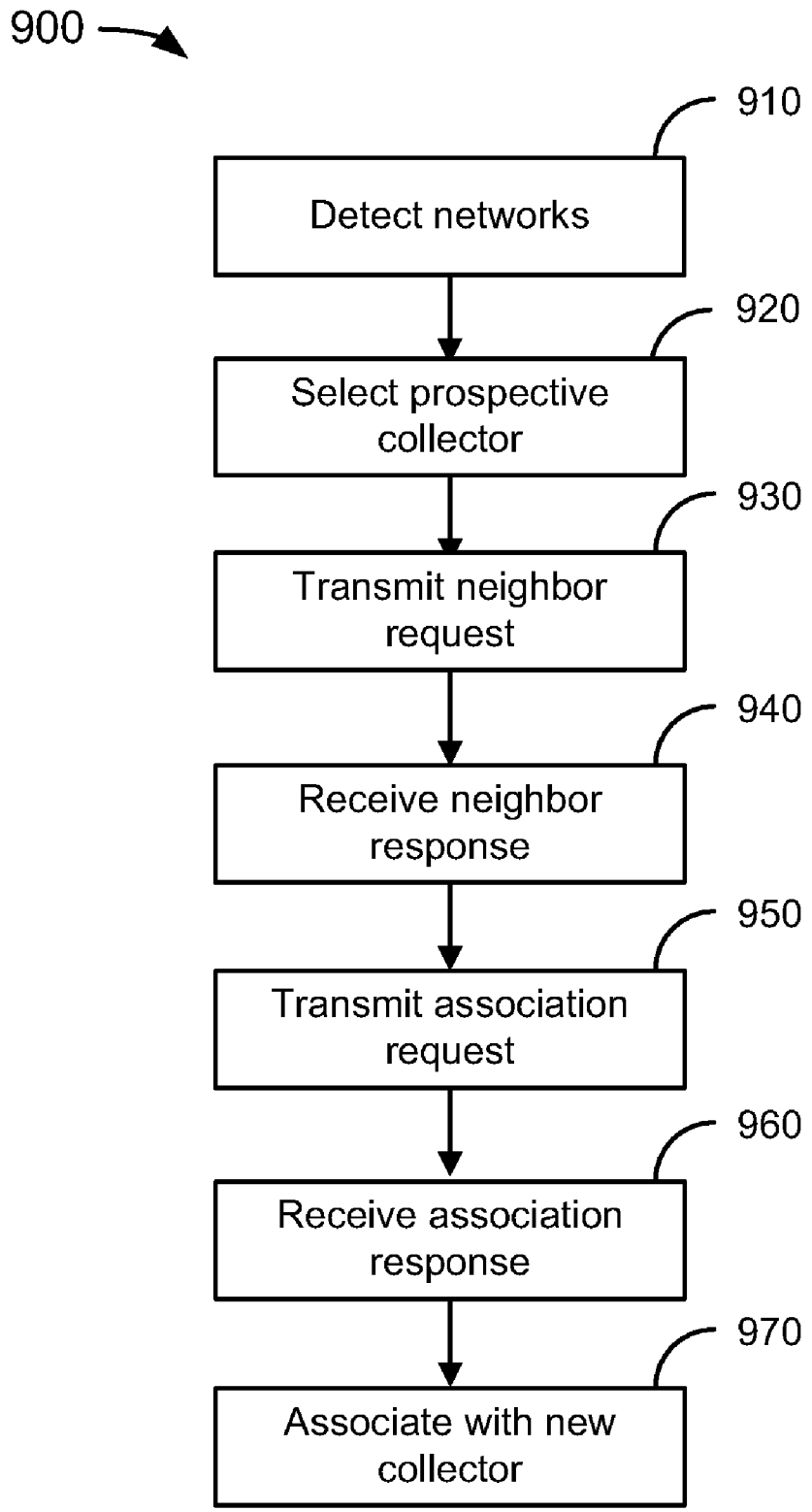
FIG. 9 is a flow chart illustrating an example of a method of associating with a new collector, according to an aspect of the invention.

FIG. 9 illustrates in greater detail an example node to new-collector association procedure 900 for associating a node with a new collector as referenced in step 820 of FIG. 8. After association, the node may utilize the new collector and the new collector's sub-network to communicate sensor readings and receive instructions or commands.

At block 910, the node may use a receiver or radio means 265 to detect active networks within radio range and collecting information on each. For example, the node may determine a signal strength for a particular transmission frequency, a network name, a supported version number of each network. The active networks may be compiled in a list by a processor or microcontroller 245 in memory 255.

Each network may be associated with a collector and may periodically broadcast a banner or other information containing a network name and a network identifier. The node may attempt to receive and parse or interpret the banner in order to determine nearby networks having a minimum signal strength. In one non-limiting example, only the collector may broadcast the banner, but each node within the network may forward the banner. In this way, nodes outside direct radio range of the collector may still participate in the network through nearby neighbors.

At block 920, the node may use its microcontroller 245 to select a prospective collector with which to associate based upon the information acquired at block 910 about active networks. From the list of networks collected above, the node may parse the network name for a network prefix, network suffix, or other identifier. The network prefix may determine, in part, services offered by the network. Alternatively, the network prefix may determine a provider of the network. Based on the services offered or a registered provider of a network, the node may select the prospective network.

The node may further select the prospective collector based on a signal strength. A strong signal may be preferred over a weak signal. The node may further select the prospective collector based on a supported version number. It will be appreciated that the node may be outside direct radio range of the collector. However, communications may be forwarded through neighboring nodes in accordance with network protocols.

At block 930, the node may transmit a neighbor request to the prospective collector selected above. The neighbor request may include a node identifier and relevant meter status and be transmitted to the collector associated with the network. For example, the meter status may include a list of sensors provided by the node and services requested by the node. A schedule of supported sensor reading transmission may be transmitted, for example, indicating whether the node will transmit sensor readings every minute, every hour, every day, or according to some other predetermined or dynamically determined schedule or the like, and any blackout periods.

As described above, if the node is not in direct radio range of the collector, the communications may be forwarded or relayed through the network. The node may first transmit to a neighboring node, which then forwards or relays the communication on. It will be appreciated that the above sub-process may be executed automatically on power-up or upon collector failure of the collector currently associated with the node. No further input from a user may be required.

At block 940, the node may receive a neighbor response. Responsive to receiving the neighbor request from the node, the collector may compile or assemble and transmit the neighbor response via the network. The neighbor response may provide information to the node regarding associating with the prospective network.

For example, the neighbor response may include a next hop to the collector, a number of hops to the collector, a path quality, a collector load, a router load, or some combination of these. A next hop to the collector may describe the next node on the path to the collector. A path quality may be an indicator indicating a signal quality of the path to the collector. A collector load may indicate remaining capacity at the collector. A router load may indicate remaining capacity at a node next on the path to the collector, if the node is not in direct radio range with the collector and forwarding is required.

At block 950, the node may transmit an association request to the collector via the network. The association request may indicate a node's desire to associate with the prospective network selected above. For example, the association request may further include a node identifier.

At block 960, the node may test whether an association response was received. Responsive to receiving the association request from the node, the collector may associate the node with the network and transmit an association response. Similar to above, the association response may be forwarded through the network.

For example, the collector may check a collector load factor before allowing the node to associate. The collector may also authenticate the node before allowing the node to associate. For example, the node may transmit an authentication key verifying its identity. For example, the collector may look up the node table at a server or in a look up table or in another data structure to verify the node is authorized to associate.

At block 970, the node may associate with the network; thus, the node may transmit reports and data to the head end server via the new collector and also receive messages from the head end server. The node may update an internal neighbor table with a network identifier, a network name, and neighbor information such as a next hop and a number of hops to the collector. In this context a hop is a transmission of a message from one node to another node until a destination, the collector, is reached.

Future communications may be transmitted to the next hop, a nearby neighboring node in the network. After the node is associated with the network, it may act as a neighboring node for another new node searching for a network to associate with.

It will be appreciated that in the absence of an associated network, the node may continue to store sensor readings for future transmission.

Transferring Data from the Node to the Collector

When reports or data are transferred from the node to the collector through a pull process, the collector must know what type of information to retrieve and the type of meter from which the information is being retrieved. The node merely operates as a server of data acquired at its location. The collector runs a specific application program to pull information from a specific kind of meter and to read the specific data structures used by the meter.

Figure 10:
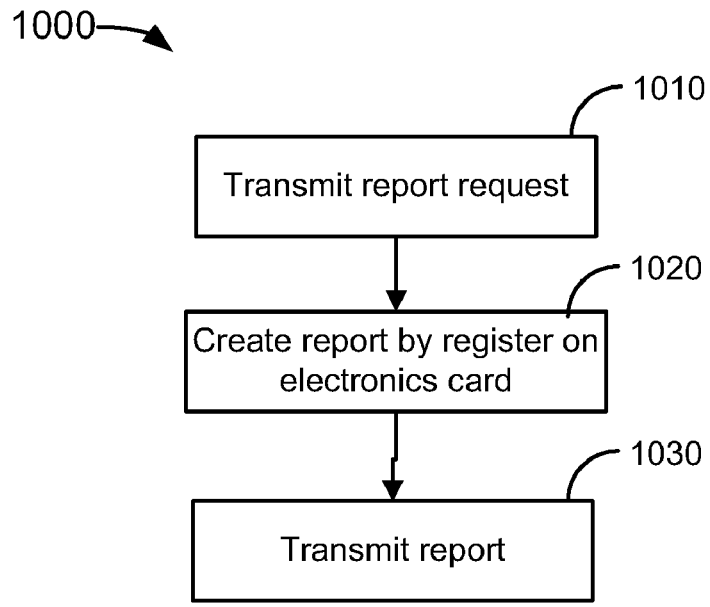
FIG. 10 is a flow chart illustrating an example of a method of pulling a report from a dumb meter, according to an aspect of the invention.

FIG. 10 illustrates a first example Dumb Meter Node-to-Collector data pull procedure 1000 for transferring data from a node to a collector using a first pull scenario. In the first scenario, the collector 140 pulls a report from a node 630 with a dumb meter 620. The collector 140 uses a radio 355, a transmitter, or other transmission means to transmit a pull request at block 1010 to the node 630. At block 1020, a report is created at the register 612 at the node 630. At block 1030, the communications card 614 transmits the report to the collector 140 using a radio 265, a transmitter, or other transmission means.

Figure 11:
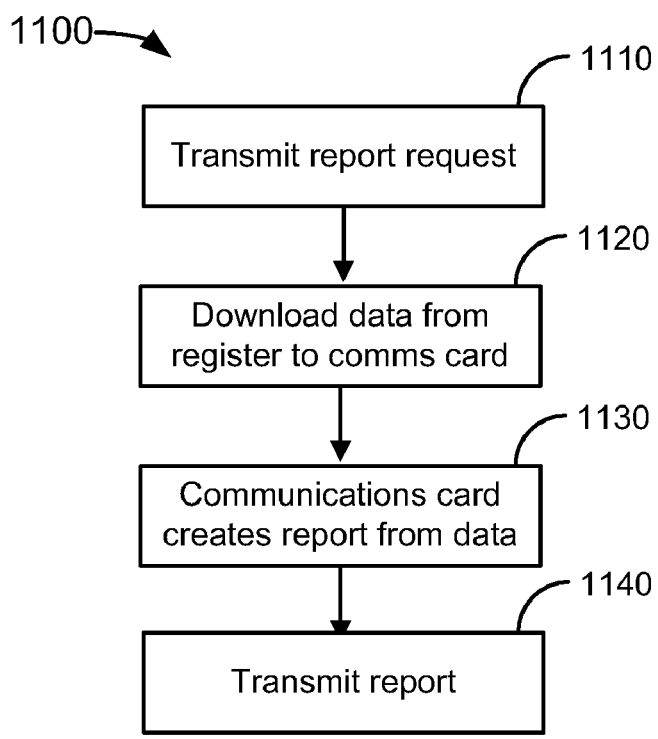
FIG. 11 is a flow chart illustrating an example of a method of pulling a report from a smart meter, according to an aspect of the invention.

FIG. 11 illustrates a second example Smart Meter Node-to-Collector data pull procedure 1100 for transferring data from a node to a collector using a second pull scenario in which the collector 140 pulls a report from a node 660 with a smart meter 650, where the node 660 is capable of creating a report. The collector 140 transmits a pull request at block 1110 to the node 660. At block 1120, the communications card 644 downloads the data from the register 642 of the smart meter 650 as detailed above by procedure 700 in FIG. 7. At block 1130, the communications card 644 creates the report from the data. The communications card 644 then transmits the report to the collector 140 at block 1140.

Figure 12:
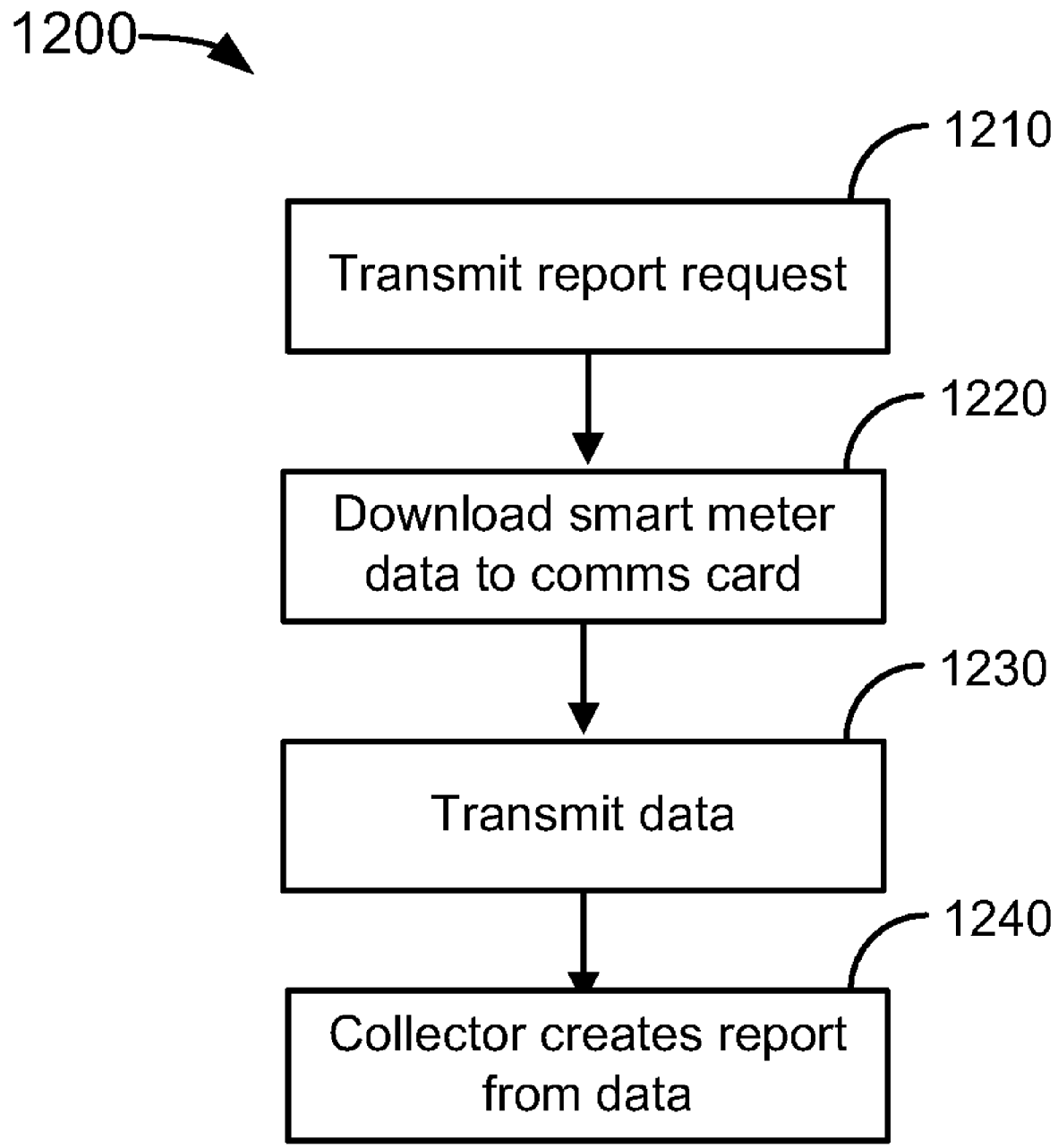
FIG. 12 is a flow chart illustrating an example of a method of pulling data from a smart meter, according to an aspect of the invention.

FIG. 12 illustrates a third example Alternative Smart Meter Node-to-Collector data pull procedure 1200 for transferring data from a node to a collector using a third pull scenario that also involves a smart meter, but where the smart meter does not have the ability to create a report so the device-agnostic collector pulls the data and creates the report for the meter. The collector 140 transmits a pull request at block 1210 to the node 660. At block 1220, the data structures from the register 642 in the smart meter 650 are downloaded to the communications card 644. At block 1230, the communications card 644 transmits the data structures to the collector 140. The CPU 345 of the collector 140 then creates the report from the data structures at block 1240, where a report includes an envelope or container for the data structures, such as an ANSI C12.22 envelope around the data structures.

Reports created by the collector or pulled by the collector from the node are subsequently transmitted to the head end server by the collector. Alternatively, the head end server may send a pull data command to the collector, rather than having the collector initiate a pull request. In this case, the collector could either pull data from all nodes from its sub-network or could pull data from a particular node specified by the head end server. One specific example in which data is pulled by the head end server is an on-demand response, where only data is sent rather than an entire report. An exemplary process by which the collector transmits the reports to the head end server is described in more detail below in the section entitled, "Three Step Synchronization Between Head End Server and Collector."

In contrast to a pull process, a push process occurs when a node initiates transmission of reports or data to the collector and/or the head end server. Recall that a report may consist of data plus an envelope for that data. The envelope may include such information as security information, sequence information, address information, etc. A node may be configured to actively initiate transmission of data or a report to a collector and/or head end server rather than merely responding to a pull request for information. The collector that receives data or reports pushed from a node should be capable of receiving unsolicited transmissions initiated by the node, regardless of the type of meter at the node or the type of data structures transmitted by the node. Consequently, this type of collector may be termed a meter-agnostic, data structure-agnostic, or device-agnostic collector. Because some nodes may not have the ability to push information, a device-agnostic collector may also advantageously need to be capable of both pulling data or reports from one node as well as receiving pushed data or reports from another node. More details on the push process are provided below in the section entitled, "Pushing Reports from the Node to the Collector." These various agnostic capabilities are referred to by the general phrase device-agnostic.

One of the functions of at least some mesh gates may be the collector function. Every valid message read is stored in a First-In-First-Out (FIFO) buffer (or other buffer as are known in the art) The head end server 160 has a protocol for head end synchronization with a collector. There is provided an address list, and the head end sends the actual sequence number for each address, so that based on the sequence number the mesh gate will only transfer new reports.

Figure 13:
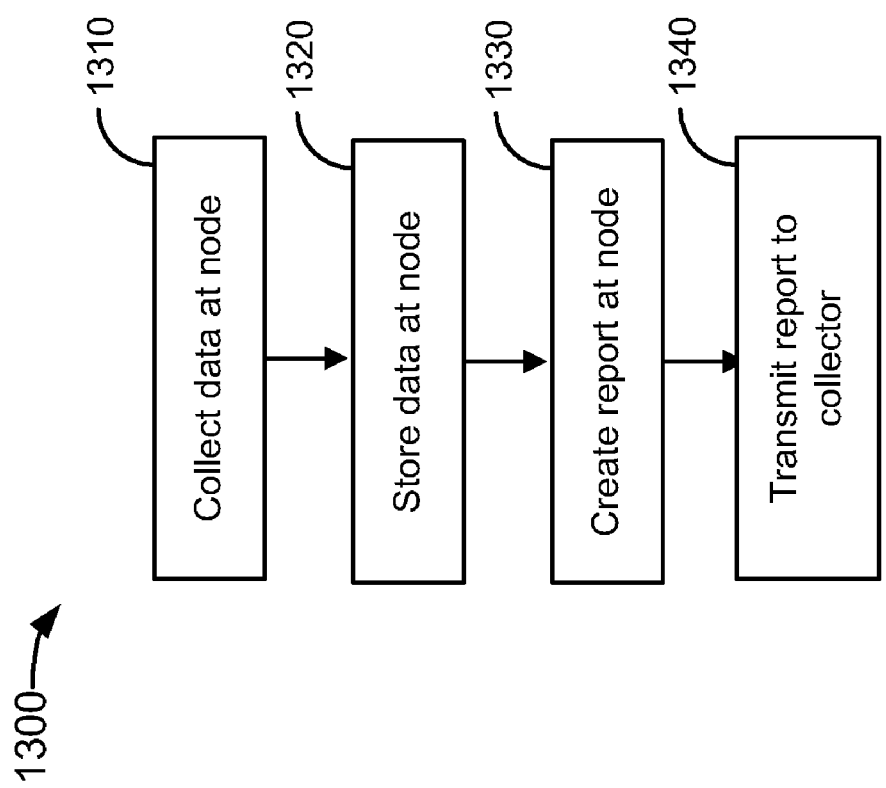
FIG. 13 is a flow chart illustrating an example of a method of pushing data to a collector from a node, according to an aspect of the invention.

FIG. 13 is a flow chart illustrating an example 1300 of a method of pushing data to a collector from a node, according to an aspect of the invention. A node may push information to a device-agnostic collector according to various policies or criteria.

At block 1310, a node device collects data through an input device. For example, profiler data monitors consumption of a utility, such as for example, voltage drop or variation over time due to electricity usage or quantity (e.g. cubic feet) of water consumed. The profiler data is measured and collected at regular intervals, such as every hour.

After the data is collected, at block 1320, the data is stored in memory. For the profiler data example, the profiler data is dumped or stored into a block of memory. A block is the repository for data collected at known, regular intervals. The block is an efficiency mechanism which does not require a time stamp to be included at each data capture because each time data is sent to the block is known.

At block 1330, a report is created by the node's processor from the data. For the profiler data example above, when the block is full, a report is created, and the report is appended to the node's reporting list.

At block 1340, the node transmits the reports on the reporting list to the collector at the next scheduled reporting time window by using a radio, transmitter, or other transmission means.

In the profiler data example above, the node pushed information to the collector when the information was created. A node may also push information on a schedule such as the accumulation of statistics relating to energy usage. At appropriate pre-programmed intervals, the node transmits the data packet to the device-agnostic collector. The device-agnostic collector receives the data packet and forwards the data packet to the head end server. Additional description is provided herein elsewhere relative to particular batch reporting and real time reporting.

A device-agnostic collector does not need any knowledge about the particular type of meter or utility-consumption device at the node pushing the data and reports nor the particular data structure used by the node. Consequently, new metering devices capable of pushing information may be installed onto a network, but the device-agnostic collector does not need to upgrade its database to include information about the new type of meter. As discussed in more detail below in the section "Pushing Reports from the Node to the Collector," the node addresses data packets to be processed in a particular manner to certain pre-assigned collector ports, and the collector processes the data packets according to the port that the packet arrives at. In contrast, if a collector were required to pull information from a new type of metering device, the collector would need a specific driver or other specific application for each type of meter and update the driver for each new revision, adding complexity to the collector. The device-agnostic collector also does not need to understand any special data structures pushed by a node because the collector does not read the contents of the data packet, only the header on the data packet. A node capable of initiating a transmission will push the data using conventional data structures as established by the applicable protocol implemented, such as the ANSI C12 protocol. A report is created when a package, container, or envelope are created around the data structure, such as for example, when the ANSI C12 envelope is created around the data structure. Reports that can be pushed by a node may include, but are not limited to, identification information, status of the node such as low battery, detection of tampering at the node, power failures, power quality, and leakage; configuration of the meter; data formatting information, utility meter readings, consumption statistics, and a profile of the interval period at which utility readings are stored. One or more of these reports are captured at the appropriate interval for that particular data structure and then appended to a reporting list stored at the node. The processor, microcontroller 245, or other means creates a reporting list in memory 225, and newly created reports are appended by the processor, microcontroller 245, or other means to the reporting list. The reporting list is then transmitted by the node one report at a time, addressed to the appropriate device-agnostic collector port at preprogrammed intervals and/or according to other policies or rules. Thus, the processor or microcontroller 245 uses the reporting list to keep track of the new reports that need to be transmitted to the collector.

In accordance with one non-limiting embodiment, for security purposes, the data structures in the data packet from the node are advantageously encrypted with a data key which the device-agnostic collector is not able to decrypt. Only the head end server is able to decrypt the data from the nodes. Thus, the manner in which the device-agnostic collector responds to a data packet, whether received from a node or from the head end server, may depend upon which port of the device-agnostic collector the data packet is addressed to rather than the content of the data packet.

The device-agnostic collector's ports may be reserved according to the type of response expected from the collector including, but not limited to, forwarding the data packet from the node to the head end server without processing the data packet, capturing and aggregating the data prior to forwarding batched data from multiple nodes to the head end server, and forwarding registration information from the node to the head end server. Thus, a node pushing data or a report in a data packet to a device-agnostic collector must address the data packet to the appropriate pre-assigned port of the collector.

The pulling or pushing of data advantageously occurs at the application layer level in the AMI network. As established by the IEEE 802.15.4 protocols, the application layer is supported by the underlying layers, the transport layer, the data link layer, and the physical layer. Layer boundaries are somewhat flexible and elastic so that the data pushing or pulling may not strictly be limited to a particular layer.

Collision Avoidance-Transmitting Packets from Node to Collector

In an AMI network 100, a collector 140 may be required to service up to and more than thousands of different nodes 121, 122, 123, 131, 132, 133. Nodes in any particular sub-network 120, 130 may be programmed to record meter data at the same time, for example every hour on the hour. If data is pulled from the nodes on a collector's sub-network by the collector 140 or head end server 160, collision of data on the NAN 120 is minimized because each node responds with data packets 600A recorded at the hour only when queried by the collector 140. However, if the nodes in a sub-network push the recorded data to a collector during a pre-scheduled time window, thousands of data packets may be transmitted simultaneously, resulting in multiple collisions. Although the IEEE 802.15.4 MAC layer implements carrier sense multiple access (CSMA) for handling collisions, the MAC layer is only capable of typically handling no more than approximately five nodes transmitting simultaneously.

Figure 14:
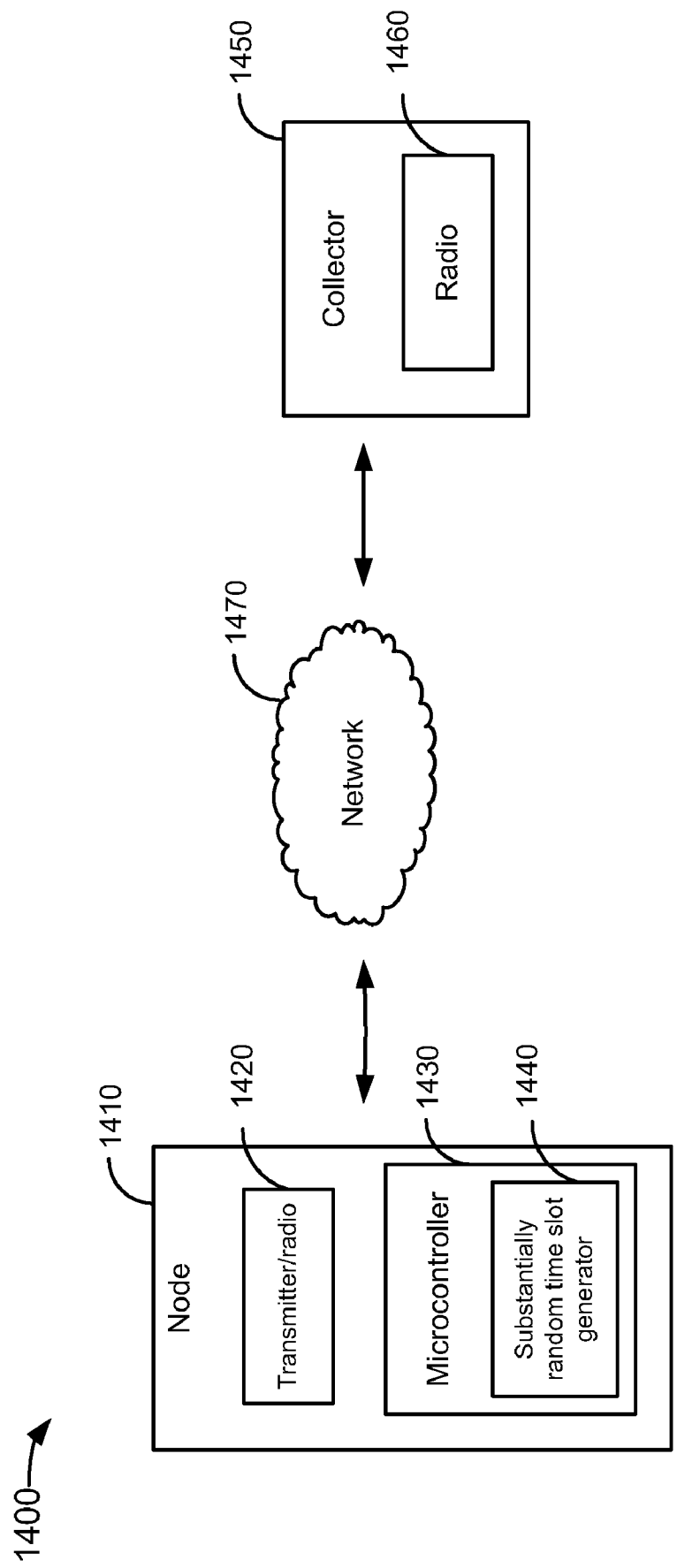
FIG. 14 shows an example of a block diagram of a node communicating with a collector through a network, according to an aspect of the invention.

FIG. 14 shows an example of a block diagram 1400 of a node communicating with a collector through a network, according to an aspect of the invention. The node 1410 includes a radio 1420 and a microcontroller 1430. The radio includes a transmitter or other means for transmitting data packets and a receiver or other means for receiving an acknowledgment from the collector 1450. The microcontroller 1430 has a software module 1440, substantially random time slot generator, or other means for generating one or more random or substantially random time slots within a pre-scheduled reporting time window. The microcontroller 1430 also has another software module 1442 or other means for seeking a new collector.

The node 1410 transmits data packets to a collector 1450 through a network 1470. The collector includes a radio 1460 or other receiving means for receiving the data packets received from the node 1410 and transmission means for transmitting and acknowledgment after receipt of each data packet from the nodes.

Figure 15:
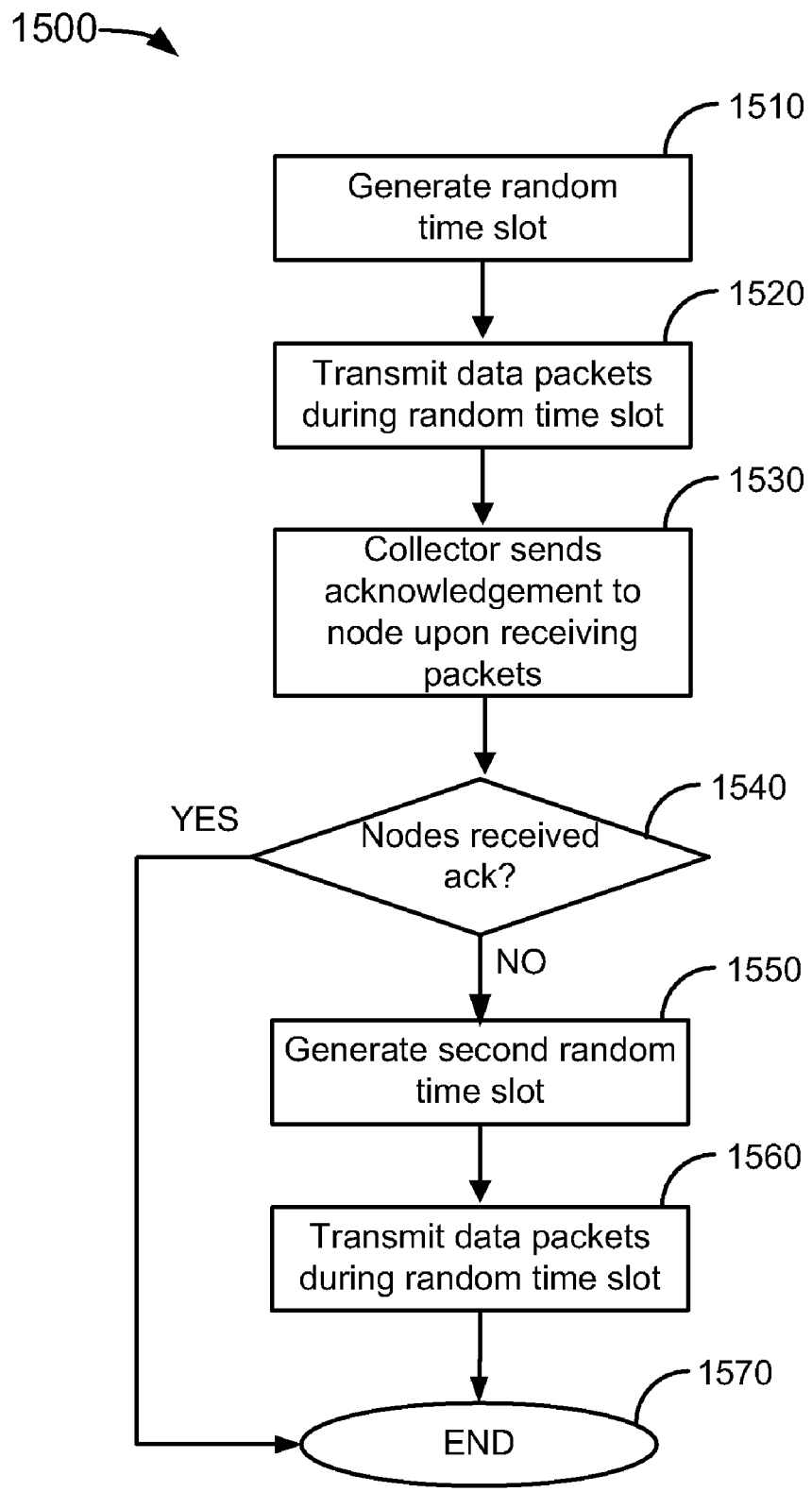
FIG. 15 is a flow chart illustrating an example of a method of temporally staggering communications from the nodes to the collector, according to an aspect of the invention.

FIG. 15 illustrates an example solution 1500 for handling a situation where even staggered transmission times for each node may still result in collisions. At block 1510, a random or substantially random time slot within a pre-scheduled reporting time window is generated for each of the nodes. While the generation of random time slots within a reporting time window for each node would be ideal in minimizing the collision of transmissions from the nodes to the collector, the assignment of substantially random time slots would suffice provided the substantially random slots do not permit more than approximately five nodes to transmit simultaneously. These time slots within the prescheduled reporting time window are referred to as checkpoints for the nodes. At block 1520, each node transmits its reports as data packets to the collector 140 during its checkpoint. Each node uses a radio 265, transmitter, or transmission means to transmit the data packets. The result is that data packets sent from the different nodes to the collector are transmitted in a temporally staggered manner over prescheduled reporting time window rather than being transmitted simultaneously.

Checkpoints may be generated by nodes and there is also an option for a mesh gate to trigger the generation of a checkpoint. Using a mesh gate to trigger checkpoint generation may be advantageous because the mesh gate may typically be in a better position to control collisions, but may sometimes have the somewhat disadvantageous effect of creating more message traffic. Either or both checkpoint generation schemes may be utilized depending upon the tradeoffs. Furthermore, if a tree is broken, the node needs to initiate the checkpoint generation because under these conditions, the mesh gate cannot read back to the node. In one non-limiting example, the node initialization of a checkpoint serves as a backup update routing information for the mesh gate. A node can normally always find a mesh gate but the mesh gate may not always find a node.

At block 1530, the collector transmits an acknowledgement to each node if the collector received a data packet from that node. The collector uses a radio 355, receiver, or receiver means for receiving data packets and a radio 355, transmitter, or transmission means to transmit the acknowledgement.

At decision block 1540, each node uses a radio, receiver, or receiver means for checking whether it has received an acknowledgement from the collector if it sent a data packet. If each node that sent a data packet to the collector received an acknowledgement (block 1540-Yes), the process ends at block 1570. The data packet may not reach the collector, or an acknowledgement may not be received by the transmitting node for a variety of reasons including, but not limited to, interference at the RF frequency of transmission and collisions with another packet. If the data packet does not arrive at its destination, as indicated by the lack of an acknowledgment from the collector, the transport and MAC layers may attempt to retransmit the packet. If the transport and MAC layers are not successful in re-transmitting the packet, in one embodiment, the node may be configured to re-transmit the packet to the collector again before the next scheduled reporting time window. Thus, if at least one node did not receive an acknowledgment from the collector after transmitting a data packet (block 1540—No), at block 1550 a second random or substantially random time slot within a pre-scheduled re-try time window may be assigned to the unacknowledged nodes. The re-try time window may or may not be the same as the pre-scheduled reporting time window used at block 1510 above. At block 1560, each unacknowledged node transmits its report to the collector again during its second assigned checkpoint. The process ends at block 1570.

In one embodiment, if there are nodes that did not receive an acknowledgement, these nodes may be configured to wait until the next scheduled reporting time window before re-transmitting the packet.

Any algorithm which implements an effective randomization or pseudo-randomization of transmission times for the nodes in a collector's sub-network is suitable. One example of a randomization algorithm or procedure is presented here.

Under the IEEE 802.15.4 protocol, 16-bit addresses are assigned to each meter sequentially by the mesh gate or coordinator. As described in the IEEE 802.15.4 protocol, a coordinator implements a general model of communication which allows it to talk to any other device and also relays messages. The mesh gate 140 performs the functions of the coordinator in the example network topology in FIG. 1.

Bits one through seven of the address are used to represent bits seven through thirteen of the generated random number. Bits one through seven of the meter manufacturer's serial number and bits one through seven of the actual meter reading are used in computing bits one through seven of the generated random number. Bits one through six of the generated random number are obtained by performing an exclusive OR operation on the first six bits of the meter's serial number and the first six bits of the actual meter reading. Bit seven is obtained by performing an exclusive OR operation on the seventh bit of the meter's serial number, the seventh bit of the actual meter reading, and bit one of the 16-bit address. Bits eight through thirteen correspond respectively to bits two through seven of the 16-bit address. The generated random number has thirteen bits; thus it represents a number between 0 and 8191. This generated random number is multiplied by the total time window allowed for the transmission of all the nodes in a collector's sub-network and then divided by 8191 for scaling. The resulting value is the time during the window at which a node is assigned to transmit its data packet during the time window.

Alternatively, a random or substantially random time slot or number generator may be used to generate the times at which each node is permitted to initiate transmissions to the collector, and the time slot or number generator may be performed by a processor or microcontroller 245 running an algorithm.

Last-Transferred-Pointer

A NAN-associated node 121, 122, 123 may lose communications with its servicing collector 140 for a variety of reasons including network outages. However, each of the reports stored at the node on the reporting list remain in queue on the reporting list in flash memory, even during a network or power outage. The reporting list is a circular buffer that advantageously uses a first-in first-out protocol. Typically, the reporting list can store approximately one year of data, but different size buffers may be used to store different durations or quantities of data. A person skilled in the art will understand that an arbitrary amount of data may be stored on the reporting list.

Figure 16:
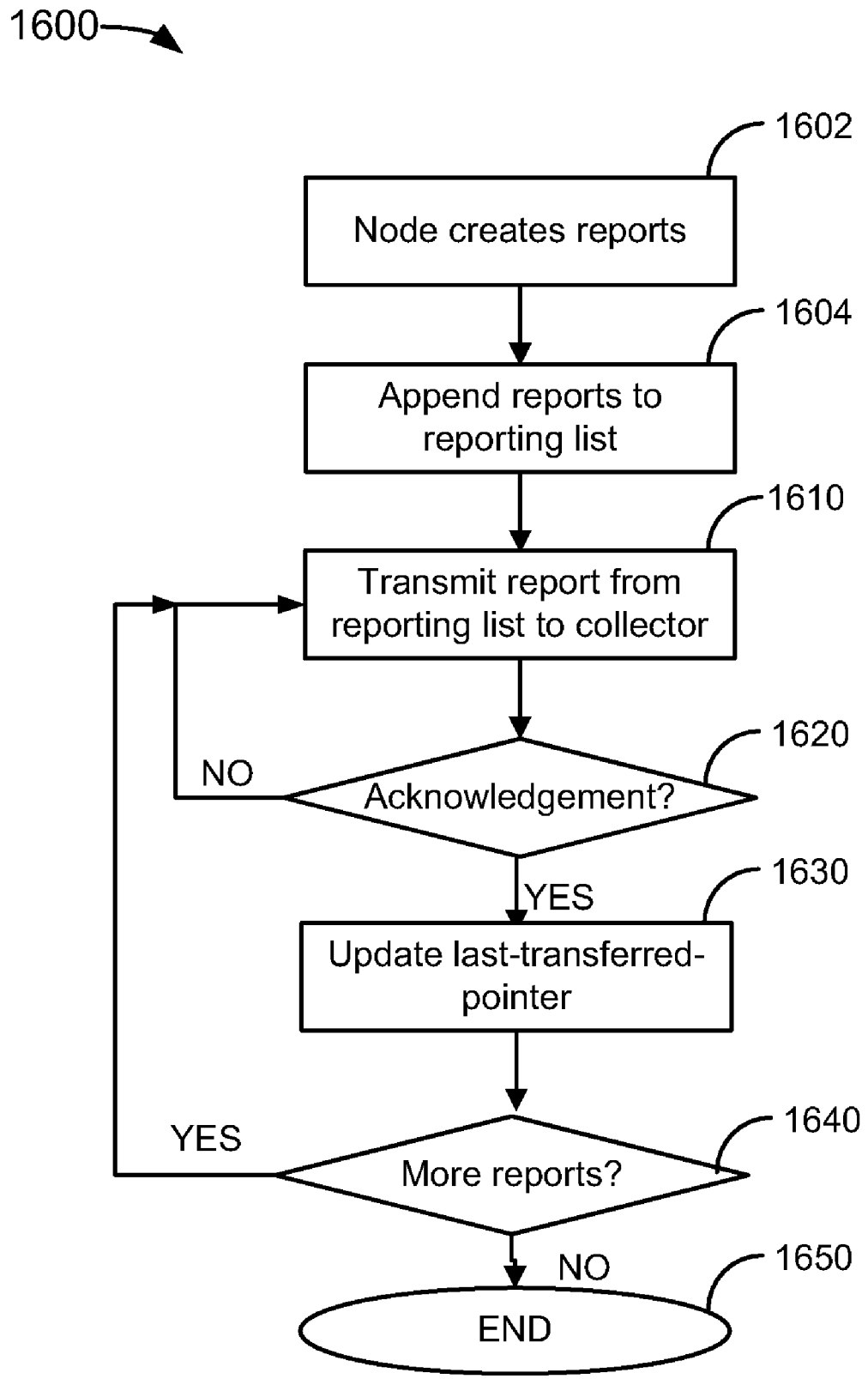
FIG. 16 is a flow chart illustrating an example of a method of tracking reports received by a collector, according to an aspect of the invention.

The node implements a last-transferred-pointer in conjunction with the reporting list. FIG. 16 illustrates an example procedure 1600 for using the last-transferred-pointer. The last-transferred-pointer is a programming language data type stored in memory 255 whose value points to or flags the address in memory 255 of the last report on the reporting list that was acknowledged as having been received by the collector. The report pointed to by the last-transferred-pointer may be referred to as the flagged report. The report to be transmitted next is the one immediately following the flagged report.

At block 1602, a node creates one or more reports using a processor. At block 1604, the node appends the one or more reports to a reporting list in a memory.

At block 1610, at a node's assigned checkpoint, the node uses a radio 265, transmitter, or transmitter means to transmit one report in the form of a data packet from the reporting list to the collector. If the collector receives the data packet, it will send an acknowledgment to the node.

The node uses a radio 265, receiver, or receiver means to check at decision block 1620 for an acknowledgment generated and sent by the CPU 345 of the collector. If a report transmission is not acknowledged (block 1620—No), the node does not increment the position of the last-transferred-pointer and re-transmits the same report at the appropriate re-transmission time at block 1610. If the report is acknowledged (block 1620-Yes), at block 1630 the node updates the last-transferred-pointer by using a processor or microcontroller 245 to increment the last-transferred-pointer stored in memory 255 to point to the report just transmitted and acknowledged. At decision block 1640, the node decides whether there are more reports to transmit to the collector. If the node has more reports to transmit to the collector (block 1640-Yes), it starts the process from block 1610. Otherwise (block 1640—No), the process ends at block 1650.

There are two situations which will cause a node to not receive an acknowledgement. In the first situation, the report transmitted by the node is not received by the collector. When an acknowledgement is not received, the transport and MAC layers first attempt to re-transmit the report. If the transport and MAC layers are not successful in re-transmitting the report, the node may be configured to re-transmit the report to the collector again before the next scheduled checkpoint. Alternatively, the node may be configured to wait until the next checkpoint before re-transmitting the report. In either case, the node will know which report to re-transmit because it is the report immediately following the one that the last-transferred-pointer is pointing to on the reporting list. Using the last-transferred-pointer scheme, the node automatically knows which reports have been acknowledged and do not need to be re-transmitted.

In the second situation, a report transmitted by the node was actually received by the collector, but the acknowledgement from the collector was not received by the node. Because the collector actually did receive the transmission, the collector's memory buffer has already been updated with the report from the node. However, if an acknowledgement is not received by the node, the transport and MAC layers first attempt to re-transmit the report. If the transport and MAC layers are not successful in re-transmitting the report, the node may be configured to re-transmit the report to the collector again before the next scheduled checkpoint. Alternatively, the node may be configured to wait until the next checkpoint before re-transmitting the report. In either case, the node will re-transmit the same report because it is the report immediately following the report pointed to by the last-transferred-pointer. When the collector receives the new transmission, it will re-acknowledge the receipt of the report but will discard the duplicate report which has been sent twice by the node. Upon receipt of the acknowledgement, the node will update the last-transferred-pointer to point to the last report acknowledged by the collector.

In a network which implements data pulling, should a collector fail permanently for any reason such as software or hardware failure, the system head end server should direct another collector to take over for the failed collector. However, in a network in which nodes push data and reports to the collector, the nodes are autonomous and will seek another collector and its associated sub-network on its own and start transmitting reports and/or data to the new collector as discussed above. No reports will be lost due to the failed collector because a node will transmit its reporting list starting from the next report after the one flagged by the last-transferred-pointer.

Pushing Reports from the Node to the Collector

There are multiple ways for a NAN-associated node 121, 122, 123 to push reports to the head end server 160 through the collector 140. Examples of non-limiting ways to push reports include, but are not limited to, (i) batch reporting, and (ii) real-time reporting. In accordance with one non-limiting embodiment, most reports are sent through batch reporting, for example, interval data and work files. The reports which are batched are typically reports not required urgently so they are batched for efficiency. Batch reporting makes maximum use of the data packets sent across the network by minimizing the amount of traffic transmitted. Real-time reporting is advantageously reserved for data which may be needed urgently by the head end server, for example, a meter tamper alert, power outage management events, and feedback from network load control devices like switches.

Figure 17:
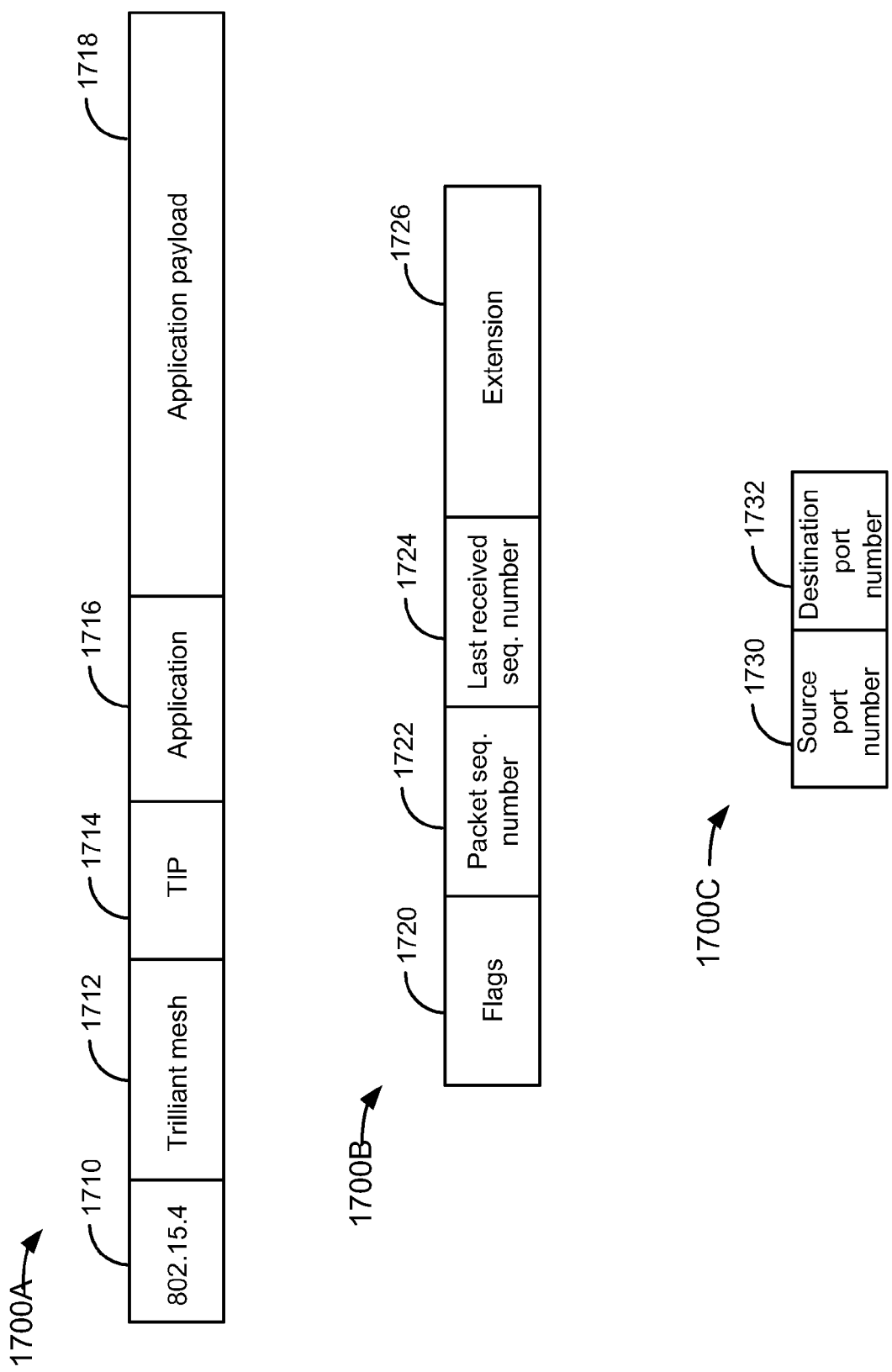
FIG. 17 shows examples of a packet data format, according to an aspect of the invention.

With both methods of reporting, NAN-associated nodes 121, 122, 123 first transmit data packets to the collector 140. The node alerts the collector as to the type of report being sent by addressing a particular port of the collector in the header of the data packet. One non-limiting embodiment of the format of a data packet 1700A, including header formatting, is shown in FIG. 17. The packet 1700A may be composed of an IEEE 802.15.4 MAC header 1710, a layer header such as a Trilliant (Trilliant Networks, Inc., 1100 Island Drive, Redwood City, Calif. 94065) mesh layer header 1712, a transport header such as a Trilliant mesh transport (TIP) header 1714, an application layer header 1716, and an application payload 1718 such as a report. Each of the headers for the individual layers is used by the respective stack layer for transmitting the packet to its destination.

The collector port addressed by the node when transmitting a report resides in the transport TIP header 1714. When the transport header is the TIP transport header, the TIP header 1714 contains the fields 1700B shown in FIG. 17 which includes flags 1720, a packet sequence number 1722, a last received sequence number 1724, and an extension field 1726. In one non-limiting embodiment, the extension field 1726 is an eight-bit field. Bits 7 through 5 are used to indicate the type of extension, for example TIP communication or intra-TIP communication.

When the extension type is set to "intra TIP communication", the extension field structure 1700C shown in FIG. 17 is used, including a source port number field 1730 and a destination port number field 1732. The eight bits of the extension field 1726 is divided between the source port number comprising bits 7 through 4 and the destination number comprising bits 0 through 3. When the node transmits a report to the collector, it is the source port number field which contains the particular collector port being addressed. The relevant details of the header which the collector needs to know, such as the addressed port, are made available to the collector by the operating system.

Figure 18:
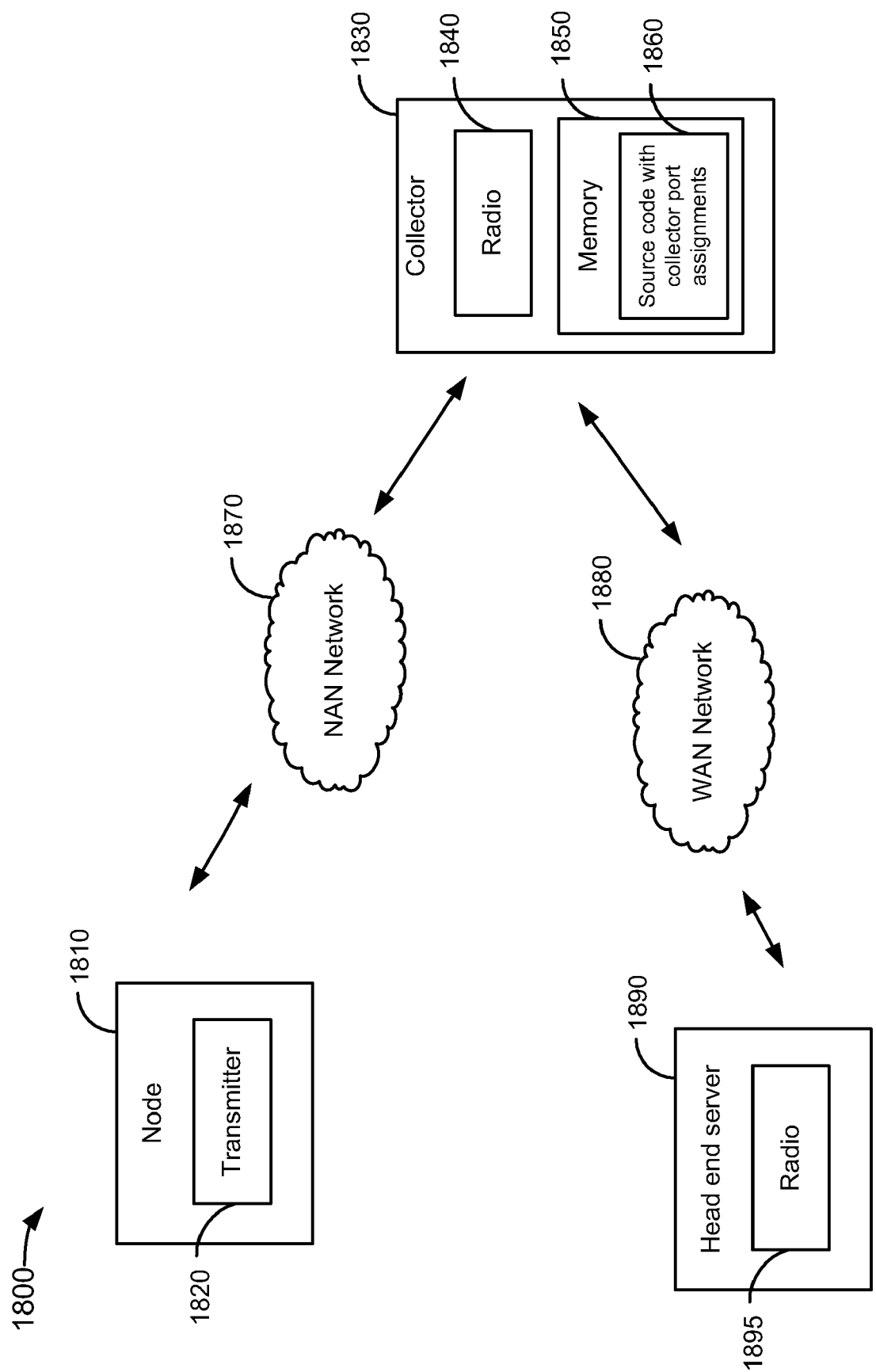
FIG. 18 shows an example of a block diagram of a system for transmitting a report from a node to a head end server, according to an aspect of the invention.

FIG. 18 shows an example of a block diagram 1800 of a system for transmitting a report from a node to a collector and from the collector to a head end server, according to an aspect of the invention. The node 1810 includes a transmitter or radio 1820 or other means for transmitting a data packet to the collector 1830 and re-transmitting an unacknowledged data packet to the collector 1830 through the NAN network 1870.

The collector 1830 includes a radio 1840 and a memory 1850. The radio 1840 includes a transmitter or other means for transmitting data packets and a receiver or other means for receiving data packets. The memory 1850 includes source code 1860 having pre-assigned collector port assignments.

The head end server 1890 includes a radio 1895. The radio 1895 includes a transmitter or other means for transmitting requests or information, such as a read request for a table of nodes serviced by a collector, a table of new reports, and/or a table of lost reports and a write request for a table of last sequence numbers from the collector. The radio 1895 also includes a receiver or other means for receiving tables and data packets through the WAN network 1880.

Figure 19:
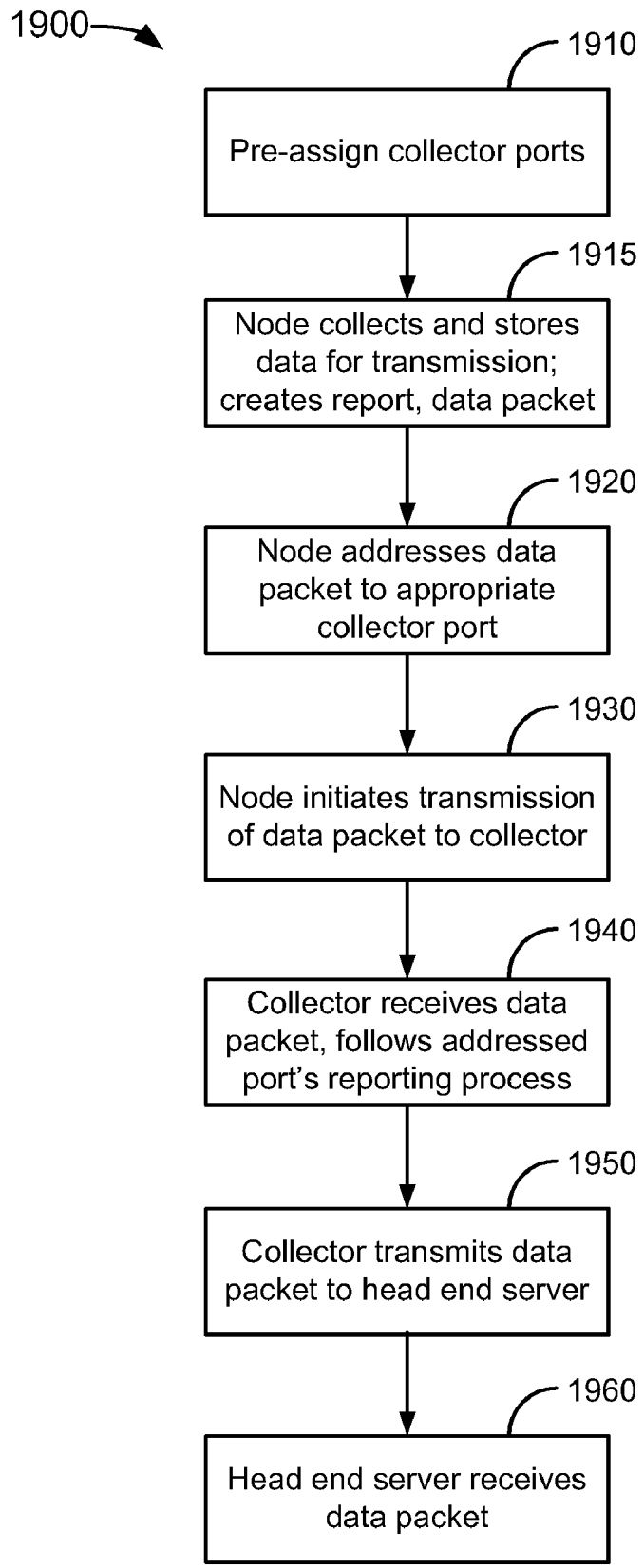
FIG. 19 is a flow chart illustrating an example of a method of informing a collector about which category a report falls into, according to an aspect of the invention.

FIG. 19 shows an example procedure 1900 for addressing reports to particular collector destination ports based upon the type of report. At block 1910, specific collector ports are pre-assigned to correspond to high priority real-time reporting, aggregation for batch reporting, or other processing including, but not limited to, relaying an on-demand response.

The pre-assigning of destination ports may be done by using source code stored in the collector's memory that has embedded within it the destination port assignments.

At block 1915, the node collects and stores data for transmission to the collector and creates an envelope around the data to form a report and data packet.

At block 1920, the node addresses a data packet containing one or more reports to the appropriate port of the collector, where the destination port is included in a data packet header. At block 1930, the node transmits the addressed data packet to the collector.

At block 1940, the collector receives the data packet and processes the data packet according to pre-assigned procedures corresponding to the particular collector port. At block 1950, the collector transmits the data packet to the head end server, and at block 1960, the head end server receives the data packet from the collector.

Thus, the collector does not need to read the payload of a data packet, only the necessary header information attached to the data packet. And in fact, the collector will not be able to read the payload of the data packets because the node encrypts the data with a data key, and only the head end server has the key to decrypt the data.

With real-time reporting, the collector CPU 345 initiates the transfer of information to the head end server. All of the timing intervals involved are known so it is possible to predict the time it will take for the information to arrive at the head end server. Typically, transmission of real-time data will take approximately five minutes or less but it may be appreciated that this duration is a typical value for a typical network and not a limitation of any or all embodiments.

With batch reporting, the collector CPU 345 or other processor or processing logic aggregates batch data from the nodes and waits for the head end server to request the data. The head end server may request the batch data once per day or once per hour, or according to other policies or rules and depending upon the system parameters and configuration. Thus, in at least one non-limiting embodiment, the time at which the data will arrive at the head end server is controlled by the head end server, not by either the node or the collector. A three-step synchronization process 2100 followed by the collector 140 for transmitting batch reports to the head end server is detailed in a section entitled, "Three-Step Synchronization Between Head End Server and Collector" below.

Real-Time Reporting by the Collector

Figure 20:
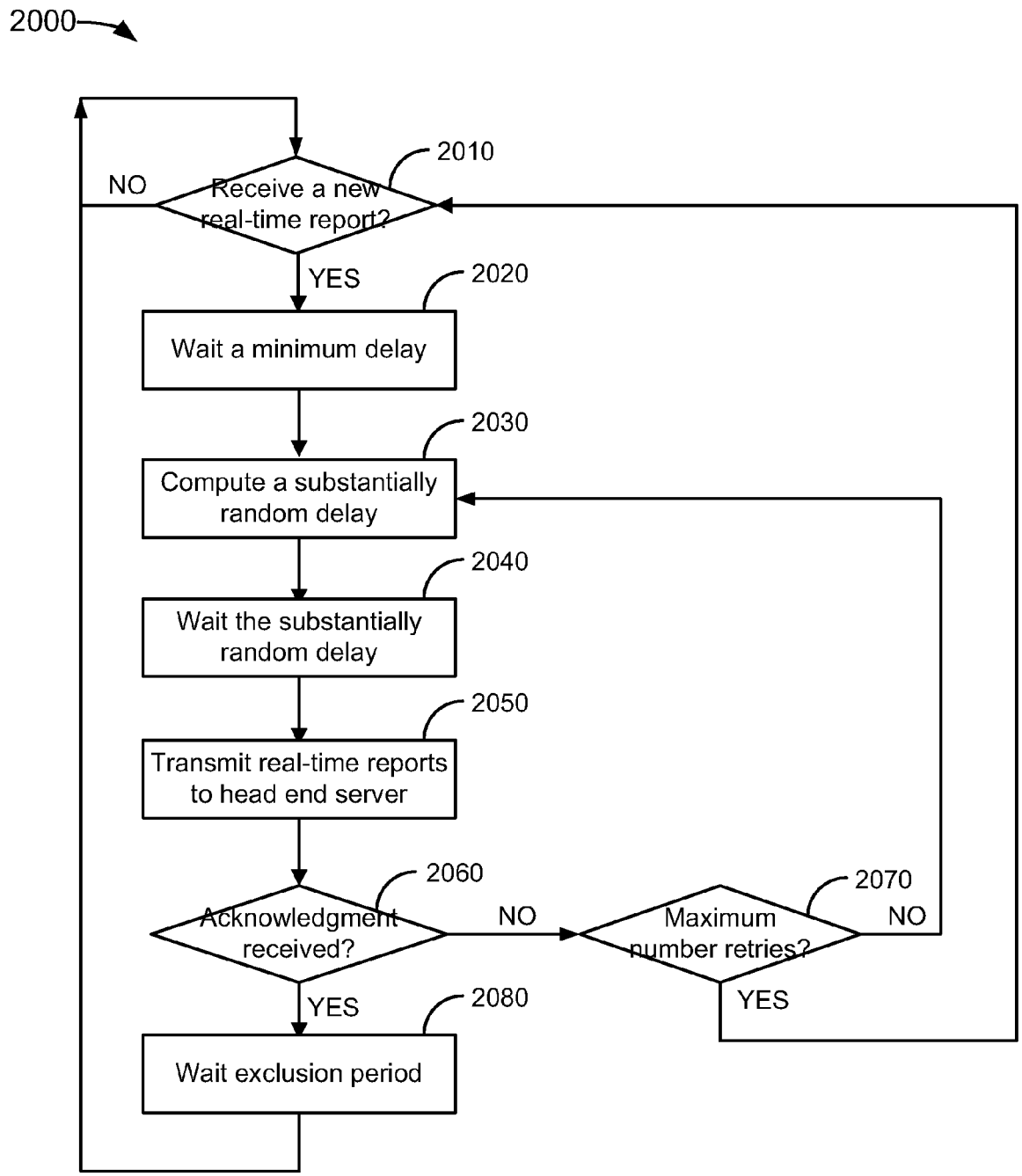
FIG. 20 is a flow chart illustrating an example of a method of temporally staggering when a collector transmits real-time reports to the head end server, according to an aspect of the invention.

FIG. 20 illustrates an example collector relative reporting time determination procedure 2000 used by a collector to determine when to transmit real-time reports received from nodes to the head end server. At decision block 2010, the collector determines whether a data packet 600A has been received at a port assigned to receive real-time reports from the NAN-associated nodes 121, 122, 123. If no new real-time reports have been received at the collector (block 2010—No), the collector continues waiting for a data packet to be addressed to its real-time reporting port at decision block 2010.

If the collector has received a data packet intended to be delivered to the head end server as a real-time report (block 2010-Yes), at block 2020 the collector may be configured to delay the transmission of the report in order to aggregate more real-time reports. The delay, minimum delay (MIN_DELAY), is used to allow the network bandwidth to be used more efficiently. For example, consider the case where a particular node "node A" sends a real-time report to the collector, and another particular node "node B" sends a real-time report to the same collector some period of time later, for example 20 seconds later. It would be a more efficient use of network bandwidth for the collector to wait for a limited duration to aggregate both reports and send them together to the head end server rather than sending node A's report immediately and then sending node B's report 20 seconds later. The impact on the system of waiting a limited duration is negligible because if an alarm needs to be sent by the head end server based upon the two real-time reports, a 20-second (or other specified short) delay is not very critical.

Similar to the situation where reports sent by multiple nodes to a single collector may result in collisions, the reports sent by multiple collectors to the head end server also have the potential to result in collisions. Thus, after waiting for a period of time of minimum delay (e.g., MIN_DELAY) such as may apply to real-time event notification, power outage notification or the like, at block 2030 the collector will compute another delay having a substantially random duration equal to or less than a maximum random delay period (e.g., RND_PERIOD).

At block 2040, the collector waits the duration of the calculated substantially random delay prior to sending any aggregated real-time reports. At block 2050, the collector transmits the real-time reports to the head end server.

The substantially random delays computed by each collector will effectively result in a temporal staggering of reports from the collectors to the head end server over an extended period of time rather than multiple simultaneously transmitted reports. Multiple head end servers may use the same WAN so collisions may occur between transmissions from collectors to a first head end server and transmissions from the same or other collectors to a second head end server.

At decision block 2060, the collector determines whether an acknowledgment has been received from the head end server. If the aggregated real-time reporting data packets from the collector does not reach the head end server or if no acknowledgement is received, a sequence of re-try attempts are made at the TCP/IP layer and at the application layer. If the re-try attempts made at the TCP/IP layer and application layer are also unsuccessful such that no acknowledgment is received at the collector (block 2060—No), at decision block 2070 the collector determines whether the maximum number of re-try attempts established by the system has been reached. The system uses a number, maximum retry (MAX_RETRY), which caps or limits the total number of times a collector is permitted to re-send real-time reports if previous attempts have been unsuccessful. The cap is needed or at least advantageous to prevent a collector from constantly re-sending the reports and tying up network resources.

If the maximum number of re-try attempts have not been made (block 2070—No), the collector will return to block 2030 to compute a new substantially random delay to wait before re-transmitting the reports, as before. A similar algorithm is used as for generating the first substantially random delay, but a shorter scaling period is used to generate shorter delays for re-tries. Shorter delays are used because the majority of real-time reports sent the first time by collectors would have been successfully received and acknowledged, and there are far fewer collectors trying to re-send reports.

If the maximum number of re-try attempts have been made (block 2070-Yes), the collector returns to decision block 2010 to await the receipt of new real-time reports from the nodes. The collector does not re-send the aggregated real-time reports. In one non-limiting example, the collector may throw away or discard real-time reports that have been unsuccessfully sent. In another non-limiting example, the collector may save the real-time reports that have been unsuccessfully sent in order to send them in a next transmission of real-time reports. In accordance with one non-limiting embodiment, the reports may be lost only if there is a loss of power without a back-up power to preserve the reports. For example, if it is battery powered, the mesh gate may enter a power saving state, but before it shuts down or enters the power saving state it can store the reports for later retrieval and transmission. In non-battery implementations, such as those using a super capacitor, there may not be sufficient stored energy for the storage of such real-time reports to have sufficient priority to be stored before energy is lost. Note that non-limiting examples of battery powered nodes, such as battery powered mesh gates, have rechargeable batteries that may have battery capacity to operate 8 hours or more.

If the collector receives an acknowledgment from the head end server for the transmitted real-time reports (block 2060-Yes), at block 2080 the collector must wait for another period of time, sometimes referred to as an exclusion period. The exclusion period is a minimum period of time a collector must wait before starting a new communication in order to prevent the collector from continually transmitting packets over the network. This mechanism places a limit on the maximum number of connections the collector may make with the head end server per day. Thus, if the collector is constantly receiving alarms, it will be prevented from tying up network resources by trying to communicate with the head end server every time.

Synchronization Between Head End Server and Collector

The description below of a non-limiting example of a three-step synchronization process 2100 (or process for synchronizing) followed by the collector 140 for transmitting real-time reports to the head end server. In the described example, the synchronization process advantageously occurs at the application layer. However, the synchronization process 2100 is a communications protocol for use between the head end server and the collector, independent of whether a layered structure is used, or when and if used, the particular layer at which it occurs in the layer structure. In one embodiment, the synchronization process 2100 may be used for communications between the head end server and the collector without the use of any layer structure.

It will also be appreciated that use of a layered structure in computer programs, devices, and computer network systems is common and that many protocols are layered, at lest at a minimum of a physical layer and another layer that might or would include the other non-physical layer.

It will also be apparent to a person skilled in the art in light of the description provided here that the application layer is supported by the transport layer, the mesh layer, and the data link and physical layers established under the IEEE 802.15.4 protocol. The mechanics of the lower support layers which may readily be appreciated by workers having ordinary skill in the art in light of the description provided here will not be described here to avoid obscuring features and aspects of the invention.

Figure 21:
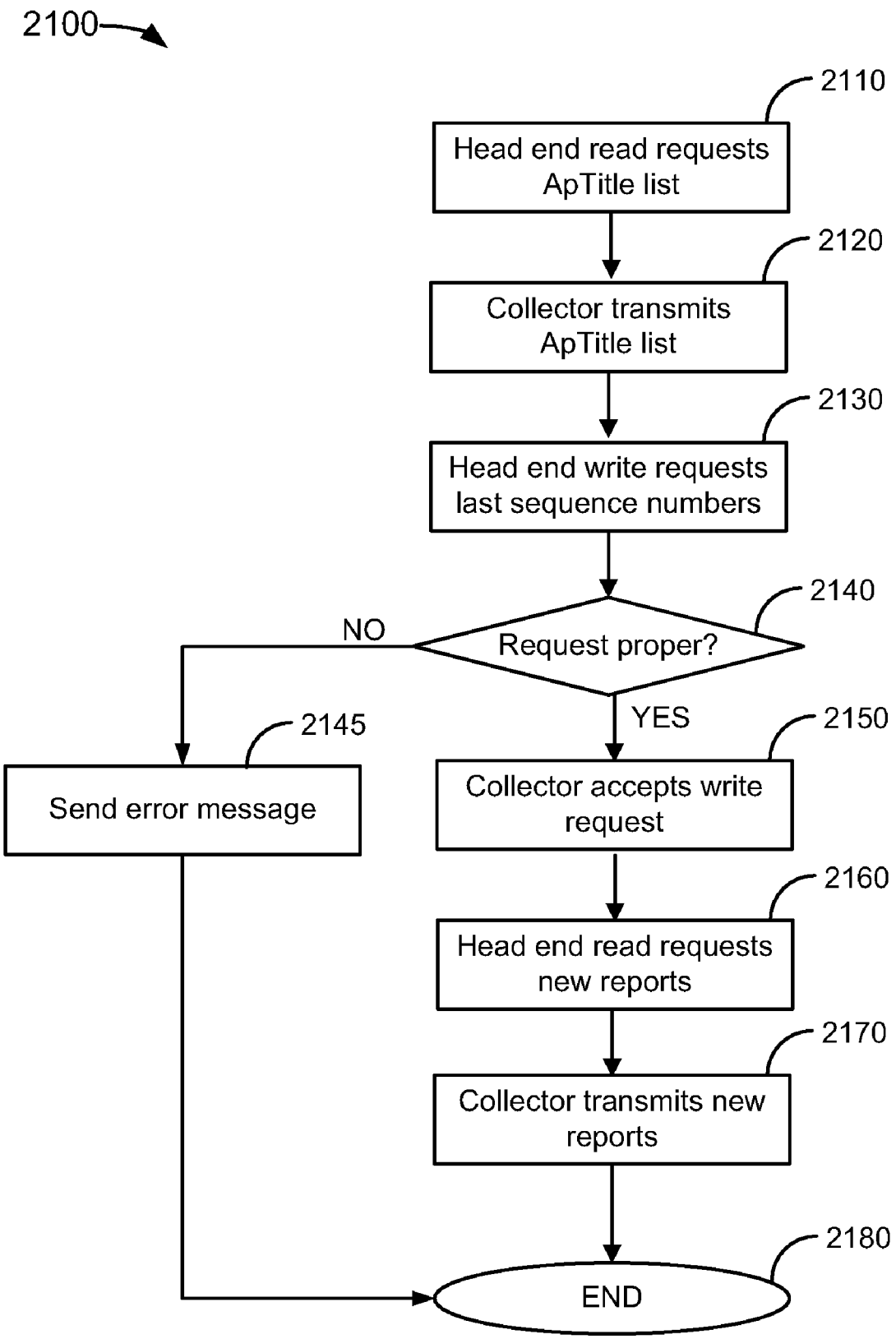
FIG. 21 is a flow chart illustrating an example of a method of transmitting reports for batch reporting between a collector and a head end server, according to an aspect of the invention.

The head end server may wait for the collector to send batch reports at a pre-assigned time window. Alternatively, the head end server may initiate a request for the delivery of the collector's aggregated batch reports, whether the reports were obtained by pulling or pushing, in a three-step synchronization process 1400. The three-step synchronization process contains the following three steps: (1) a first read request with a corresponding response to the read request, (2) a write request with a corresponding response to the write request, and (3) a second read request with a corresponding second response to the second read request. A read request made by a first device is the equivalent of retrieving information from a target device to the first device. A write request made by a first device is the equivalent of sending information from the first device to a target device. FIG. 21 shows the three-step synchronization procedure 2100. The details are described below.

First, at block 2110 the head end server uses a transmitter to send a read table request to the collector. Tables are the data structures used by the nodes. The specific table requested by the head end server in this first request is the list of ApTitles in the collector's database. ApTitle, defined in the ANSI C12 protocols, is the application process title of a node and corresponds to the address of the node. The ApTitle of a node within a particular collector's sub-network uniquely identifies that node.

At block 2120, the collector responds to the head end server's request by transmitting a table containing the ApTitles of all of the nodes in its sub-network. A processor 345 may apply one or more suitable compression algorithms to compress the ApTitles table transmitted by the collector. It will be apparent to a person skilled in the art in light of the description provided here that many different types of compression algorithms may be used. Non-limiting examples of compression algorithms include, but are not limited to, Burrows-Wheeler transform, dynamic Markov compression, and Huffman coding.

At block 2130, the head end server sends a write request containing a table of the last sequence number of each ApTitle in the table sent by the collector. The last sequence number for each node uniquely corresponds to the number of the last report received by the head end server from that node. At the installation of a meter, the last sequence number is set to zero. The last sequence number is incremented by one each time a new report is transmitted by a node, and the last sequence number is never reset during the life of the meter. When a node transmits information to the collector, it does not have to transmit a complete table, even a transmission incorporating a partially written table where information has only been entered in specific fields of the table may constitute a report and be assigned a corresponding last sequence number.

Based upon the last sequence number of each node sent by the head end server, the collector will be able to identify the new reports that the head end server has not received since the last synchronization procedure. For example, if the last sequence number for node A in the head end server's database is 100, the collector knows that all reports having a last sequence number greater than 100 from node A need to be sent to the head end server.

At decision block 2140, it is determined whether the write request is proper. If the collector CPU 345 determines that the head end server's write request is not made properly (block 2140—No), the collector sends an error message at block 2145, and the synchronization process ends at block 2180. Possible reasons for generating an error message include lack of permission for the head end server to access the requested data and invalid table number provided by the head end server or that the head end server has not been authenticated for any reason. The collector may store in memory 335 lists of authenticated head end servers or lists of head end servers permitted to access certain types of reports from specific nodes, and the CPU 345 compares the requesting head end server identification with the lists stored in memory to determine whether the write request was proper.

If the collector CPU 345 determines that the head end server's write request is made properly (block 2140-Yes), the collector CPU 345 accepts the write request at block 2150.

At block 2160, the head end server sends a read table request to the collector for the new reports. The collector responds at block 2170 by fetching the appropriate reports the head end server has not received, optionally compressing them with suitable compression algorithms performed by a processor, and transmitting them to the head end server which receives the reports. Non-limiting examples of compression algorithms include, but are not limited to, Burrows-Wheeler transform, dynamic Markov compression, and Huffman coding. At this point, the transfer and synchronization process is complete at block 2180.

The collector uses a buffer for storing reports received from every node it services in its sub-network. The buffer may advantageously be a circular or cyclic buffer. A first-in first-out protocol is employed with the buffer, and may advantageously be sized to hold an appropriate quantity or time duration of data. In one non-limiting embodiment, the buffer is sized to hold or store approximately three months' worth of reports. It will be apparent to a person skilled in the art in light of the description provided here that the collector's buffer may store any amount of information. Consequently, the three-step synchronization process may be useful for recovering from a partial loss of data at the head end server's database by retrieving the lost data and/or lost reports from the collector.

Figure 22:
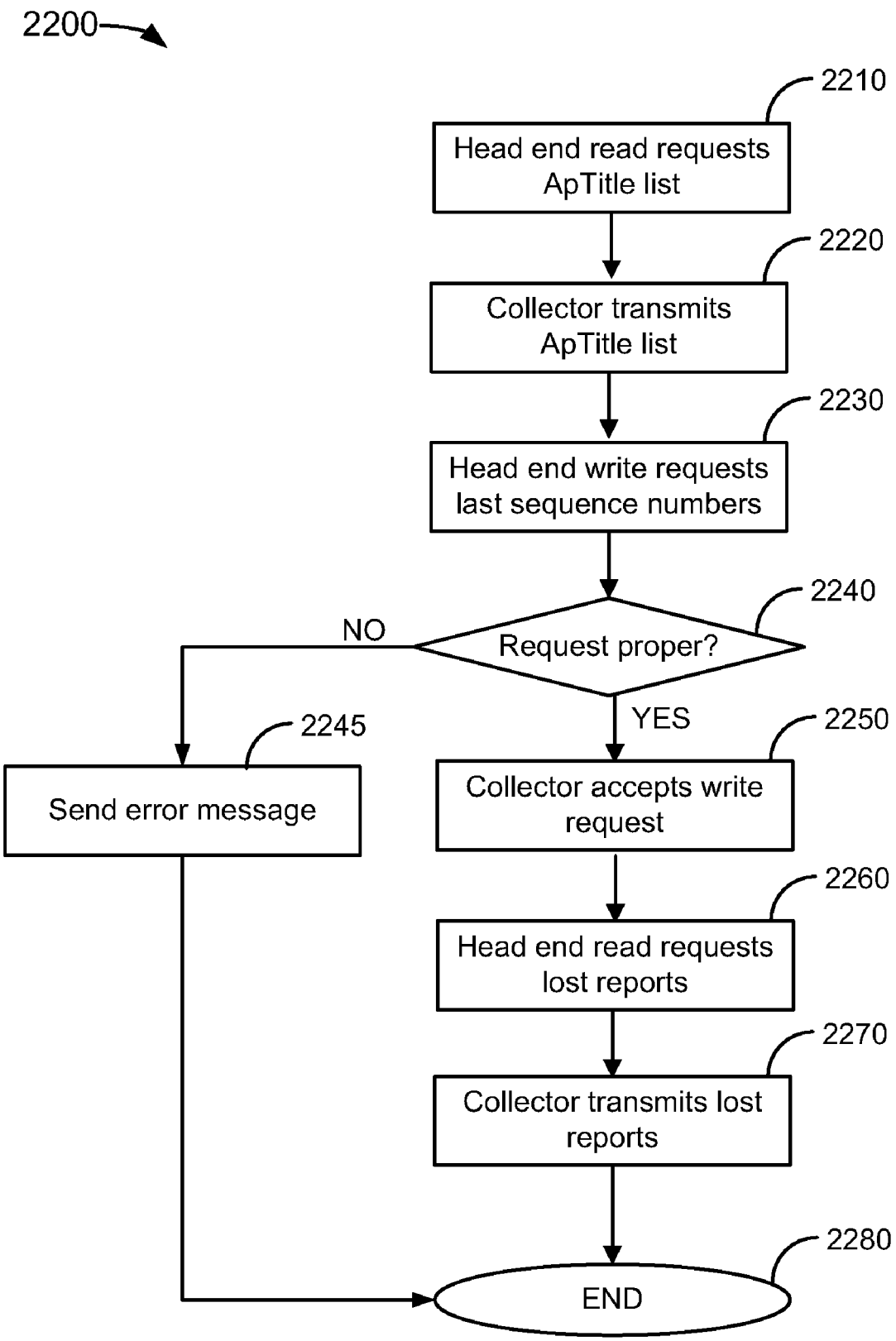
FIG. 22 is a flow chart illustrating an example of a method of recovering lost reports at a head end server, according to an aspect of the invention.

FIG. 22 is a flow chart illustrating an example of a method 2200 of recovering lost reports at a head end server, according to an aspect of the invention. For example, if the head end server approximates that the most recent five days of reports received from a collector has been lost, the head end server may employ the three-step synchronization process and enter the last sequence numbers for the nodes corresponding to a week prior to the database loss in order to retrieve all of the reports that the collector transmitted to the head end server within the past week. Blocks 2210 and 2220 correspond to blocks 2110 and 2120 of FIG. 21 described above. At block 2230, the head end server sends a write request containing a table of the last sequence number for each ApTitle, where the last sequence number corresponds to the last report received from the corresponding node or any report for that node that the head end server still has stored in its database.

At decision block 2240, it is determined whether the write request is proper. If the collector CPU 345 determines that the head end server's write request is not made properly (block 2240—No), the collector sends an error message at block 2245, and the synchronization process ends at block 2280. If the collector CPU 345 determines that the head end server's write request is made properly (block 2240-Yes), the collector CPU 345 accepts the write request at block 2250.

At block 2260, the head end server sends a read table request to the collector for the lost reports. The collector responds at block 2270 by fetching the appropriate reports the head end server has lost, optionally compressing them with suitable compression algorithms performed by a processor, and transmitting them to the head end server which receives the reports. At this point, the transfer and synchronization process is complete at block 2280.

The three-step synchronization process may also be useful for testing of the head end server or upgrading the head end server. Any number of head end servers may synchronize with the collector, and the last sequence number stored at each head end server may be different.

The head end server 160 receives all reported events, such as power outage and meter tampering reports, by all NAN-associated nodes 121, 122, 123 and HAN-associated nodes 131, 132, 133 in its network. Based upon the events received, the head end server 160 may choose to create an alarm. For example, if several of the HAN-associated nodes 131, 132, 133 within a HAN 130 report power outages, the head end server 160 may decide to raise a power outage alarm. Alternatively, the head end server 160 may require a minimum number of repetitions of a certain type of event before creating an alarm. For example, if a meter loses a variable in memory and sends a RAM error event to the head end server 160, the meter can sometimes resolve the problem by rebooting. However, if the RAM error occurs every hour, and the error event is reported to the head end server 160 each time, the head end server 160 will raise an alarm because the RAM error is persistent, and the meter requires external help to fix the problem.

The logic required to turn one or more events into an alarm resides at a processor at the head end server 160. Conditions for generating an alarm include, but are not limited to, the number of times a particular event must recur and the time span within which a particular event recurs. Consequences of creating an alarm include, but are not limited to, generating an alarm report by the head end server 160 and displaying an alarm message on a display at the utility office and/or at the utility customer's site.

Nodes 121, 122, 123, 131, 132, 133 typically have access to an electrical power source as its primary power supply. Thus, when a node loses its primary power supply, the node responds to the event as a power outage. However, a node may also have a secondary power supply such as a super-capacitor, battery or other power supply means which allows the node to continue operating for at least a few minutes after a power outage of the primary power supply has occurred at the node. Typically, a node will wait for a minimum period of time, for example sixty seconds, referred to as the recognition period before reporting a power outage. The wait time ensures that the power outage is not just a temporary power glitch, and the wait time is configurable by the utility that owns the meter. If the recognition period has elapsed and the primary power supply still has not been restored, the node transmits a power outage report to the collector.

Figure 23:
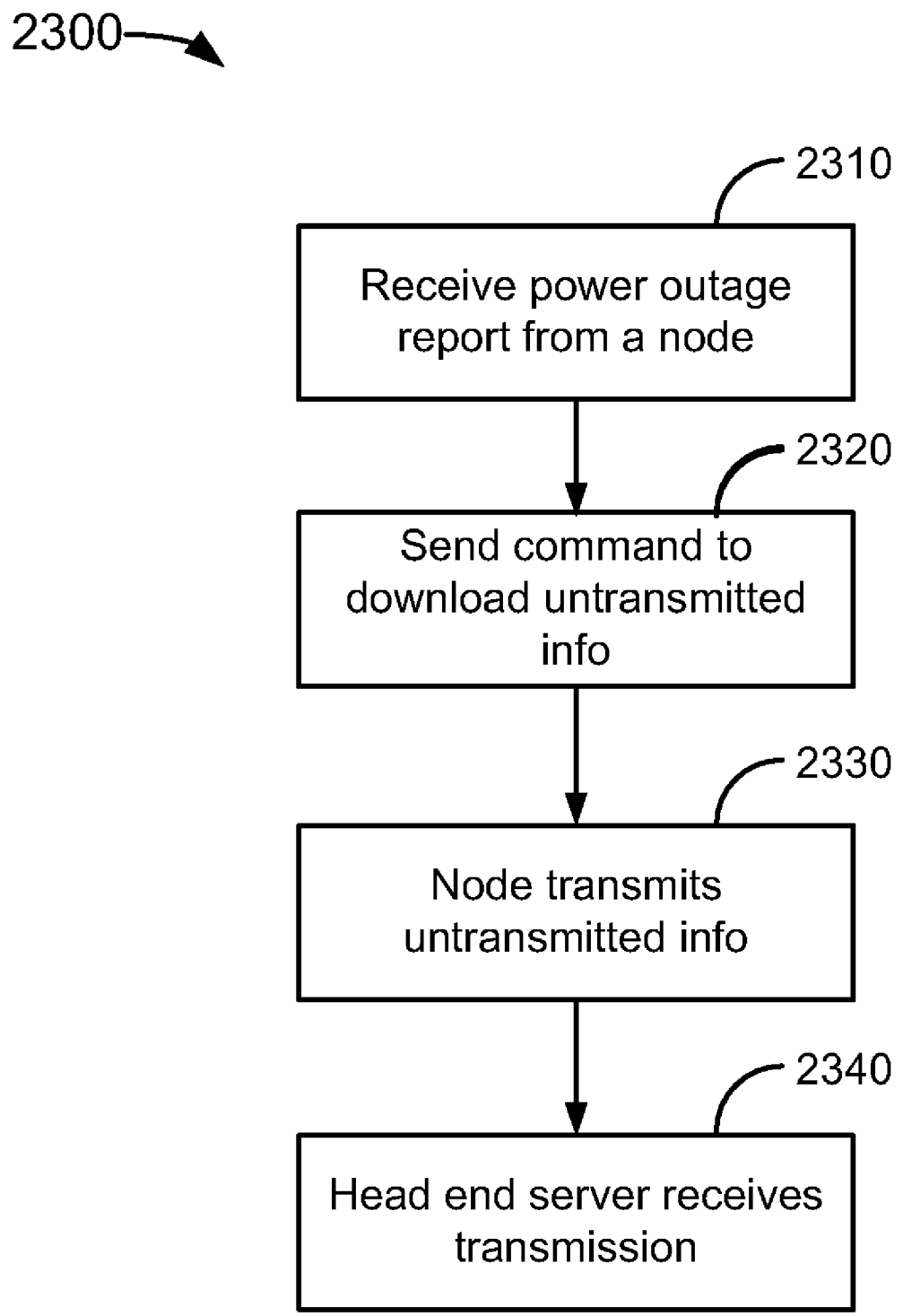
FIG. 23 is a flow chart illustrating an example of a method of recovering untransmitted information from a removed node.

FIG. 23 is a flow chart illustrating an example of a method 2300 of recovering untransmitted information from a node experiencing a power outage. At block 2310, the head end server receives a power outage report from a node.

At block 2320, the head ends server sends a command to the collector 140 associated with the node to pull previously untransmitted reports and data from the node so that the information is not lost. The collector 140 then sends a request to the node to transmit all reports starting from the last transferred pointer and all data structures in progress, even partial interval data. In this special situation, the collector does not wait for the node to push the data at the usual scheduled reporting time window because if the node does not have a secondary power supply, the node may be powered by a secondary source capable of providing only a few minutes of power. Thus, it is important to trigger the download of all of the previously untransmitted information from the node as soon as possible.

At block 2330, the node transmits all data and reports stored at the node that has not been previously transmitted to the head end server through the collector, and at block 2340 the head end server receives the transmission.

Nodes reporting a power outage do not initiate the transmission of all previously untransmitted data and reports because if the power outage is widespread, the network cannot handle hundreds or thousands of reports being transmitted simultaneously by all affected nodes.

A node may experience a power outage when it is physically removed as part of a maintenance procedure. When the node is removed, it loses accesses to its primary power supply and will transmit a power outage report. The head end server may be aware of maintenance schedule and realize that the power outage report is a consequence of the node's physical removal. However, it is important for the collector or head end server to send a request to the node to download all previously untransmitted data and reports before any secondary power source is depleted. One advantage to automatically requesting a download of untransmitted information is that the technician who removes the node or meter does not have to worry about saving any of the information stored at a memory or register within the node prior to removing the device. For example, if the node 630 in FIG. 6A is removed for maintenance, the data stored in the register 612 would be lost after any secondary power source is depleted. Thus, the data stored in the register 612 would be downloaded in response to a request from the collector.

Whenever a power outage is reported, there exists a possibility that the reported power outage is not real. Possible reasons for a false power outage report include, but are not limited to, tampering with the meter at the node, hardware problems at the node, software problems at the node, and poor power supply quality such as low voltage or power sags. Thus, it would be advantageous if the system had a way to verify whether the power outage is real, rather than risk creating a false alarm based upon a false power outage report.

A reported power outage may be verified by querying other nodes within the same HAN as the reporting node that have devices such as thermostats or appliance switches. If no confirmation is obtained by the other nodes, the reported power outage may be considered a false alarm by the head end server 160.

Figure 24:
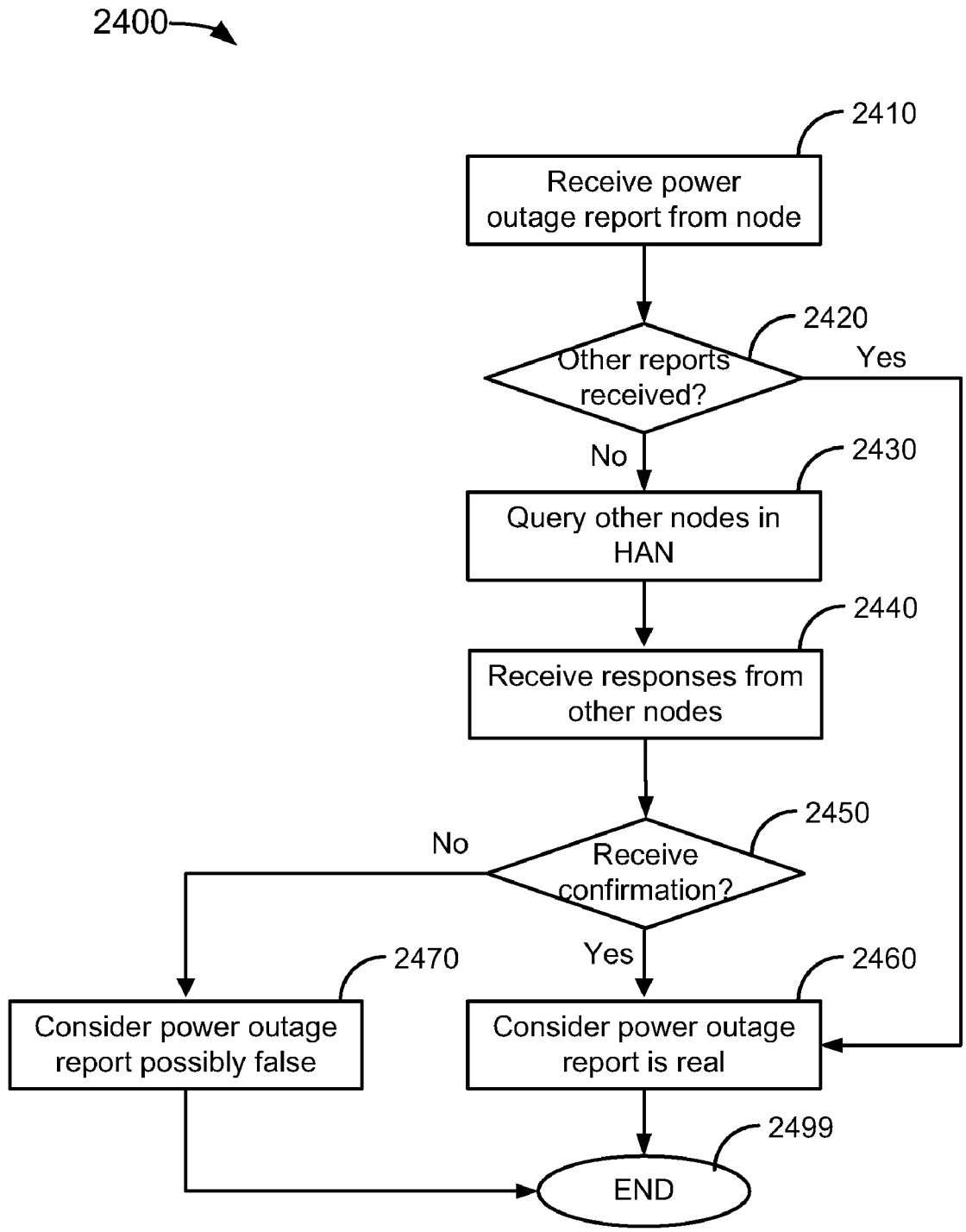
FIG. 24 is a flow chart illustrating an example of a method of detecting a false power outage report.

FIG. 24 illustrates an example procedure 2400 for verifying a power outage report from a meter. At block 2410, the head end server 160 receives a power outage report from a meter residing at, for example, HAN-associated node 4 131 in the HAN 130.

At decision block 2420, the head end server determines whether any power outage reports have been received from the other nodes in the same HAN, such as HAN-associated nodes 5 and 6, 132, 133. Node 5 132 and node 6 133 may be utility-consumption devices such as an appliance, or a utility-measuring device such as a thermostat. If another report confirming the power outage within the HAN has been received (block 2420-Yes), at block 2460, the head end server 160 may use the confirming report or reports to verify that a power outage is really affecting the HAN. The process ends at block 2499.

If no other reports have been received from the other nodes 132, 133 within the HAN (block 2420—No), at block 2430, the head end server 160 queries the other nodes 132, 133 in the HAN about the power outage. In one embodiment, the query is transmitted through the WAN 110 to the collector 140 which transmits the query through the LAN to the microportal 150, and the microportal 150 transmits the query through the HAN to the nodes 132, 133. Alternatively, the head end server may maintain a neighborhood table of locations of nodes and direct the request to specific nodes of interest within the HAN.

At block 2440, the head end server 160 receives the responses to the query from the other nodes, 132, 133 relayed through the microportal 150 and the collector 140. The queried nodes 132, 133 are able to respond to the query because if there is no power outage, the primary power sources for the nodes 132, 133 have not been affected. If one or more of the nodes are experiencing an outage of the primary power source, in one embodiment, those nodes will be running off of the secondary power source. Further, the secondary power source will still be operative for those nodes because the nodes have not yet reported the power outage independently due to the wait imposed by the recognition period. Because the recognition period is set to be shorter than the total period of time the secondary power source is able to power the node, the node will have power to respond to the query from the head end server 160.

At decision block 2450, the head end server 160 determines whether it has received a confirmation of the power outage within the HAN. If the head end server 160 receives a power outage report from at least one of the other nodes 132, 133 (block 2450-Yes), confirmation has been received, and at block 2460, the head end server 160 may conclude that there is a real power outage affecting the HAN, and the first node's 131 initial power outage report is confirmed. The process ends at block 2499.

If the head end server 160 does not receive a power outage confirmation from at least one of the other nodes 132, 133 (block 2450—No), at block 2470 the head end server 160 may conclude that the power outage report received from the first node 131 is a false report. The process ends at block 2499.

In order for a head end server to query other nodes in the same HAN as the node reporting the power outage, the microportal 150 must not also experience the same power outage. Thus, as shown in FIG. 1, the microportal 150 must reside outside of any of the nodes 131, 132, 133 coupled to the HAN 130.

In one embodiment, nodes housing meters or other devices may not have super-capacitors or any other secondary power sources. Thus, when a power outage occurs, these nodes are not capable of transmitting any data. The head end server 160 may determine that a power outage has occurred when the meter at that node fails to transmit regularly scheduled reports at the pre-scheduled reporting time window.

Figure 25:
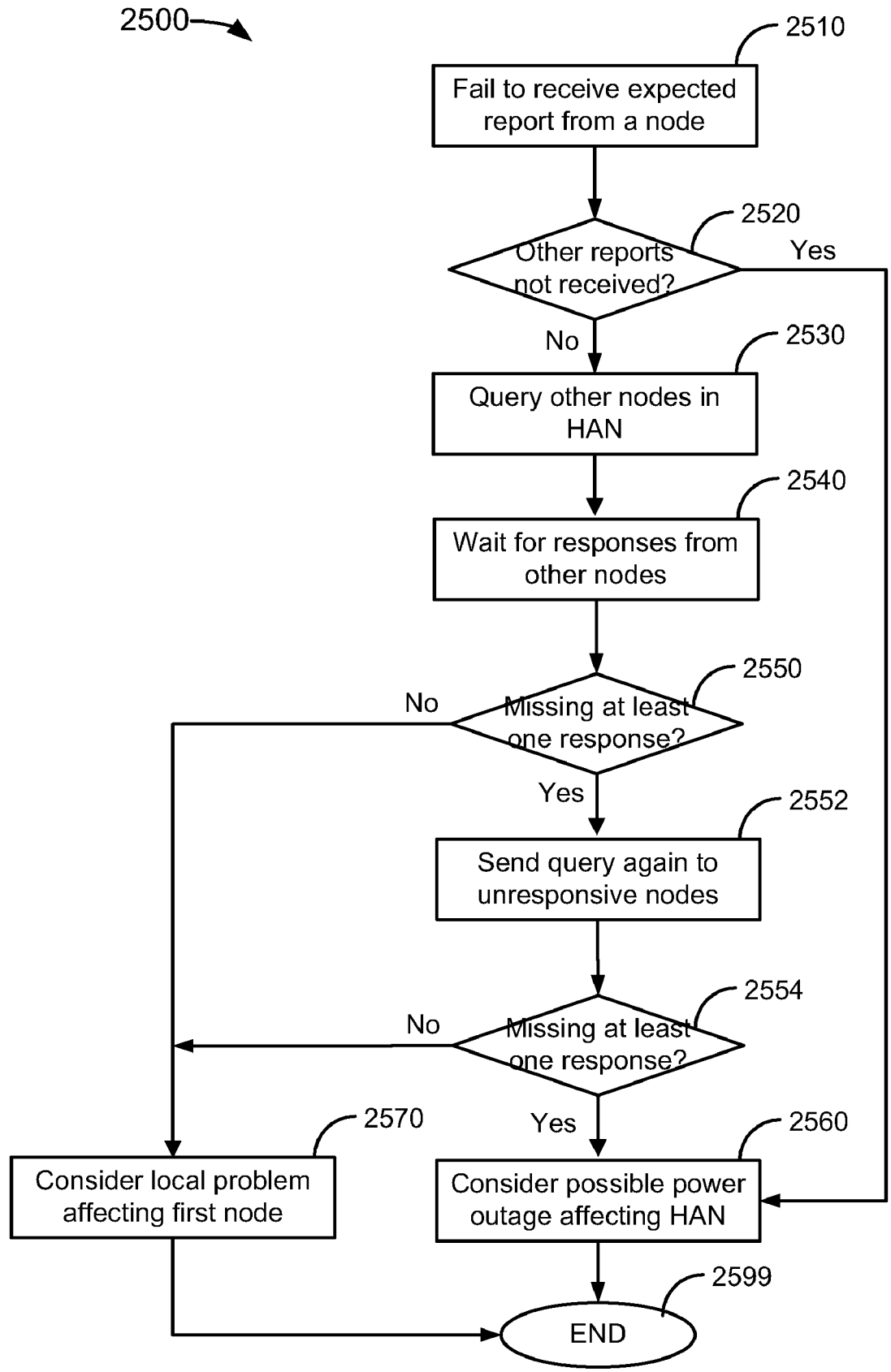
FIG. 25 is a flow chart illustrating an example of a method of detecting a false power outage report.

FIG. 25 illustrates an example procedure 2500 for verifying a power outage as a result of a node that does not have a secondary power supply failing to report as scheduled and also assuming that the other nodes in the same HAN do not have a secondary power supply. At block 2510, the head end server fails to receive scheduled reports from the meter residing at HAN-associated node 4 131 in the HAN 130, for example.

At decision block 2520, the head end server determines if any other expected reports at the prescheduled reporting time window have not been received from any other HAN-associated nodes 132, 133 within the same HAN. If other expected reports have not been received (block 2520-Yes), at block 2560, the head end server 160 may conclude that there is a power outage affecting the HAN. The process ends at block 2599.

If all other expected reports have been received (block 2520—No), at block 2530, the head end server queries other nodes in the HAN. To implement the polling process, the head end server sends a request to the collector servicing the network of the non-reporting node. The collector then forwards or relays the information request to the appropriate microportal servicing the HAN. Alternatively, the head end server may maintain a neighborhood table of locations of nodes and direct the request to specific nodes of interest within the HAN. At block 2540, the head end server waits for responses from the queried HAN-associated nodes. Alternatively, the polling of devices in the HAN could be initiated by a meter as soon as the meter perceives an outage, even before the meter alerts the head-end, as a cross-check on itself regarding the perceived outage.

At decision block 2550, the head end server determines if at least one response has not been received. If responses have been received from all of the queried HAN nodes because all of the HAN-associated nodes still have power (block 2550—No), at block 2570 the head end server 160 may conclude that a problem is affecting only the first node that failed to report rather than a power outage is affecting the HAN. The process ends at block 2599.

If at least one response has not been received (block 2550-Yes), at block 2552, the head end server may query again the nodes in the HAN that have not responded to the first query, in case the query was not received by the non-responsive nodes or the response was not received by the head end server. The query or response may have been sent but not received for a variety of reasons including, but not limited to, interference at the RF frequency of transmission and collisions with another packet.

At decision block 2554, the head end server determines if at least one response still has not been received. If responses have now been received from all of the queried HAN nodes (block 2550—No), at block 2570 the head end server 160 may conclude that a problem is affecting only the first node that failed to report rather than a power outage is affecting the HAN. The process ends at block 2599.

If the head end server still has not received at a response from at least one node, at block 2560, the head end server 160 may conclude that there is a power outage affecting at least a portion of the HAN. The process ends at block 2599.

Because a head end server has the ability to query other nodes in a HAN about reports sent from the metering node in the HAN, the head end server may correlate information obtained from multiple nodes within the HAN to determine whether information being reported by the metering node is accurate. Further, the head end server may alert maintenance personnel to physically go to the non-reporting node's site to either repair the meter and/or the supporting register and communications card or swap out the meter and/or supporting register and communications card for a new one.

The head end server may also correlate a power outage report with other known information including, but not limited to, maintenance schedules. For example, if the head end server is aware that maintenance will be performed at a particular node on a particular day or during a particular time window, then a power outage report received from that node during that time will not warrant further verification or the raising of a power outage alert.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while a head end server receiving power outage reports from meters at nodes is mentioned, a head end server may receive power outage reports from utility-measuring devices such as thermostats under the principles disclosed herein. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A method of confirming a power outage report comprising:
   receiving, by a head end server, the power outage report from a first node coupled to a first network;
   querying, by the head end server, one or more other nodes coupled to the first network about a power outage, in response to receiving the power outage report;
   receiving, by the head end server, one or more responses from the one or more other nodes coupled to the first network;
   determining, by the head end server, that the power outage report is not false based on the one or more responses from the one or more other nodes in the first network;
   transmitting, by the head end server, a request to download any untransmitted information from the first node;
   receiving, by the first node, the request to download all untransmitted information;
   determining, by the first node, that untransmitted information is present in one or more tables stored in a memory of the first node, the tables selected from the group consisting of a history logger table, an event table, a profile table, and a self-read table;
   creating, by the first node, a report comprising the untransmitted information;
   transmitting, by the first node, the untransmitted information; and
   receiving, by the head end server, the untransmitted information from the node.

2. The method of claim 1, wherein the first network comprises a home area network (HAN).

3. The method of claim 1, further comprising generating an alarm report if the power outage report is confirmed.

4. The method of claim 1, further comprising displaying an alarm message at a utility office if the power outage report is confirmed.

5. The method of claim 1, further comprising displaying an alarm message at a display coupled to the first network if the power outage report is confirmed.

6. The method of claim 1, wherein the first node comprises a meter having a secondary power source.

7. The method of claim 6, wherein the secondary power source is a super-capacitor.

8. The method of claim 6, wherein the secondary power source is a battery.

9. A system for confirming a power outage report comprising:
a first node coupled to a first network, wherein the first node comprises:
a meter,
an input/output device for receiving data from the meter;
one or more processors for:
creating a table comprising the data received by the input/output device, the table selected from the group consisting of a history logger table, an event table, a profile table, and a self-read table; and
assigning a corresponding sequence number to the table, the sequence number to be incremented when new data is added to the table;
a register for storing the one or more tables and corresponding sequence numbers, and
a communications module for transmitting the power outage report through the first network to a microportal;
one or more other nodes coupled to the first network;
the microportal for relaying the power outage report through a second network to a collector;
the collector for relaying the power outage report through a third network to a head end server; and
the head end server for:
receiving the power outage report;
querying the one or more other nodes about a power outage, in response to receiving the power outage report;
determining that the power outage report is not false based on the one or more responses from the one or more other nodes in the first network; and
transmitting a request to download any untransmitted information from the first node,
wherein the first node receives the request to download the untransmitted information and:
accesses any new data in the table;
creates a report comprising the new data; and
transmits the report to the head end through the microportal and collector.

10. The system of claim 9, wherein the first network comprises a home area network (HAN), the second network comprises a neighborhood area network (NAN), and the third network comprises a wide area network (WAN).

11. The system of claim 9, wherein the first node has a secondary power source.

12. The system of claim 11, wherein the secondary power source is a super-capacitor.

13. The system of claim 11, wherein the secondary power source is a battery.

14. The system of claim 9, wherein the head end server further generates an alarm report if the power outage report is confirmed.

15. The system of claim 9, wherein the head end server further displays an alarm message at a utility office if the power outage report is confirmed.

16. The system of claim 9, wherein the head end server further displays an alarm message at a display coupled to the first network if the power outage report is confirmed.

17. A method of verifying a power outage comprising:
failing, by a head end, to receive a report from a first node coupled to a first network at a prescheduled reporting time window;
polling, by the head end server, one or more other nodes coupled to the first network about a power outage, in response to failing to receive the report;
determining that the power outage exists based on responses from the one or more other nodes;
transmitting, by the head end server, a request to download any untransmitted information from the first node;
receiving, by the first node, the request to download all untransmitted information;
determining, by the first node, that untransmitted information is present in one or more tables stored in a memory of the first node, the tables selected from the group consisting of a history logger table, an event table, a profile table, and a self-read table;
creating, by the first node, a report comprising the untransmitted information;
transmitting, by the first node, the untransmitted information; and
receiving, by the head end server, the untransmitted information from the node.

18. The method of claim 17, further comprising re-polling one or more non-responsive nodes about the power outage before determining whether the power outage exists.

19. The method of claim 17, wherein the first network comprises a home area network (HAN).

20. The method of claim 17, further comprising generating an alarm report if the power outage report is determined to exist.

21. The method of claim 17, further comprising displaying an alarm message at a utility office if the power outage report is determined to exist.

22. The method of claim 17, further comprising displaying an alarm message at a display coupled to the first network if the power outage report is determined to exist.

23. The method of claim 17, wherein the first node does not have a secondary power supply.

24. A system for verifying a power outage report comprising:
a first node coupled to a first network, wherein the first node comprises:
a meter,
an input/output device for receiving data from the meter;
one or more processors for:
creating a table comprising the data received by the input/output device, the table selected from the group consisting of a history logger table, an event table, a profile table, and a self-read table; and
assigning a corresponding sequence number to the table, the sequence number to be incremented when new data is added to the table;
a register for storing the one or more tables and corresponding sequence numbers, and
a communications module for transmitting a report at a prescheduled reporting time window to a head end server; and the head end server for:
polling one or more other nodes coupled to the first network about a power outage, in response to failing to receive the report from the first node;
determining that the power outage exists based on responses from the one or more other nodes;
transmitting a request to download any untransmitted information from the first node,
wherein the first node receives the request to download the untransmitted information and:
accesses any new data in the table;
creates a report comprising the new data; and
transmits the report to the head end through the microportal and collector.

25. The system of claim 24, wherein the head end server further re-polls one or more nonresponsive nodes about the power outage before determining whether the power outage exists.

26. The system of claim 24, wherein the head end server further generates an alarm report if the power outage report is determined to exist.

27. The system of claim 24, wherein the head end server further displays an alarm message at a utility office if the power outage report is determined to exist.

28. The system of claim 24, wherein the head end server further displays an alarm message at a display coupled to the first network if the power outage report is determined to exist.

29. A computer program product stored in a computer readable media for execution in a processor and memory coupled to the processor for performing a method of confirming a power outage report comprising:
receiving the power outage report from a first node coupled to a first network;
querying one or more other nodes coupled to the first network about a power outage, in response to receiving the power outage report;
receiving one or more responses from the one or more other nodes coupled to the first network;
determining that the power outage report is not false based on the one or more responses from the one or more other nodes in the first network transmitting a request to download any untransmitted information from the first node;
receiving the request to download all untransmitted information;
determining that untransmitted information is present in one or more tables stored in a memory of the first node, the tables selected from the group consisting of a history logger table, an event table, a profile table, and a self-read table;
creating a report comprising the untransmitted information;
transmitting the untransmitted information; and
receiving the untransmitted information from the node.

30. A computer program product stored in a computer readable media for execution in a processor and memory coupled to the processor for performing a method of verifying a power outage comprising:
failing to receive a report from a first node coupled to a first network at a prescheduled reporting time window;
polling one or more other nodes coupled to the first network about a power outage, in response to failing to receive the report;
determining that the power outage exists based on responses from the one or more other nodes
transmitting a request to download any untransmitted information from the first node;
receiving the request to download all untransmitted information;
determining that untransmitted information is present in one or more tables stored in a memory of the first node, the tables selected from the group consisting of a history logger table, an event table, a profile table, and a self-read table;
creating a report comprising the untransmitted information;
transmitting the untransmitted information; and
receiving the untransmitted information from the node.

* * * * *